(12) United States Patent
Baratta

(10) Patent No.: US 12,247,361 B2
(45) Date of Patent: Mar. 11, 2025

(54) VIBRATION APPARATUS FOR CONCRETE FINISHING TOOLS AND METHODS

(71) Applicant: Baron Innovative Technology LP, Oxnard, CA (US)

(72) Inventor: Anthony Baratta, Oak Park, CA (US)

(73) Assignee: BARON INNOVATIVE TECHNOLOGY LP, Oxnard, CA (US)

( * ) Notice: Subject to any disclaimer, the term of this patent is extended or adjusted under 35 U.S.C. 154(b) by 0 days.

(21) Appl. No.: 17/243,580

(22) Filed: Apr. 29, 2021

(65) Prior Publication Data

US 2021/0246617 A1 Aug. 12, 2021

Related U.S. Application Data

(63) Continuation of application No. 15/775,830, filed as application No. PCT/US2016/062365 on Nov. 16, 2016, now Pat. No. 11,001,976.

(60) Provisional application No. 62/256,030, filed on Nov. 16, 2015, provisional application No. 62/289,241, filed on Jan. 30, 2016, provisional application No. (Continued)

(51) Int. Cl.
| E04F 21/24 | (2006.01) |
|---|---|
| B25G 3/08 | (2006.01) |
| B25G 3/12 | (2006.01) |
| B25G 3/38 | (2006.01) |
| E01C 19/32 | (2006.01) |
| E01C 19/44 | (2006.01) |

(Continued)

(52) U.S. Cl.
CPC ............... *E01C 19/32* (2013.01); *B25G 3/08* (2013.01); *B25G 3/12* (2013.01); *B25G 3/38* (2013.01); *E01C 19/44* (2013.01); *E01C 23/025* (2013.01); *E04F 21/242* (2013.01); *E04F 21/244* (2013.01); *F16C 11/04* (2013.01)

(58) Field of Classification Search
CPC .......... E01C 19/22; E01C 19/32; E01C 19/35; E01C 19/44; E04F 21/241; E04F 21/242; E04F 21/244
See application file for complete search history.

(56) References Cited

U.S. PATENT DOCUMENTS

| 92,034 A | * | 6/1869 | Frey et al. | ............... A47L 1/06 15/245 |
|---|---|---|---|---|
| 963,717 A | | 7/1910 | Linville | |

(Continued)

FOREIGN PATENT DOCUMENTS

| EP | 0995859 | 4/2000 |
|---|---|---|
| GB | 971200 | 9/1964 |

(Continued)

OTHER PUBLICATIONS

Hackworth, Joshua, International Search Report, Feb. 21, 2017, 7 pages, Australian Patent Office, Woden, ACT, Australia.

(Continued)

*Primary Examiner* — Gary S Hartmann
(74) *Attorney, Agent, or Firm* — Henricks Slavin LLP

(57) ABSTRACT

A vibration assembly is configured to be engageable with a concrete working tool through engagement of complementary or interengaging interface components. A variety of interface components can be used, and in some examples, the engagement between the interface components is placed under tension.

20 Claims, 23 Drawing Sheets

Related U.S. Application Data

62/289,904, filed on Feb. 1, 2016, provisional application No. 62/289,909, filed on Feb. 1, 2016.

(51) Int. Cl.
  *E01C 23/02* (2006.01)
  *F16C 11/04* (2006.01)

(56) References Cited

U.S. PATENT DOCUMENTS

| | | | |
|---|---|---|---|
| 1,763,066 A | 6/1930 | Rooney | |
| 2,372,163 A | 3/1945 | Whiteman | |
| 3,412,658 A | 11/1968 | Griffin | |
| 4,359,296 A | 11/1982 | Cronkhite | |
| 4,838,730 A | 6/1989 | Owens | |
| 5,234,283 A | 8/1993 | Adkins | |
| 5,337,523 A * | 8/1994 | Walsh | B24D 15/04 15/245 |
| 5,393,168 A | 2/1995 | Jarvis | |
| 5,417,517 A | 5/1995 | Zollers | |
| 5,467,496 A | 11/1995 | Jarvis | |
| 5,540,519 A | 7/1996 | Weber | |
| 5,609,437 A | 3/1997 | Silva | |
| 5,737,795 A | 4/1998 | Murders | |
| 6,139,217 A | 10/2000 | Reuter | |
| 6,231,331 B1 * | 5/2001 | Lievers | E04G 21/10 425/456 |
| 6,322,286 B1 * | 11/2001 | Rijkers | E04G 21/10 29/898.07 |
| 6,923,595 B1 | 8/2005 | Chek | |
| 6,981,819 B1 | 1/2006 | Suckow | |
| 6,988,851 B2 * | 1/2006 | Sina | E04F 21/242 404/97 |
| 7,052,204 B2 * | 5/2006 | Lutz | E04G 21/066 404/114 |
| 7,153,058 B2 * | 12/2006 | Lindley | E04F 21/242 404/115 |
| 7,201,537 B2 * | 4/2007 | Sina | E04F 21/242 404/114 |
| 7,465,121 B1 | 12/2008 | Hendricks | |
| 7,470,084 B2 | 12/2008 | Brotzel | |
| 8,075,222 B2 | 12/2011 | Quenzi | |
| 8,182,173 B2 | 5/2012 | Lickel | |
| 8,439,600 B2 | 5/2013 | Brening | |
| 8,528,152 B1 | 9/2013 | Hogan | |
| 8,608,402 B2 * | 12/2013 | Argento | E01C 19/402 404/114 |
| 8,826,961 B2 * | 9/2014 | Castagnetta | E04F 21/165 401/5 |
| 11,001,976 B2 | 5/2021 | Baratta et al. | |
| 2005/0036837 A1 | 2/2005 | Marshall | |
| 2010/0239368 A1 | 9/2010 | Lickel | |
| 2015/0159384 A1 | 6/2015 | Wetherell | |
| 2023/0057404 A1 * | 2/2023 | Baratta | E04F 21/244 |

FOREIGN PATENT DOCUMENTS

| | | | | |
|---|---|---|---|---|
| WO | WO-2007098364 A2 * | 8/2007 | | A47L 13/08 |
| WO | WO 2017/087577 | 5/2017 | | |

OTHER PUBLICATIONS

Hackworth, Joshua, Written Opinion of the International Searching Authority, Feb. 21, 2017, 8 pages, Australian Patent Office, Woden, ACT, Australia.

Wartmüller, Almut, Extended European Search Report, Jul. 17, 2019, 14 pages, European Patent Office, Munich, Germany.

* cited by examiner

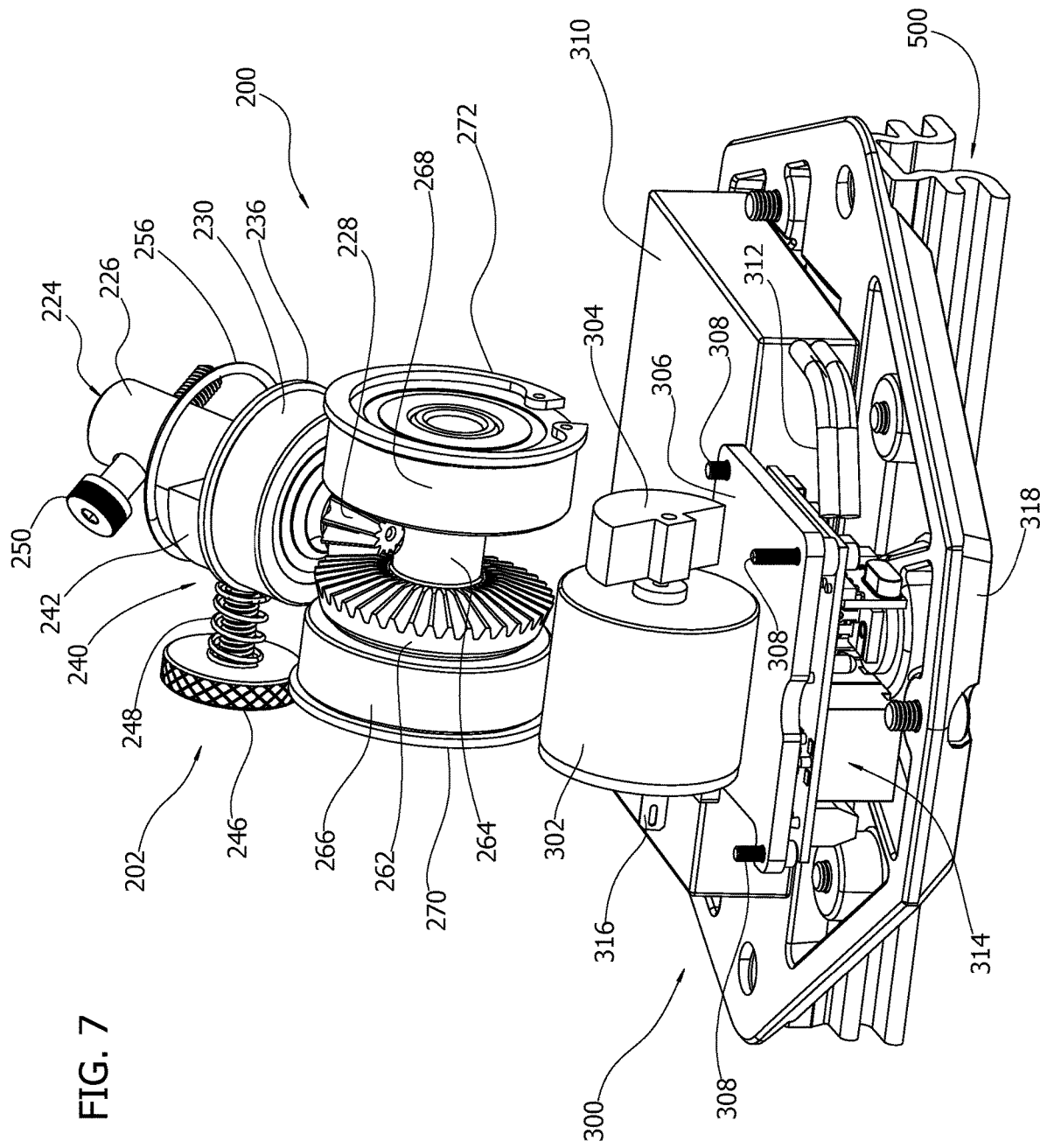

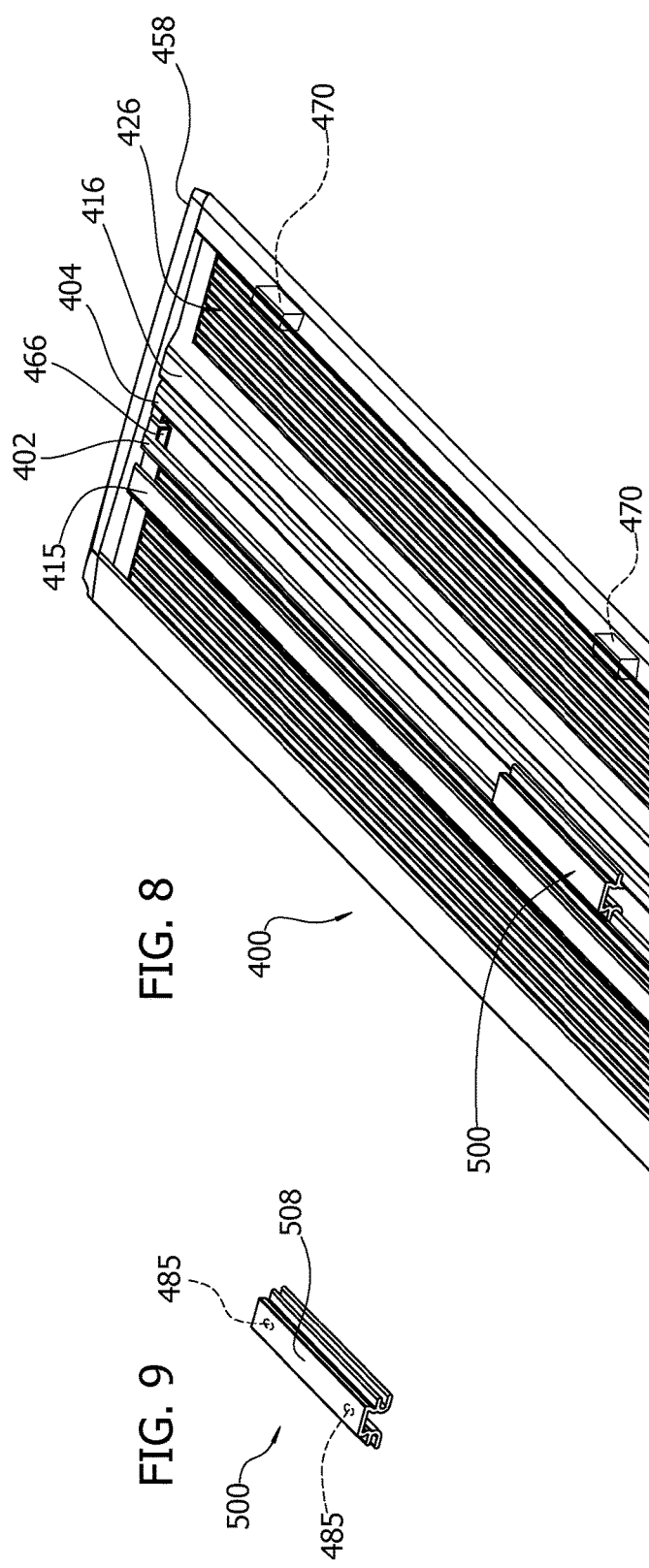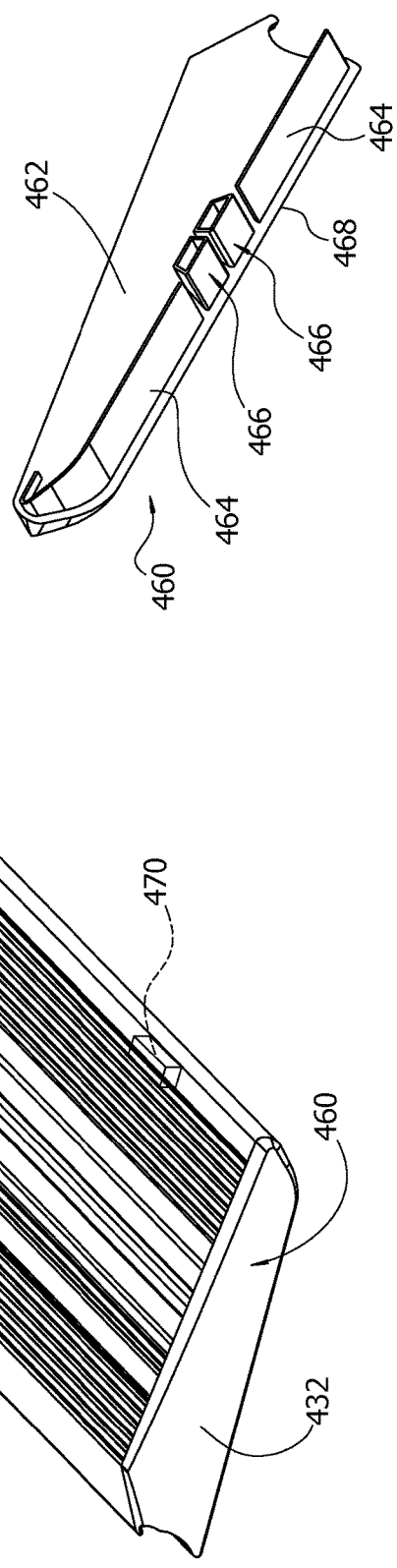

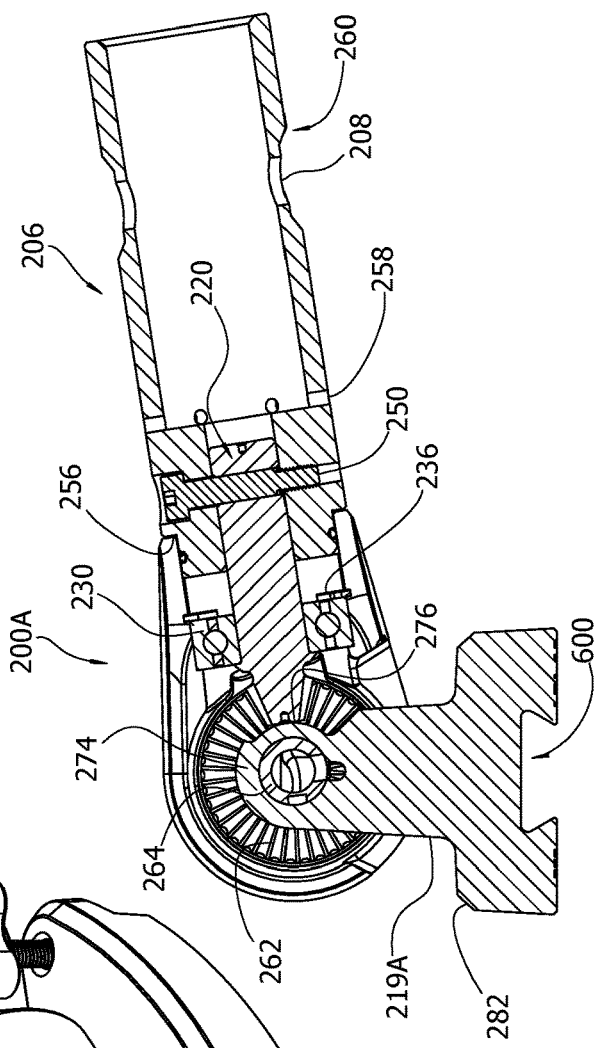
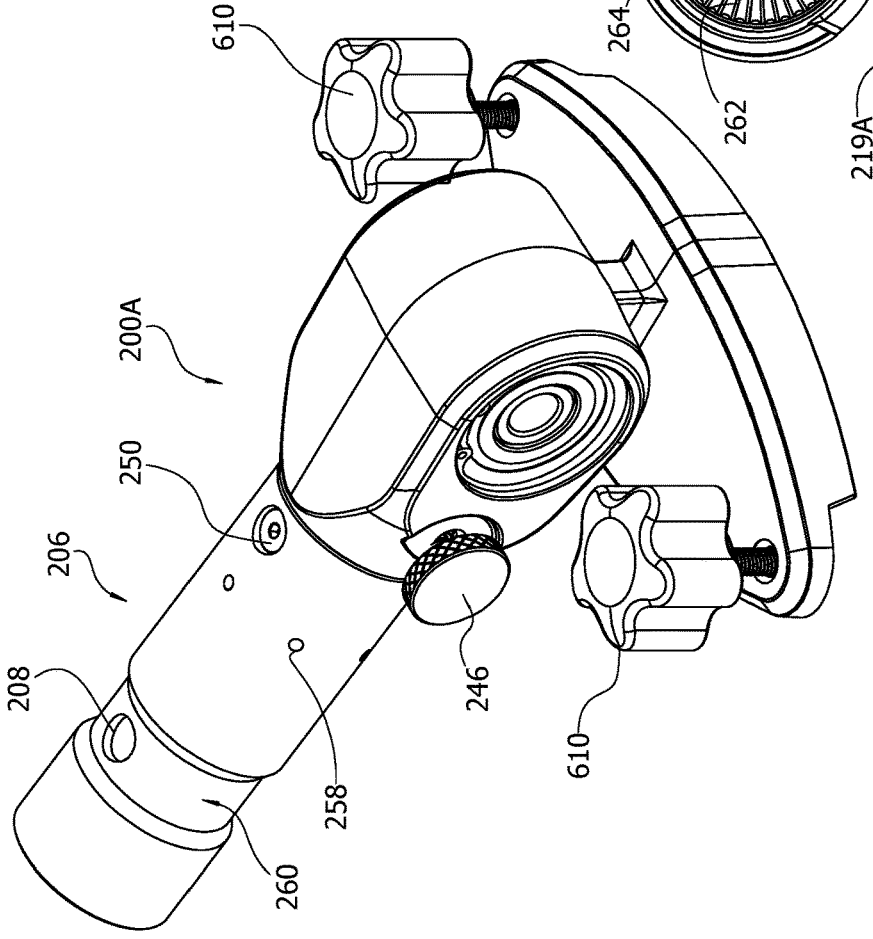
FIG. 11
FIG. 12

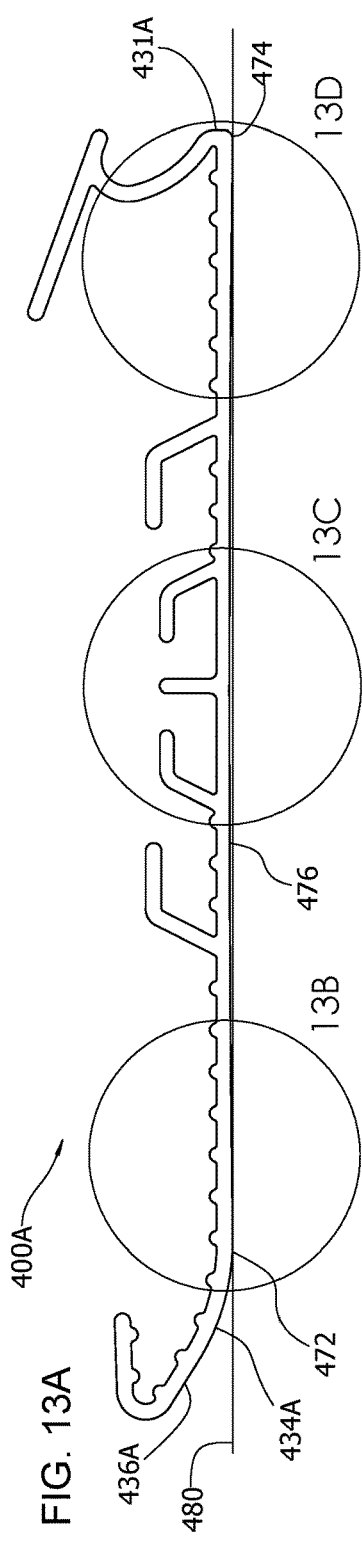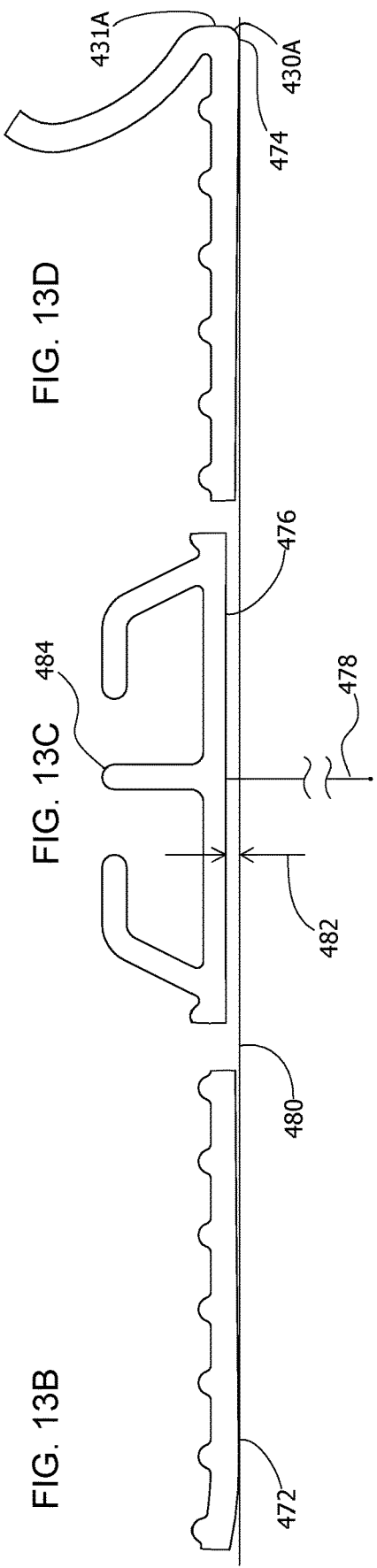

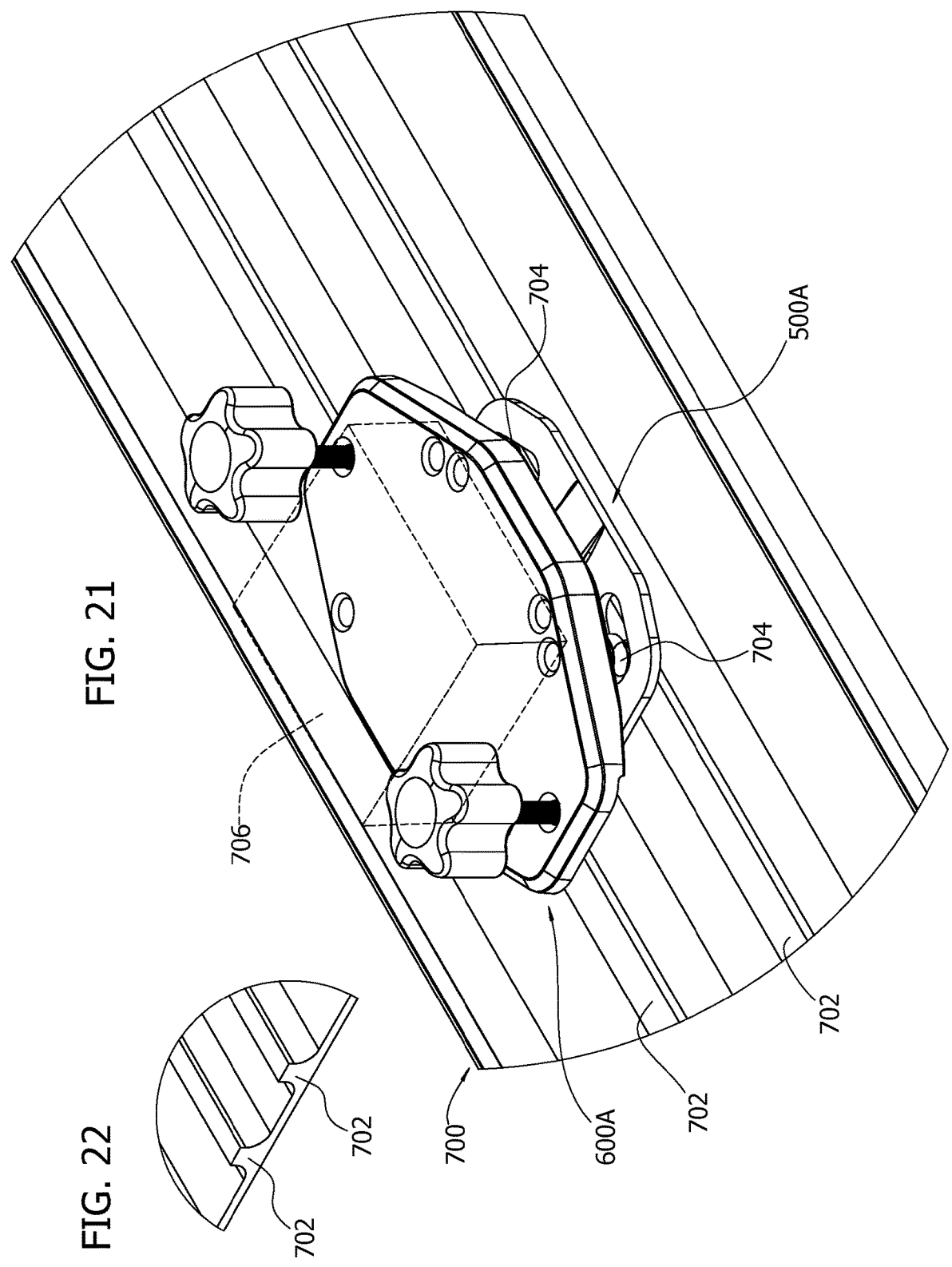

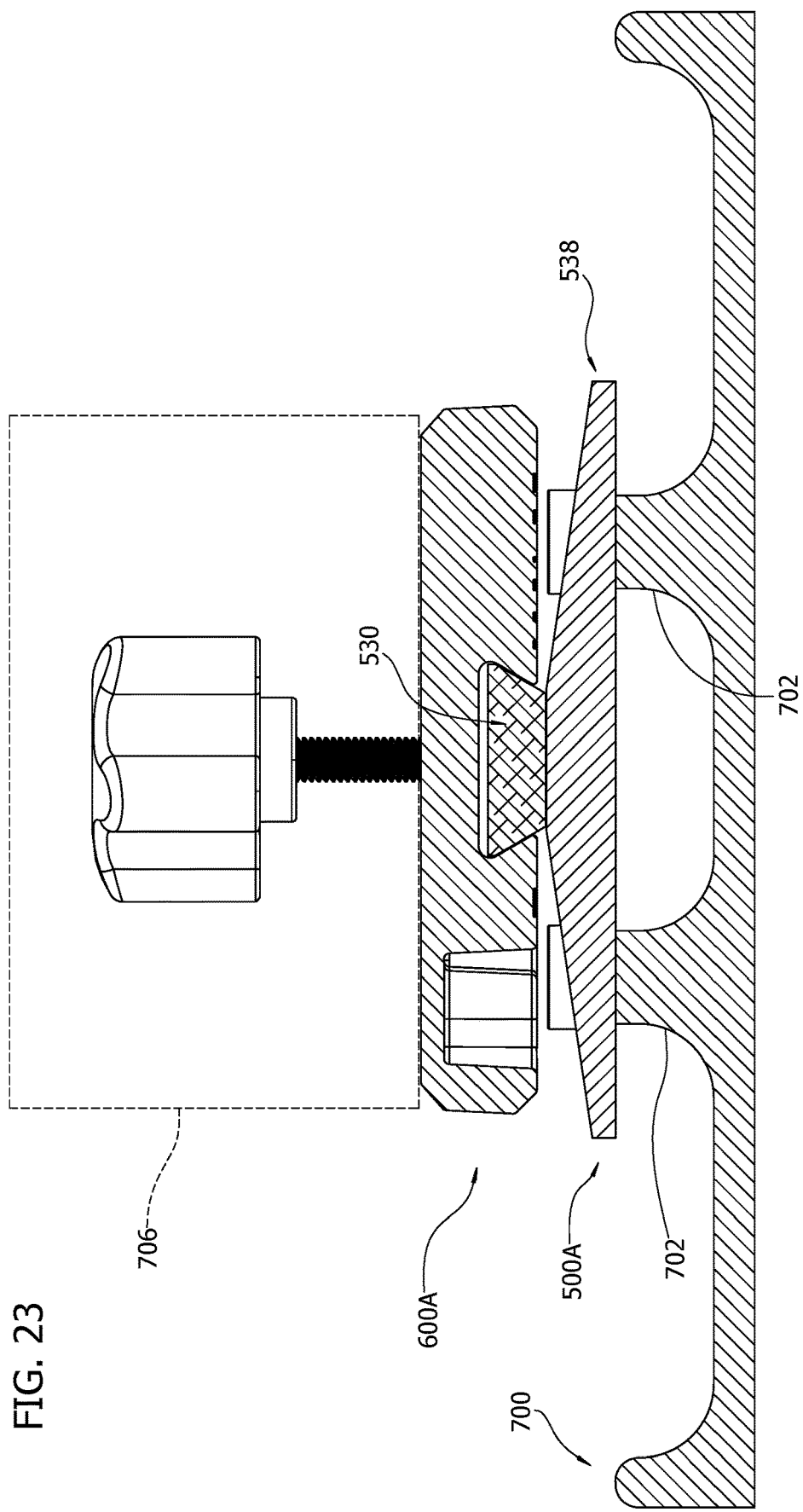

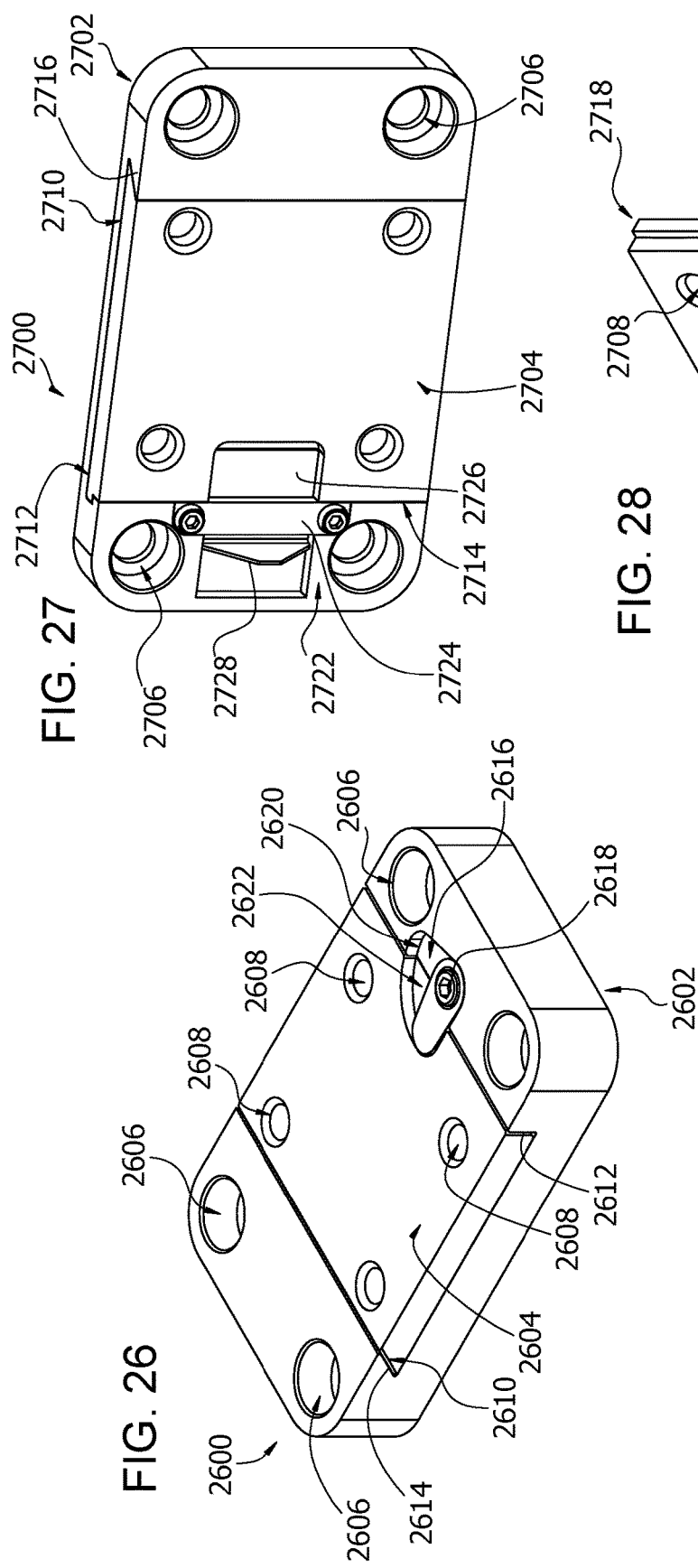
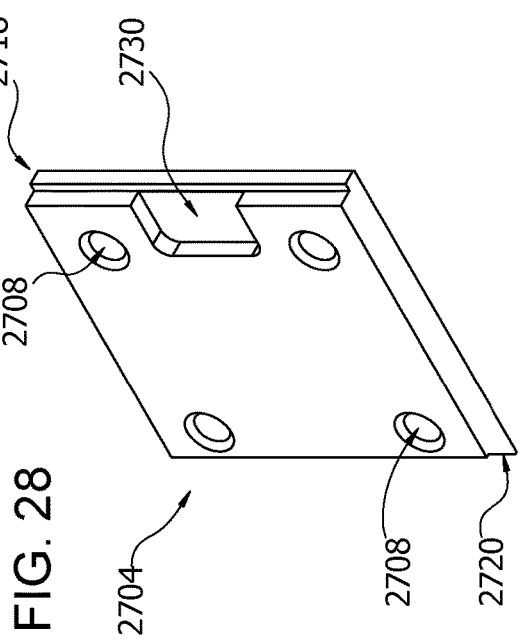

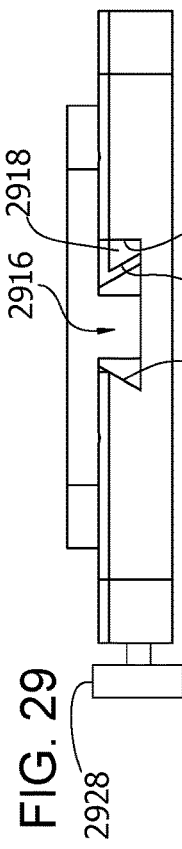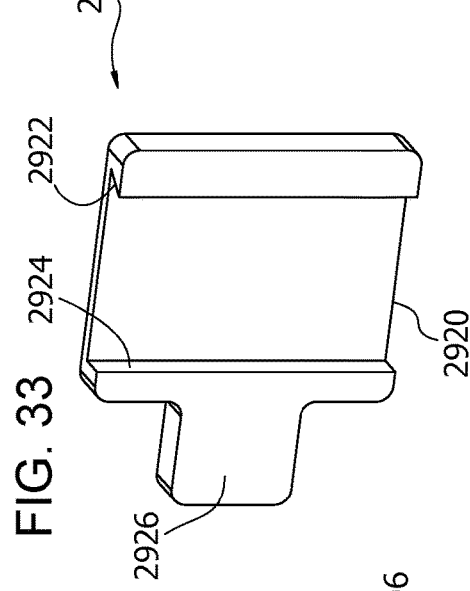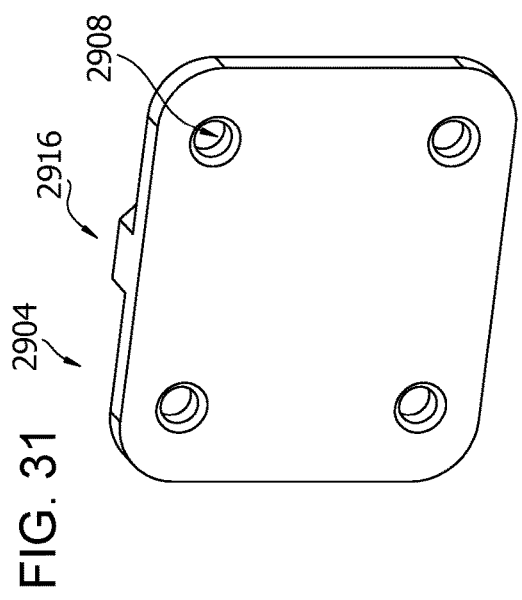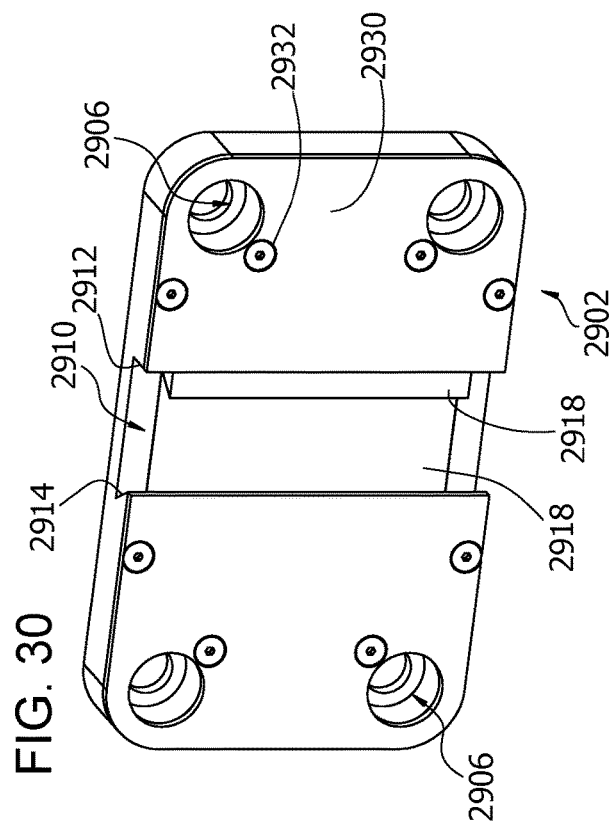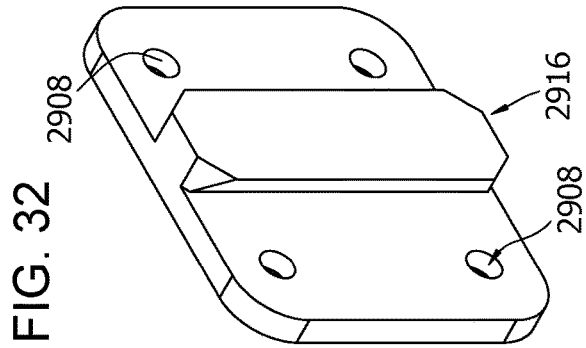

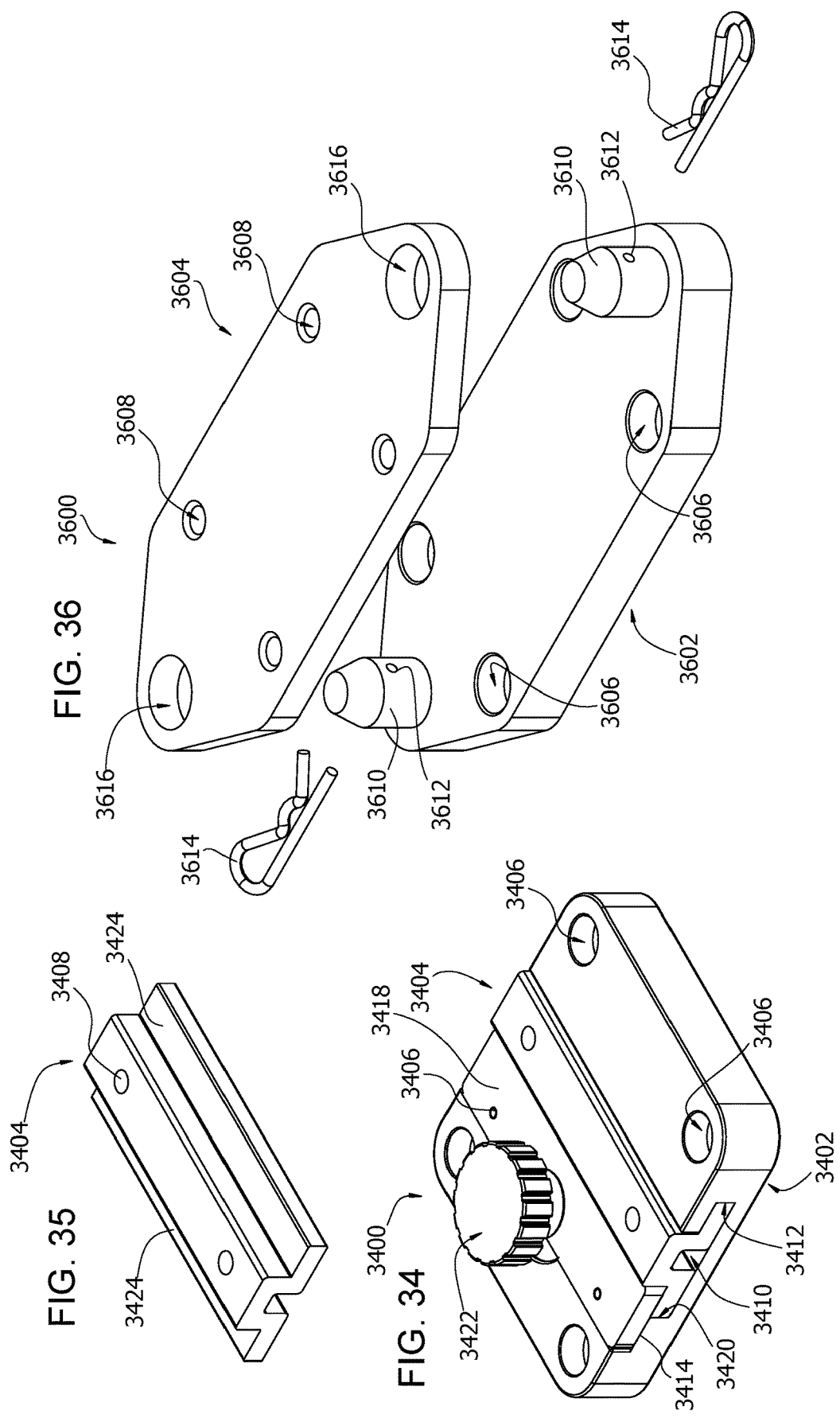

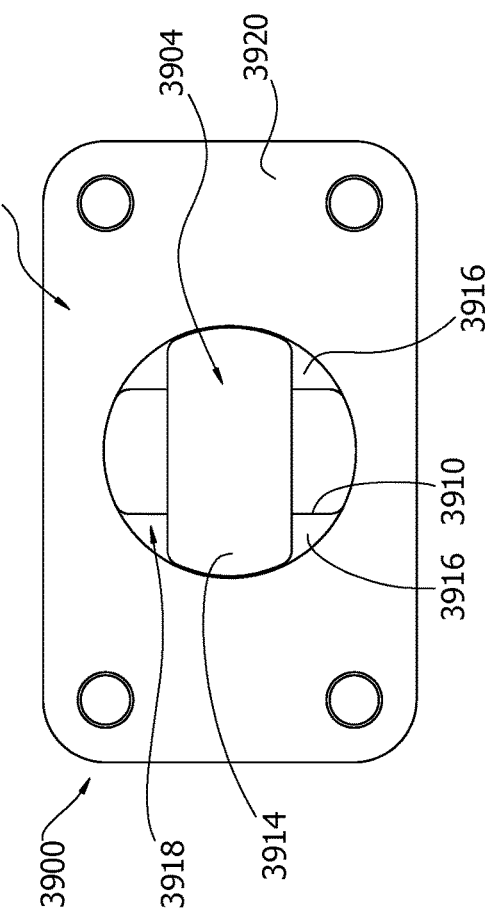
FIG. 39
FIG. 40
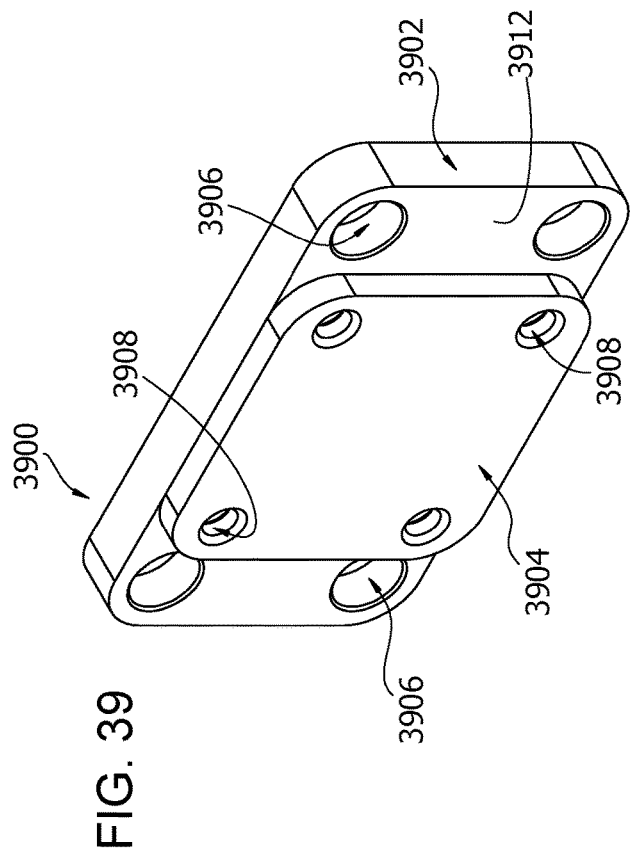
FIG. 37
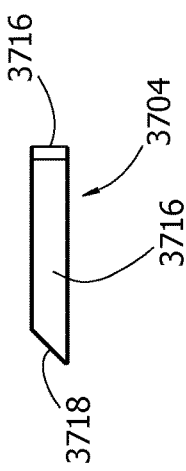
FIG. 38

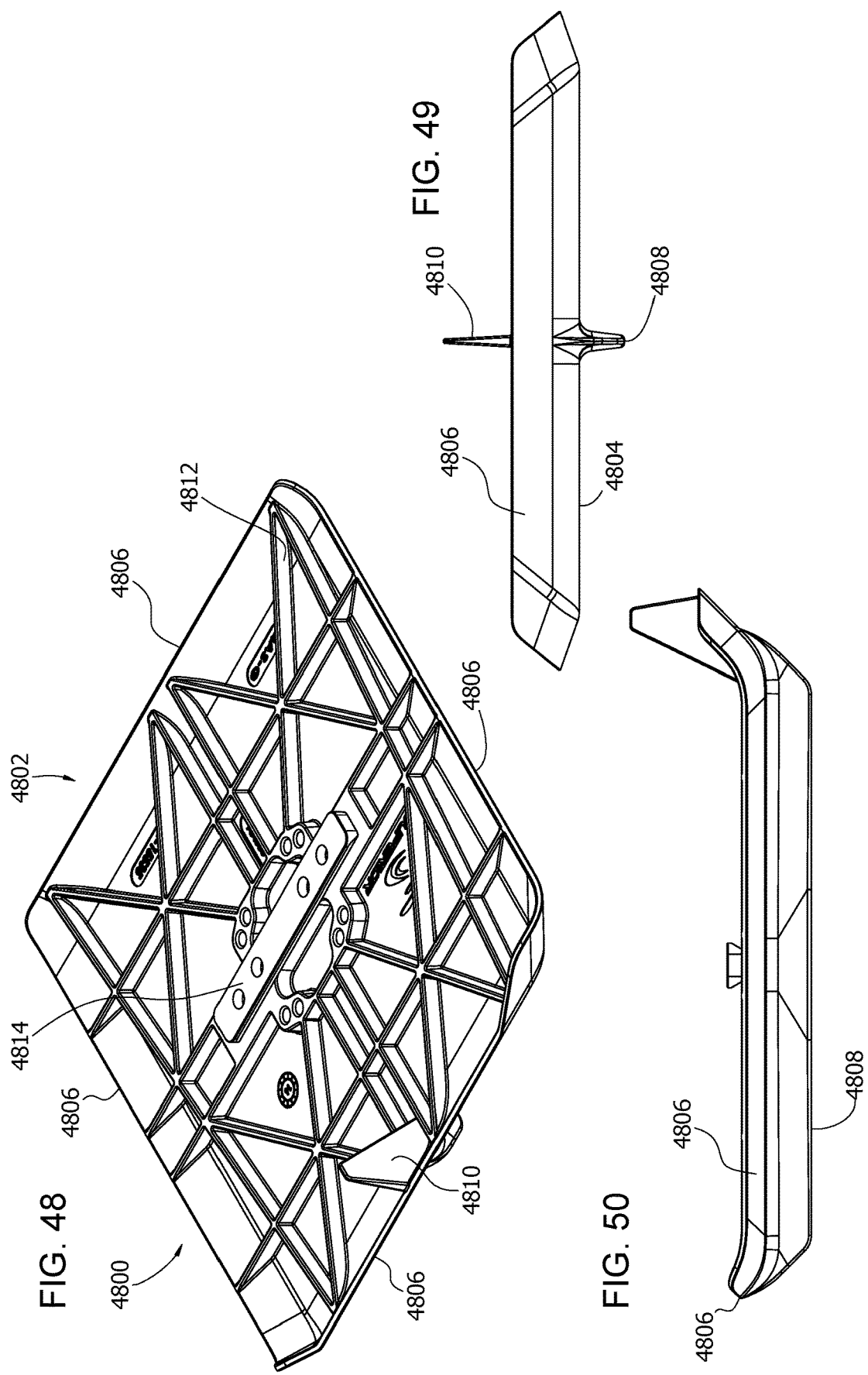

VIBRATION APPARATUS FOR CONCRETE FINISHING TOOLS AND METHODS

CROSS REFERENCE TO RELATED APPLICATIONS

This application is a continuation of U.S. Ser. No. 15/775,830, filed May 13, 2018, now U.S. Pat. No. 11,001,976 issued May 11, 2021, which is a National Stage of International Application No. PCT/US2016/062365, filed Nov. 16, 2016, which claims priority to provisional patent applications U.S. 62/256,030, filed Nov. 16, 2015, U.S. 62/289,241, filed Jan. 30, 2016, U.S. 62/289,904, filed Feb. 1, 2016, and U.S. 62/289,909, filed Feb. 1, 2016, the content of all of which are incorporated herein by reference.

BACKGROUND

Field

This relates to concrete floats, concrete float assemblies, adapters and interfaces for concrete floats, float vibration apparatus, groovers and methods relating to the foregoing.

SUMMARY

One example of a float vibration apparatus for a concrete float has a vibration generator positioned below a horizontal plane containing an axis used for pivoting the float apparatus. In one example, float vibration apparatus has a central axis below the pivot axis, and in another example, all of the components used to generate the vibration are located below the pivot axis. In another example, vibrations in a float vibration apparatus are generated at approximately 6000 RPM.

In another example of a pivot apparatus or a float apparatus, the pivot and/or float apparatus may include a user display, for displaying one or more parameters for the float apparatus. In one example where the float apparatus includes a vibration generator, the display can indicate frequency and/or amplitude of vibration, and in a battery-power unit, the display may also or alternatively be used to display battery level.

One example of an interface between a concrete finishing tool, for example a float or a groover and a pivoting arrangement or assembly for use with a concrete finishing tool, such as a float or a groover includes a quick attach/release mechanism. In some configurations, a quick attach/release mechanism or adapters therefore can be passive, and in other configurations the quick attach/release mechanism or adapters can be active. As used herein, "passive" shall mean that once a mechanism or adapters for attachment of a concrete finishing tool to a pivoting arrangement or assembly are aligned and ready to be secured, no manual action is required by the user to complete the securement. As used herein, "active" shall mean that once a mechanism or adapters for attachment of a concrete finishing tool to a pivoting arrangement or assembly are aligned and ready to be secured, manual action is required by the user to not only initiate but also complete the securement. Such active securement may include threading of fasteners, operation of a cam lock, insertion and securement of pins, insertion of cotter pins, placement and securement of latches, and the like.

In some configurations of a quick attach/release mechanism or adapters therefore, a longitudinally extending inter-engagement element, once positioned or aligned for final securement, may limit or may restrict or may prevent movement of the inter-engagement element in a plane parallel to the float or groover and at the same time limit or restrict or prevent movement of the inter-engagement element away from the float or groover (away from the plane parallel to the float or groover). Such limitation, restriction or prevention of movement may be accomplished by a number of mechanisms or configurations, including without limitation dovetail grooves, asymmetric surfaces, magnetic components, detents, bayonette mounts, over center structures, or the like. Such limitation, restriction or prevention of movement may be accomplished before securement or completely without securement of a fastener, lock, latch, slide, pin, or the like. In one example, a mechanism for quick attach/release may include a longitudinally extending inter-engagement element, which may for example engage one or more complimentary structures to help in assembling the float or groover and pivot assembly. The longitudinally extending inter-engagement element may be asymmetric relative to its longitudinal axis. In one configuration, the longitudinally extending inter-engagement element may be assembled by sliding the engagement element in a complementary component. In another configuration, the longitudinally extending inter-engagement element may be implemented by inserting the engagement element laterally followed by securing it laterally, for example by moving a complementary wall laterally to secure the engagement element in place.

In another example of an interface between a concrete float or groover and a pivoting assembly, the interface may be secured relative to an adjacent component by placing the interface under tension. In one example, the interface element is an inter-engaging element, interengaging with a complementary component, and the complementary component and interengaging element placed in tension, for example by way of a threaded fastener or fasteners, a cam arrangement, or other mechanism. In a further example, the complementary component and interengaging element may extend longitudinally with each other, and may engage with each other slidably. In one example, they may have a dovetail configuration, or other groove arrangement. With interengaging elements, structures or other configurations may be included to help in aligning interengaging elements for easier assembly, such as approach walls, chutes, or converging entrances.

In examples of pivot assemblies that may be used with concrete floats or groovers, a pivot assembly may include in one example a pole tube having one or more depressions, cavities or grooves for receiving a thumb or finger of a user for disengaging a detent for more easily removing a pole from the pole tube. In another example of a pivot assembly, the pivot assembly may include gears having approximately 3.5:1 gear ratio, or at least a 2:1 gear ratio, to allow moving the pivot assembly through its expected range of motion, for example by one full rotation of the pole, or less. With a 3.5:1 gear ratio, the pivot can move through its expected range of motion in approximately a quarter turn of the pole. In another example, the pivot assembly can include a display for showing status of one or more components of a float apparatus, for example a battery for a vibration apparatus.

In examples of adapters and interfaces for concrete tools, for example floats or groovers, adapters and interfaces may be used to allow any tool, for example a float or groover, to be mounted on any pivot assembly or vice versa. Additionally, adapters and interfaces may also be used to allow easy or quick attachment and/or release of a pivot assembly from a tool. Interfaces and adapters incorporating interfaces may be passive or active, and they may be configured such that once positioned or aligned for final securement, may limit or may restrict or may prevent movement of the adapter in a plane parallel to the float or groover and at the same time limit or restrict or prevent movement of the adapter away from the float or groover (away from a plane parallel to the float or groover). In one example, an interface includes first and second facing components where the first component is configured to be mounted, releasably or permanently, to a tool, and the second component is configured to be mounted, releasably or permanently to a pivot assembly, for example where the pivot assembly is a conventional pivot assembly used to manipulate and control the tool. In one configuration, the first component is configured to be secured to a tool, such as a float or groover, sufficiently to permit reliable maneuvering and holding of the tool on the pivot assembly during normal operation, and in some examples may include a distributed attachment structure. In one example, the distributed attachment structure may be a two point attachment configuration where the first component is to be secured to the tool at at least two and if desired more points, where the two or more points are supported relative to each other by a framework, a structural support for other means for supporting the tool through the first component. A three point attachment structure is sufficient to define a plane between the three points, which plane may include a planar or laterally extending plate for attaching to the tool, for example a float or groover, or a pyramid structure extending out of the plane between the three points or other geometry may be used to provide structure to the first component. In the examples illustrated herein, a four point attachment structure is used for the first component, in part because many conventional floats have existing four point attachment structures, and existing attachment configurations can be used to attach the first component to the float. The first component can include a planar or plate structure to be attached to the float, which planar or plate structure can provide the desired strength and reliability for the attachment. In one example of the first component, the first component can include a male inter-engagement structure for receiving a complementary female inter-engagement structure, and in another example of the first component, the first component can include a female inter-engagement structure for receiving a complementary male inter-engagement structure. Various means may be provided for securing the inter-engagement structures relative to each other. The first component can be any of the float or groover interfaces described herein, and the first component can be used with any of the second component structures described herein, including any of the pivot assembly interfaces described herein.

In one configuration of a second component that can be used with any of the first components or float or groover interfaces described herein, the second component is configured to be secured to a pivot assembly and/or vibration assembly sufficiently to permit reliable supporting and control of a float to be attached thereto, for example releasably attached. The second component can be any component that is configured to attach to pivot assemblies and/or vibration assemblies for use with concrete tools, for example concrete floats or groovers. In one example of a second component, the second component is one that can be attached, releasably or permanently, to a pivot assembly or vibration assembly for use with concrete floats or groovers, and which also includes a mounting structure that can be mounted into a complementary structure on a tool, for example a float or groover, such as a complementary structure on a first component or interface such as those described herein. Possible complementary structures may include a dovetail joint configuration, mortise and tendon joint configurations, a sandwich of planar components where the planar components are secured to each other by posts normal to the planar components and secured by pins, such as cotter pins, a cam plate and a follower plate assembled either laterally or in frontward or backward and secured by a pin, cover plate or other securement, the planar components are secured to each other by a cam lock arrangement, planar components having one or more asymmetric surfaces, magnetic attraction or latches, spring-loaded detent holding components, over center latching or hasp and post or boss holding components, bayonette mount, expandable plates with lock, crenellated or tooth structures facing each other and secured with a pin or other securement, and other complementary structures may include similar complementary geometries.

First and second components for use in coupling a pivot assembly or vibration assembly to a concrete tool, for example a float or a groover, can be used together, for example as a kit or assembly, for example an assembly that can be used to connect conventional concrete floats to conventional pivot assemblies or vibration assemblies. The first and second components can be interengaging or have interfaces that allow them to be coupled together so that the pivot assembly or vibration assembly can be used to support and control a concrete float attached to one of the first and second components. The first component can be configured to be mountable to the concrete float, and a second component can be configured to be mountable to the pivot assembly or vibration assembly. The first and second components can also be configured to provide a quick attachment and quick release capability for the assembly, to permit easy separation of the concrete float from the pivot assembly or vibration assembly.

Examples of concrete floats are also described. In one example, a concrete float extends longitudinally and includes a first longitudinally extending surface configured to contact a concrete surface and a second longitudinally extending surface configured to contact another portion of a concrete surface, and wherein the float includes between the first and second longitudinally extending surfaces a concave surface. In one configuration, when the first and second surfaces contact the respective portions of a concrete surface, portions of the concave surface are spaced apart from adjacent concrete surface portions, even though the concave surface portions may indirectly contact the adjacent concrete by moisture or cream that has formed on the surface of the concrete. In one configuration, a concrete float has only first and second longitudinally extending concrete contacting surfaces, and in other configurations a concrete float can have more than two longitudinally extending concrete contacting surfaces with respective concave surfaces between adjacent pairs of concrete contacting surfaces. In another configuration, the curvature of the concave surface may be symmetric between the first and second concrete contacting surfaces, for example so that the depth of the concave surface is greatest midway between the first and second concrete contacting surfaces, and in another configuration the curvature of the concave surface may be asymmetric between the first and second concrete contacting surfaces so that the depth of the concrete surface is greatest closer to one or the other of the first and second contacting surfaces. In a concrete float having more than two concrete contacting surfaces extending longitudinally and more than one concave surfaces, each concave surface may have a curvature identical to each other concave surface, or a curvature of one concave surface may be different from a curvature of another concave surface. In each of the foregoing configurations of a concrete float having a concave surface, one of the first and second longitudinally extending concrete contacting surfaces can be considered a proximal contacting surface and the other a distal contacting surface relative to the user, as the user pushes or pulls the float in a direction transverse to the longitudinally extending float.

In another example of a concrete float, a concrete float has first and second longitudinally extending concrete contacting surfaces, where the first contacting surface is a proximal contacting surface and the second contacting surface is a distal contacting surface. The proximal contacting surface is a surface on a float closer to the user when the float is being used relative to the distal contacting surface, which is on a portion of the float beyond the proximal contacting surface opposite the user. The distal contacting surface leads the proximal contacting surface when the float is pushed away from the user, and the proximal contacting surface leads the distal contacting surface when the float is pulled toward the user. The float further includes a concave surface between the proximal and distal contacting surfaces. The float further includes a proximal edge extending longitudinally adjacent the proximal contacting surface, and the proximal edge includes a rounded or radiused surface or could also be an edge with more of an angle than a radius with a wall extending upward and proximally to reduce the possibility of cutting into the concrete surface. The proximal edge can extend away from the concrete contacting surface a distance approximately equal to the material thickness of the float, or can extend away from the concrete contacting surface a distance greater than the material thickness of the float, for example a half inch or an inch or more. After the rounded or radiused surface or angled ramp surface, the proximal edge can extend in a direction perpendicular to the concrete or at an angle, either where the proximal edge extends in a straight line away from the concrete surface or along a curve, or a combination of straight and curved surfaces. The float may include a distal edge adjacent the distal contacting surface, and the distal edge may be a square edge, an angled edge, or a rounded or radiused edge, or may have other geometries. It is useful to have a distal edge configured to reduce the amount of upward creep of the cream along the surface of the distal edge, for example due to surface tension, and encourage the cream to shed from the distal edge onto the concrete surface.

Another example of an accessory for a concrete finishing tool includes a removable structure, for example an end cap, for a concrete float. The end cap is configured to be engageable directly with the float, and may have a weight and/or a geometry that can influence vibration in the float, for example that may be induced by a vibration source. The end cap may be formed from an engineered plastic, or from a rubber, silicone, or other desirable material.

Methods of finishing concrete, and procedures for assembling apparatus for finishing concrete can take a number of configurations. In one configuration, concrete is finished with a float having a bottom surface facing a concrete surface with a first surface contacting the concrete surface and a second surface contacting the concrete surface with a concave surface between the first and second surfaces. In one configuration, the concave surface extends laterally of the float. In another configuration, the float has a plurality of concave surfaces, and in one example each of the concave surfaces extends laterally of the float, and in another example, multiple concave surfaces are distributed over the float surface between concrete-contacting surfaces.

In another configuration, concrete is finished with a float having a bottom surface facing a concrete surface wherein the float is moved distally and proximally away from and toward a user, wherein the float includes a proximal edge having an upwardly extending surface extending away from the concrete surface and wherein the upwardly extending surface is either one of a curved surface or an angled surface extending at an angle from the concrete surface of at least 10°, and wherein the float includes a distal edge having an outwardly extending surface extending away from the concrete surface wherein the upwardly extending surface of the distal edge extends at an angle of at least 30° from the concrete surface. In one configuration, the outwardly extending surface of the distal edge extends at approximately 90° from the concrete surface. In one configuration, the float includes a concave surface between the proximal and distal edges and the concrete surface is finished with the float with a concave surface facing the concrete surface. In a further configuration, the concrete surface is finished with the proximal edge facing the user after pivoting the float 180° and after finishing the concrete with the proximal edge facing away from the user.

In another configuration, concrete is finished with a float with fluid nozzles on the float and wherein fluid is applied to the concrete surface. In one configuration, water is sprayed from nozzles on the float on to the concrete surface. In another configuration, concrete is finished with a float with a light source supported on the float.

In a further example of concrete finishing, apparatus for use in finishing concrete includes an interface component wherein a user combines a concrete finishing tool with a pivot assembly by moving the interface component laterally relative to the concrete finishing apparatus to combine the concrete finishing apparatus and the pivot assembly. In one example, the user moves the interface component approximately parallel to a plane of a finishing surface in the concrete finishing apparatus, for example a plane parallel to a bottom of a float. In one example, the user combines the concrete finishing apparatus and pivot assembly using a channel, a groove, a mortise and tendon configuration, a dovetail configuration, or similar engagement configurations.

In a further example of concrete finishing, apparatus for use in finishing concrete includes an interface component wherein a user combines a concrete finishing tool with a pivot assembly by using a passive securement. In one example, a user combines a concrete finishing tool with a pivot assembly by using one or more of a magnetic field, detents, a motorized securement, for example which may be activated by a user but where securement is completed by the motorized securement, or combinations of the foregoing. Combining a concrete finishing tool with a pivot assembly using a passive securement can be supplemented by additional securement methods, including but not limited to fasteners, latches, locks, cam locks, slide locks, clamps, pins, and the like. In any examples of interface components described herein, and interface component can be integral with a finishing tool or a pivot assembly, or can be removably attached in the form of an adapter or set of adapters.

In a further example of concrete finishing, a concrete finishing assembly includes a vibration apparatus with a central axis, and the assembly includes a pivot apparatus having a pivot axis, and wherein the pivot axis is positioned a first distance away from the working surface of a concrete finishing tool, for example the bottom of a float, and wherein the vibration central axis is a second distance away from the working surface less than the first distance. A user finishes the concrete with vibration generated from the vibration axis closer to the working surface of the concrete finishing tool. In the example of the first and second distances, the first and second distances are taken normal to the working surface. In one example, a vibration apparatus includes an eccentric lobe rotating on a shaft concentric with the central axis. In another example, the vibration apparatus is supported on the pivot distal of the pivot axis.

In a further example of concrete finishing, a concrete finishing assembly includes a concrete finishing tool supported on a pivot assembly wherein a user moves the concrete finishing tool range of angular motion by applying a quarter turn on a handle for the pivot assembly. In one example, a pivot gear assembly in the pivot assembly includes a gear ratio of at least 2:1, and in another example of 3.5:1.

These and other examples are set forth more fully below in conjunction with drawings, which are to scale, a brief description of which follows.

BRIEF DESCRIPTION OF THE DRAWINGS

FIG. 7 is an upper left front trimetric view of the assemblies of FIG. 2 showing selected components of the pivot assembly and selected components of the vibration assembly along with the interface.

FIG. 8 is an upper front right trimetric view of a concrete float assembly and interface that can be used with the assemblies of FIG. 1.

FIG. 9 is an upper trimetric view of an interface for use with the assemblies of FIGS. 1 and 8.

FIG. 10 is a lower front isometric view of an end cap for use with a float such as the float assembly of FIG. 8.

FIG. 11 is an upper right front isometric view of a pivot assembly of an alternative configuration.

FIG. 12 is a left side sagittal section view of the assembly of FIG. 11.

FIG. 13A is a side elevation view of an alternative concrete float having a concave bottom surface as viewed from the side.

FIG. 13B is a detail view of a leading portion of the float of FIG. 13A illustrating concavity.

FIG. 13C is a detail view of an intermediate portion of the float of FIG. 13A illustrating concavity exaggerated.

FIG. 13D is a detail view of a trailing portion of the float of FIG. 13A illustrating concavity.

FIG. 21 is a detail view of concrete float and interface assembly with a schematic of a pivot assembly for use in supporting and controlling the concrete float, for example where the float and the pivot assembly are conventional.

FIG. 22 is a detail view of a profile of the float of FIG. 21.

FIG. 23 is a transverse cross-section of the assembly of FIG. 21 showing an interface assembly that can be used to connect a concrete float and a pivot assembly, and it also provides quick attach and release capability.

FIG. 26 is an isometric view of another example of an interface for joining concrete finishing tools to pivot assemblies in the form of paired adapters that once aligned limit movement in the Y and Z planes before being manually secured.

FIG. 27 is a diametric view of another example of an interface for joining concrete finishing tools to pivot assemblies in the form of paired adapters that once aligned limit movement in the Y and Z planes before being manually secured.

FIG. 28 is an isometric view of an insert plate adapter for use with the assembly of FIG. 27.

FIG. 29 is a side elevation view of another example of an interface for joining concrete finishing tools to pivot assemblies in the form of paired adapters that once aligned limit movement in the Y and Z planes before being manually secured, for example by placing an adapter under tension.

FIG. 30 is a diametric view of one adapter of the assembly of FIG. 29.

FIG. 31 is a trimetric view of another adapter of the assembly of FIG. 29.

FIG. 32 is an isometric view of the adapter of FIG. 31.

FIG. 33 is a dimetric view of a securement mechanism of the assembly of FIG. 29.

FIG. 34 is an isometric view of another example of an interface for joining concrete finishing tools to pivot assemblies in the form of paired adapters that once aligned limit movement in the X, Y and Z planes before being manually secured.

FIG. 35 is an isometric view of an adapter in the assembly of FIG. 34.

FIG. 36 is an isometric view of another example of an interface for joining concrete finishing tools to pivot assemblies in the form of paired adapters that once aligned limit movement in the X and Y planes before being manually secured.

FIG. 37 is an upper isometric view of another example of an interface for joining concrete finishing tools to pivot assemblies in the form of paired adapters that once aligned limit movement in the X, Y and Z planes before being manually secured.

FIG. 38 is an end elevation view of an adapter used in the assembly of FIG. 37.

FIG. 39 is an isometric view of another example of an interface for joining concrete finishing tools to pivot assemblies in the form of paired adapters that once aligned limit movement in the X, Y and Z planes, in the form of a twist mount.

FIG. 40 is a bottom plan view of the assembly of FIG. 39.

FIG. 48 is an upper isometric view of a concrete finishing tool in the form of a groover having an interface for joining with a pivot assembly.

FIG. 49 is a front elevation view of the groover of FIG. 48.

FIG. 50 is a side elevation view of the groover of FIG. 48.

DETAILED DESCRIPTION

Figure 1:
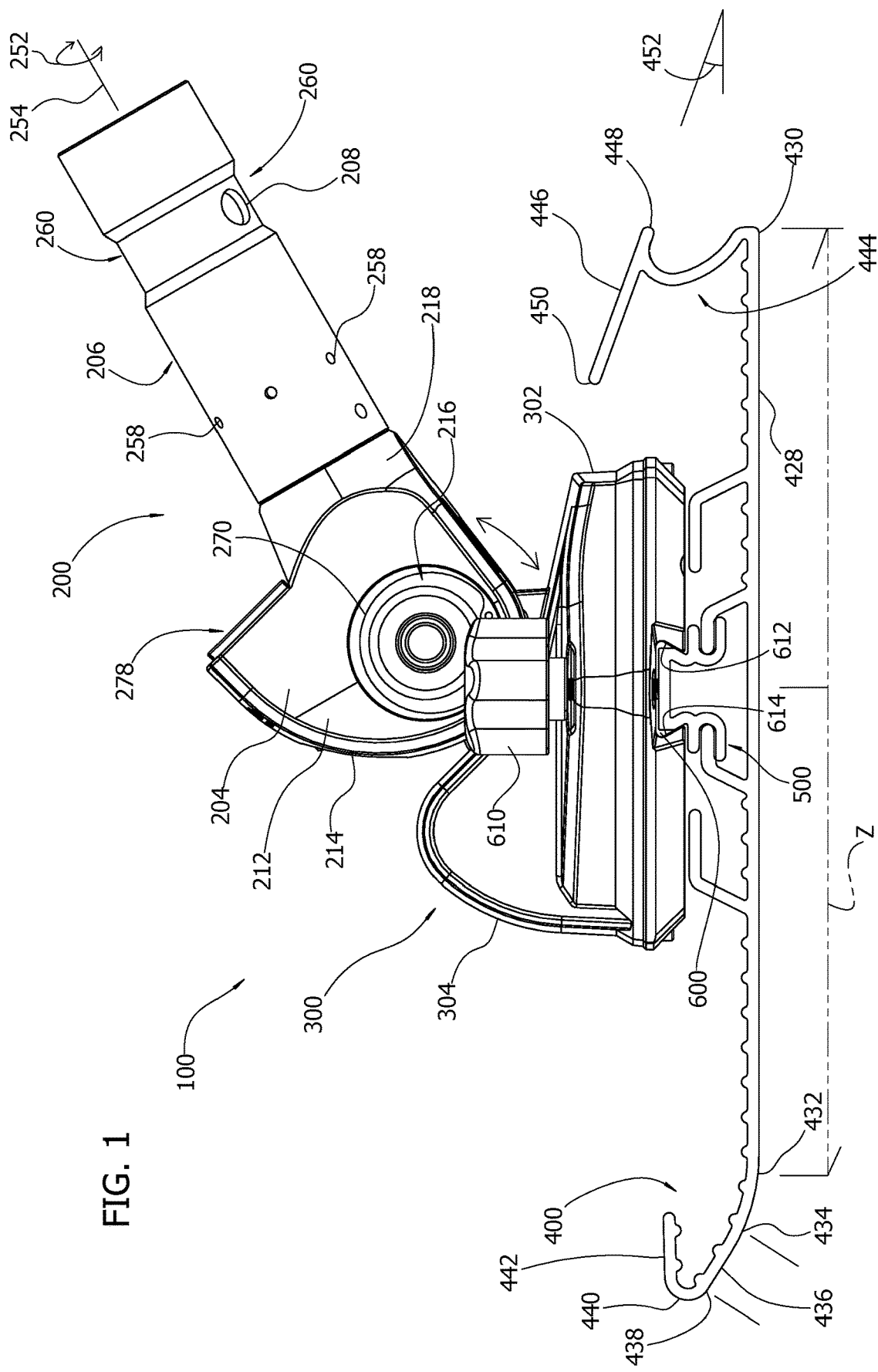
FIG. 1 is a side elevation view of an assembly of a concrete float, a pivot assembly for the concrete float and a vibration assembly for the concrete float along with an interface between the assemblies and the float.
Figure 2:
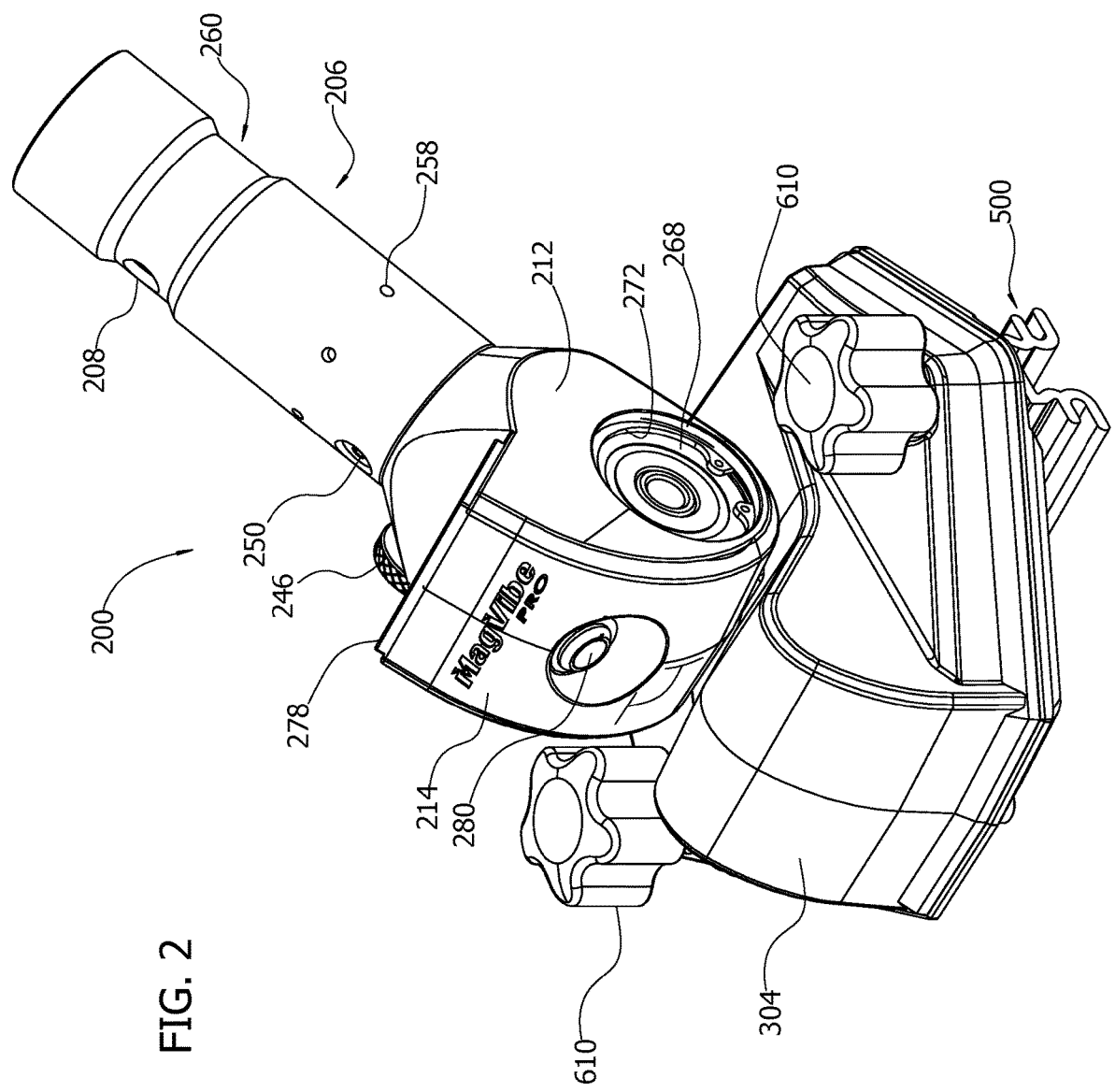
FIG. 2 is an upper left front isometric view of the pivot and vibration assemblies of FIG. 1 for the concrete float and the interface.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of concrete tools and accessories, including floats and groovers and assemblies and components therefor, and of methods of making and using the concrete floats, groovers and assemblies and components therefor are described. Depending on what feature or features are incorporated in a given structure or a given method, benefits can be achieved in the structure or the method. For example, concrete floats and assemblies and components therefor using high-frequency vibration for finishing concrete, in contrast to pre-finishing concrete as is done with a screed, improves the finish of the concrete, and may reduce the amount of time required for finishing. They may also allow the equipment to be more easily used, and simplify the assembly and disassembly of the equipment before and after a project. Additionally, some configurations may also benefit from lighter-weight components, lower-cost and reduced wear.

Concrete floats may also be provided with improved finishing surfaces, for example by extending the portion of the float having a flat surface for contacting the concrete surface, by configuring the bottom surface as concave with multiple contact surfaces, and by making easier reversal of the float on its pivot. They may also be provided with structural profiles that can make it easier to finish a job without having to change tools.

In some configurations of concrete tools and assemblies therefor, for example floats and groovers, improvements can be achieved also in adaptability for use on more than one tool or tool configuration, for example floats and groovers, different float configurations, and the like, including through use of quick attach and quick release configurations. Therefore, if a user of an alternative float wants to use the pivot and/or vibration assemblies described herein with a conventional float or a groover, the user can do so easily with a simple adapter configured for the particular float profile or groover. If a user of an alternative pivot and/or vibration assembly wants to use a float assembly or groover such as those described herein with the conventional pivot and/or vibration assembly, the user can do so easily with a simple adapter configured for the pivot and/or vibration assembly.

Improvements are also provided to components with which the concrete tools and assemblies therefor may be used, such as floats and groovers. For example, mounting or interface between the assemblies and a concrete tool may be simplified and/or made more reliable and easier to use. In another example, operation of a handle for the tilt assembly is made easier, and removal of the handle is also made easier.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the concrete floats and groovers and assemblies therefor are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

As used herein, "substantially" and "approximately" shall mean the designated parameter or configuration, plus or minus 10%. However, it should be understood that terminology used for orientation or relative position, such as front, rear, side, left and right, upper and lower, and the like, are used herein merely for ease of understanding and reference, and are not used as exclusive terms for the structures being described and illustrated.

A concrete finishing apparatus 100 (FIG. 1) can include a number of sub-assemblies and components, which can be used together or separately in combination with other sub-assemblies and components. In the present example, the concrete finishing apparatus 100 is used to finish concrete, for example after pre-finishing steps. In one illustrative example, the concrete finishing assembly 100 includes a pivot assembly 200, a vibration assembly 300, a concrete float 400 and an interface component or assembly 500 and/or 600. Concrete finishing can be carried out using a different float, a different vibration assembly, a different tool, and/or a different pivoting assembly than illustrated herein, as desired, and any of the assemblies, and components thereof and interface component can be used with other devices for finishing concrete, for example with modifications that may be desirable.

The pivot assembly 200 (FIGS. 1-7) in the illustrated examples includes a pivot mechanism 202 (shown partially in FIG. 7) within a suitable housing 204 and a pole tube 206 for releasably receiving a suitable pole (not shown) for operating the concrete finishing apparatus. A suitable pole will be identical or similar to conventional poles having detents for locking the pole on to the tube 206, for example through a pair of oppositely-facing, or diametrically opposed, detent openings 208.

The pivot assembly 200 can be housed in a number of housing configurations, but in the present example the housing 204 includes right and left side plates 210 and 212 and a curved front face 214, allowing the pivot assembly to pivot relative to adjacent components. The housing includes respective side openings, the left one 216 of which is shown in the drawings, which allow insertion, access to and removal of one or more components of the pivot mechanism, described more fully below. The housing also includes a cylindrical wall 218 defining a bore for receiving and supporting portions of the pivot mechanism and part of the pole tube 206, also as described more fully below.

The pivot assembly also includes a support structure for supporting the pivot assembly and a float relative to each other. In the present example, the support structure takes the form of a housing structure 219 extending into and forming part of the vibration assembly 300. In other examples, the support structure can be a simple frame, another housing structure for other components, a post and plate for engaging the interface component 500 with concrete float 400 (see for example FIG. 11-12), or other structures. The pivot assembly 200 is configured so that the housing 204 and the support structure can pivot relative to each other, thereby having the tool, for example the float, and the pivot housing pivot relative to each other.

The pivot mechanism 202 (FIGS. 6-7) permits the tool, for example in the illustrated configuration, the concrete float 400 and the pivot housing 204 to pivot relative to each other, and thereby the handle used by the operator and the concrete float to pivot relative to each other. The pivot mechanism 202 includes a drive portion 220 (FIG. 6) and a driven portion 222 for carrying out the pivoting motion. The drive portion 220 includes a drive gear 224 having a cylindrical shaft 226 (FIG. 7) and a bevel gear portion 228. The cylindrical shaft is supported in the cylindrical bore by a bearing assembly 230 seated in a counterbore of the cylindrical bore of the housing 218 (FIG. 1) against a shoulder 232 at an end of the counterbore. The bearing assembly 230 holds the cylindrical shaft 226 in place by bearing against a shoulder 234 on the cylindrical shaft. The bearing assembly is held in place against the shoulder 232 in the counterbore by a retaining ring 236 positioned in a groove formed in the bore of the cylindrical wall 218. The bearing assembly 230 allows easy pivoting of the drive gear 224. The gears have a gear ratio of at least 2:1, and the illustrated example has a gear ratio of 3.5:1, though a 1:1 gear ratio can be used also, as well as other gear ratios. A 3.5:1 gear ratio allows a quarter turn of the handle to pivot the assembly through its intended range of motion, in the illustrated example less than 90 degrees, and about 50 degrees, such as between plus 30 degrees and minus 20 degrees.

A tensioning assembly is included in the present pivot assembly. The tensioning assembly can take a number of configurations, but in the present example, the tensioning assembly 240 includes a semicircular brake or friction element 242 extending around and contacting a half circle of a shaft of the drive gear 224, and extending axially of the drive gear shaft the desired distance. The friction element 242 includes a boss extending within the diameter of the retaining ring 236. The tensioning assembly also includes a threaded bolt such as a thumb bolt 246 threaded into a complementary threaded opening in the cylindrical housing 218 so that a distal end of the threaded bolt contacts and urges the friction element 242 against the shaft of the drive gear. A coil spring 248 inhibits the bolt from backing out of the threaded opening.

The pole tube 206 is releasably mounted into the bore of the cylindrical housing 218. The pole tube is secured to the drive gear shaft 226 by a threaded fastener 250, passing through one side of the pole tube, through a corresponding opening in the drive gear shaft and threaded into a complementary threaded portion in an opposite side of the pole tube (see also FIG. 12). The bolt 250 secures the pole tube 206 to the cylindrical shaft 226 of the drive gear. As an operator pivots a pole inserted into pole tube 206 about a central axis 254 (FIG. 1) and when the pole is secured such as by way of detents in the detent openings 208, the cylindrical shaft of the drive gear pivots to the same extent.

The pole tube 206 includes an O-ring seal 256 for sealing between an outside surface of the pole tube and an inside surface of the bore of the cylindrical housing 218, to limit moisture getting into the interior of the housing. In the present example, the pole tube also includes a plurality of drain holes 258, allowing water to drain from inside the pole tube. In an alternative configuration (not shown), the O-ring seal 256 and adjacent 20) structure of the pole tube 206 is replaced by a sealed bearing for supporting the pole tube in the housing 218.

In the illustrated example, the pole tube includes grooves or depressions 260 formed in the external surface of the pole tube surrounding the detent openings 208. The depressions 260 make easier the release of the detent buttons from the detent openings 208 for releasing the pole from the pole tube. In the present example, the depressions 260 are formed as a circumferentially extending groove centered over the detent openings and extending axially away from the openings a convenient distance for allowing the user to more easily depress the detent buttons.

The driven portion 222 of the pivot assembly includes a driven bevel gear 262 engaging the drive bevel gear 228. The driven bevel gear 262 is supported on a transversely-extending shaft 264 and non-rotatably fixed thereto, so that movement of the driven bevel gear 262 by the drive bevel gear 228 pivots the shaft within the pivot assembly housing 204. The shaft is fixed to the support structure 219 so that the pivoting of the driven bevel gear moves the support structure supporting the concrete float 400. The shaft is supported in the pivot housing 204 for pivoting relative to the housing by a pair of oppositely disposed bearing assemblies 266 and 268 secured in place within openings in the pivot housing by respective retaining rings 270 and 272.

The shaft is also supported in the pivot housing and fixed to a collar 274, approximately centered between the bearing assemblies 266 and 268, and on an axis approximately intersecting an axis of the driving gear 224. The collar 274 includes a recessed arcuate surface 276 (FIG. 6) over which the end surface of the frustoconical driving gear 228 travels as the gear teeth travel over the mating driven bevel gear 262. The concave surfaces at the opposite ends of the recessed arcuate surface 276 help to limit the travel of the drive gear relative to the driven gear.

In the present example, at least one of the assemblies includes a display for indicating one or more status conditions for the assembly. In the illustrative configurations, a display 278 is secured in an upper portion of the pivot housing so as to be visible to a user holding a pole to which the assembly is mounted, or standing nearby. In the present example, the display indicates a battery or other power or charge condition, for example charge level. The display is coupled through appropriate conductors to an electronics package associated with a battery, described more fully below.

Also in the present example, at least one of the assemblies includes a power switch or other actuator for turning on and off one or more electronic devices in one or more of the assemblies. In the present example, an on-off switch 280 is supported in the pivot housing 204 and accessible for manual activation, for example to activate the electronics, as described more fully below, to illuminate the display 278, to start the vibration generator, or for other desired purposes. The switch is coupled through appropriate conductors to the electronics package associated with the battery, described more fully below. In other configurations, one or both of the display and on-off switch can be positioned on other components of the concrete finishing assembly, for example the vibration assembly 300. In another example, the on-off function can be accomplished, additionally or alternatively, remotely through a remote control (not shown) such as through a Bluetooth wireless or other remote control. The remote signal can be transmitted to an antenna within the housing of the vibration assembly coupled to the internal electronics, or to an antenna extending external to the housing and coupled through an opening or similar access to the electronics within the housing.

In another example of a pivot assembly, a pivot assembly 200A (FIGS. 11-12) is supported by a solid support structure 219A extending in the present example substantially straight from the collar 274 to a base structure 282. The base structure 282 is substantially solid where the support 219A joins the base structure. The remainder of the pivot assembly 200A outboard of the support 219A and below the support structure 282 can take a number of configurations, for example as may be determined by the desired configurations for mounting to a float 400, whether or not other assemblies, such as vibration assemblies, controller sensing assemblies, and the like, are included. Other components shown in FIGS. 11-12 having the same reference numerals as applied to components in other Figures herein have the same or similar structures and functions as described herein.

The vibration assembly 300 can be placed in a number of locations on the concrete finishing apparatus. In the illustrated example, the vibration assembly 300 is incorporated into the support structure that includes support 219 for the pivot assembly 200. Incorporation into the support structure provides desirable transmission of the generated vibrations to the float through the interface component 500. Additionally, incorporating in the present example the vibration generator, electronics and battery assembly into the same structure and incorporated into the support structure contributes to a low center of mass for the apparatus and easier control by the user.

In the present example, the vibration assembly 300 includes a vibration generator 302. The vibration generator 302 is oriented to have a central rotation axis extending transversely of the assembly, and also transverse to the central axis 254 of the pole tube (FIG. 1). The central rotation axis will also be parallel to the length or longitudinal extent of the float 400.

The vibration generator 302 is an electric motor with an eccentric lobe or weight 304 mounted to the shaft for rotation about the central rotation axis. In the present example, the eccentric weight rotates at approximately 6000 RPM, and in one configuration between approximately 5700 and approximately 6700 RPM, and in another configuration between 5700 and 6700 RPM plus or minus 200 RPM.

The vibration generator is secured in position in a cavity in a vibration assembly housing 304 by a closure or positioning plate 306 (FIGS. 6-7) by fasteners 308 threaded into threaded openings in the housing 304. Alternatively or additionally, the generator can be secured in place in the housing 304 by suitable bearing or surrounding structures bearing against or surrounding surfaces of the generator sufficient to secure the generator in place, for example during normal operation and running of the generator. The generator is driven by battery power from a battery pack 310 by way of conductors 312 to an electronics assembly 314 under the positioning plate 306 and conductors (not shown) from the electronics assembly through a cavity in the positioning plate 306 to contacts 316 on the generator. Activating the switch 280 starts the vibration generator. The components of the vibration assembly are enclosed within housing 304 by a closure or combination closure and base plate 318 and secured in position by appropriate surfaces on the interior of the closure plate. The exterior surface of the closure plate can take a number of configurations, but in the present examples includes a profile to help in mounting the pivot assembly and/or vibration assembly to a concrete float, described more fully below.

Figure 5:
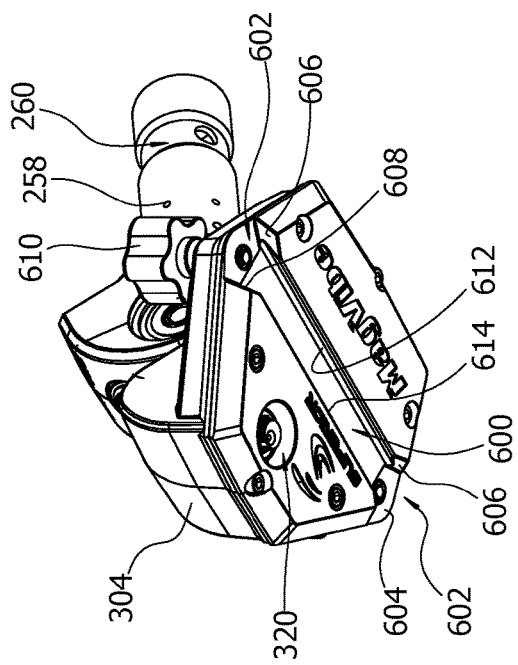
FIG. 5 is a lower left isometric view of the pivot and vibration assemblies of FIG. 1.
Figure 3:
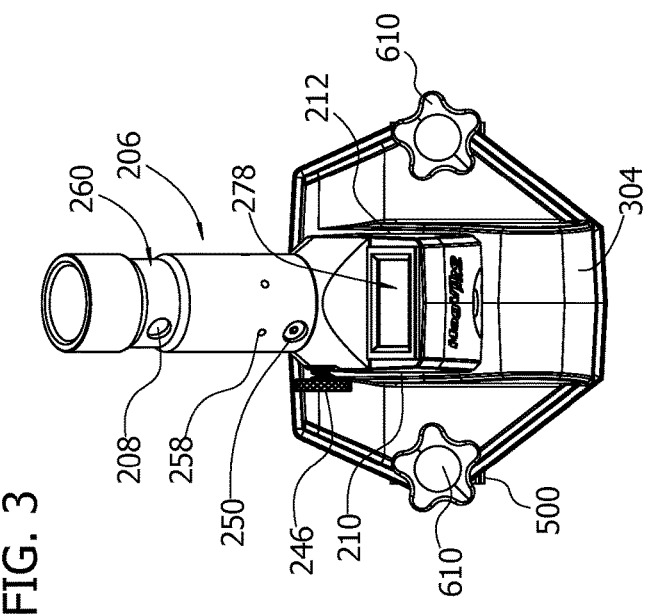
FIG. 3 is a top plan view of the assemblies of FIG. 1 without the float.
Figure 4:
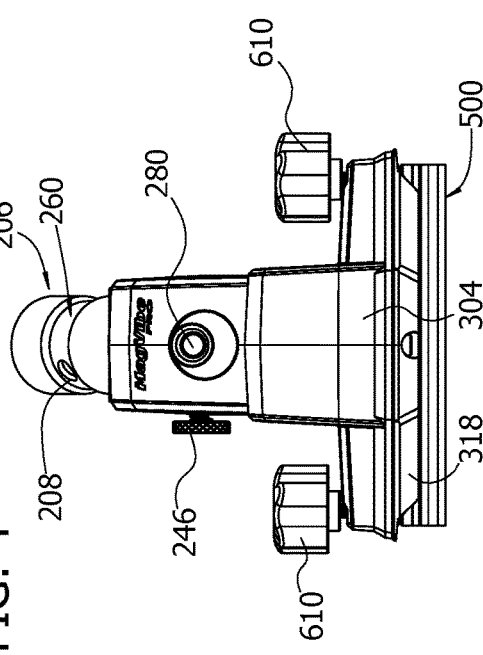
FIG. 4 is a front elevation view of the assemblies of FIG. 1 without the float.
Figure 6:
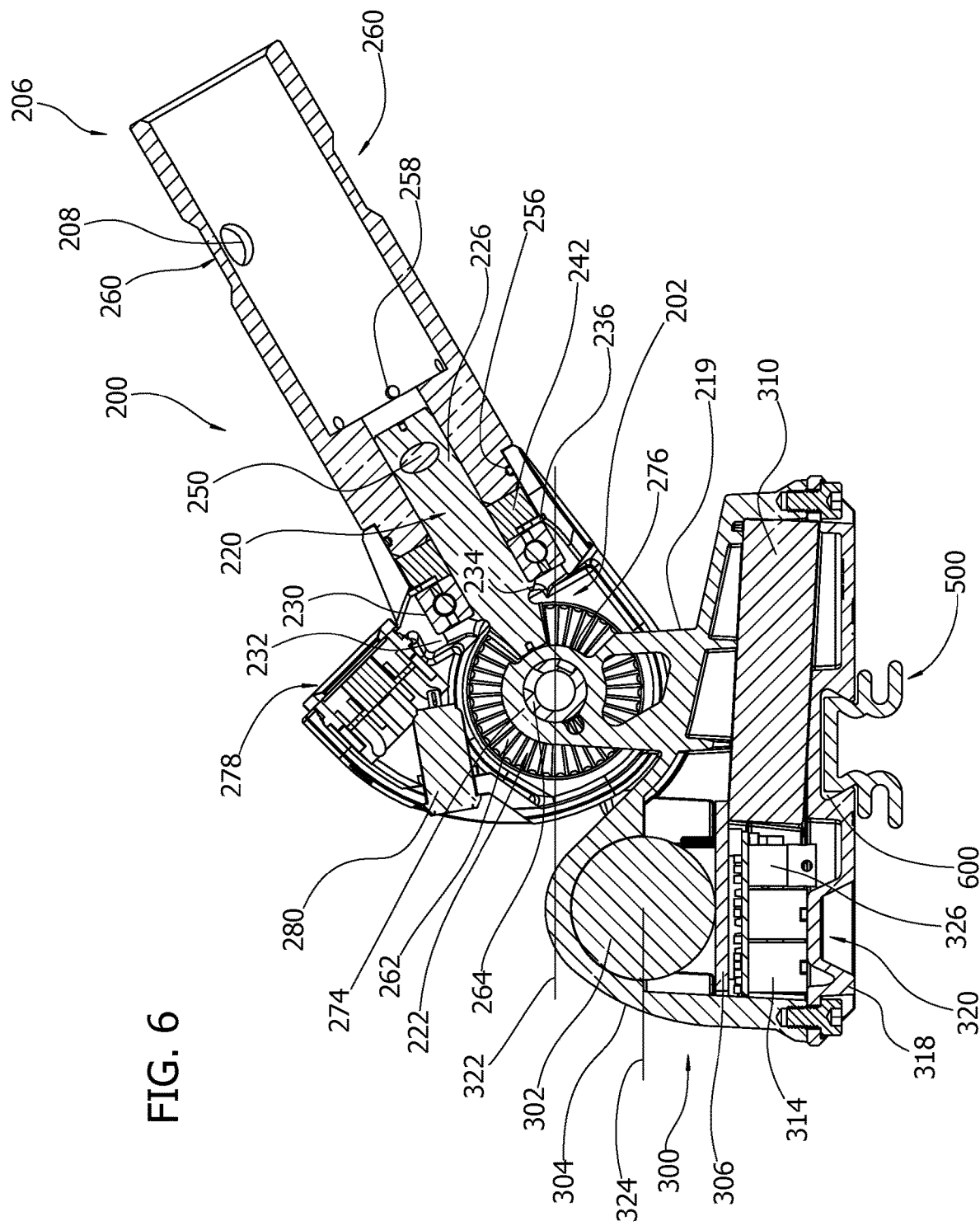
FIG. 6 is a left side view of a sagittal section of the pivot and vibration assemblies and interface of FIG. 1.
Figure 14:
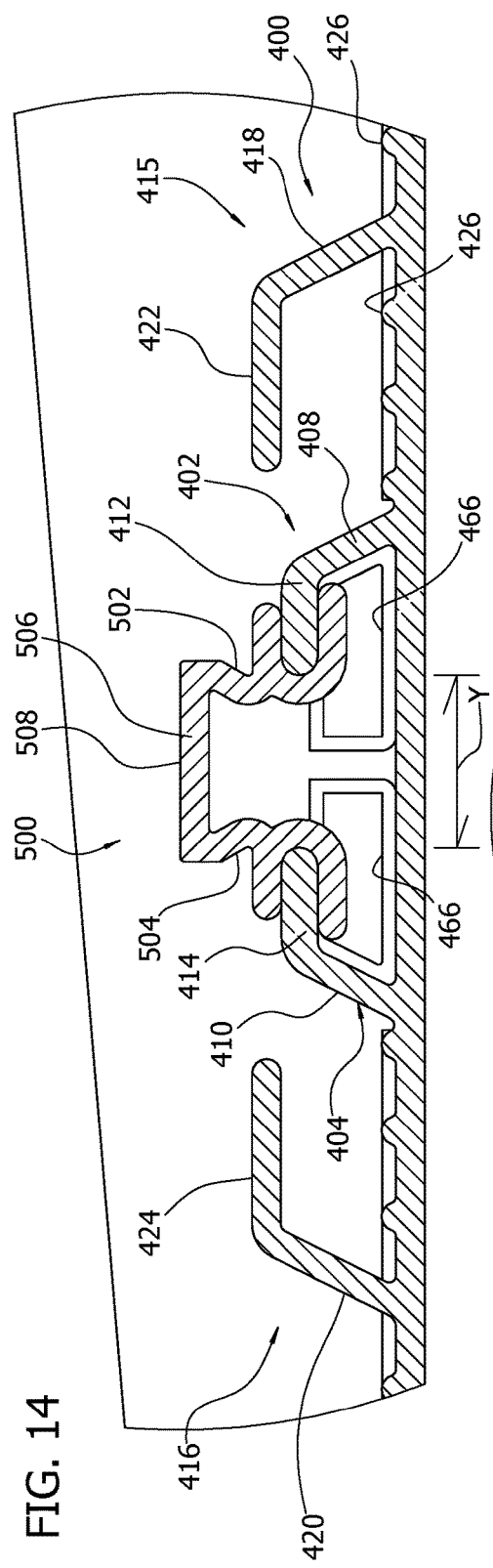
FIG. 14 is a detail of the assembly of FIG. 13.
Figure 13:
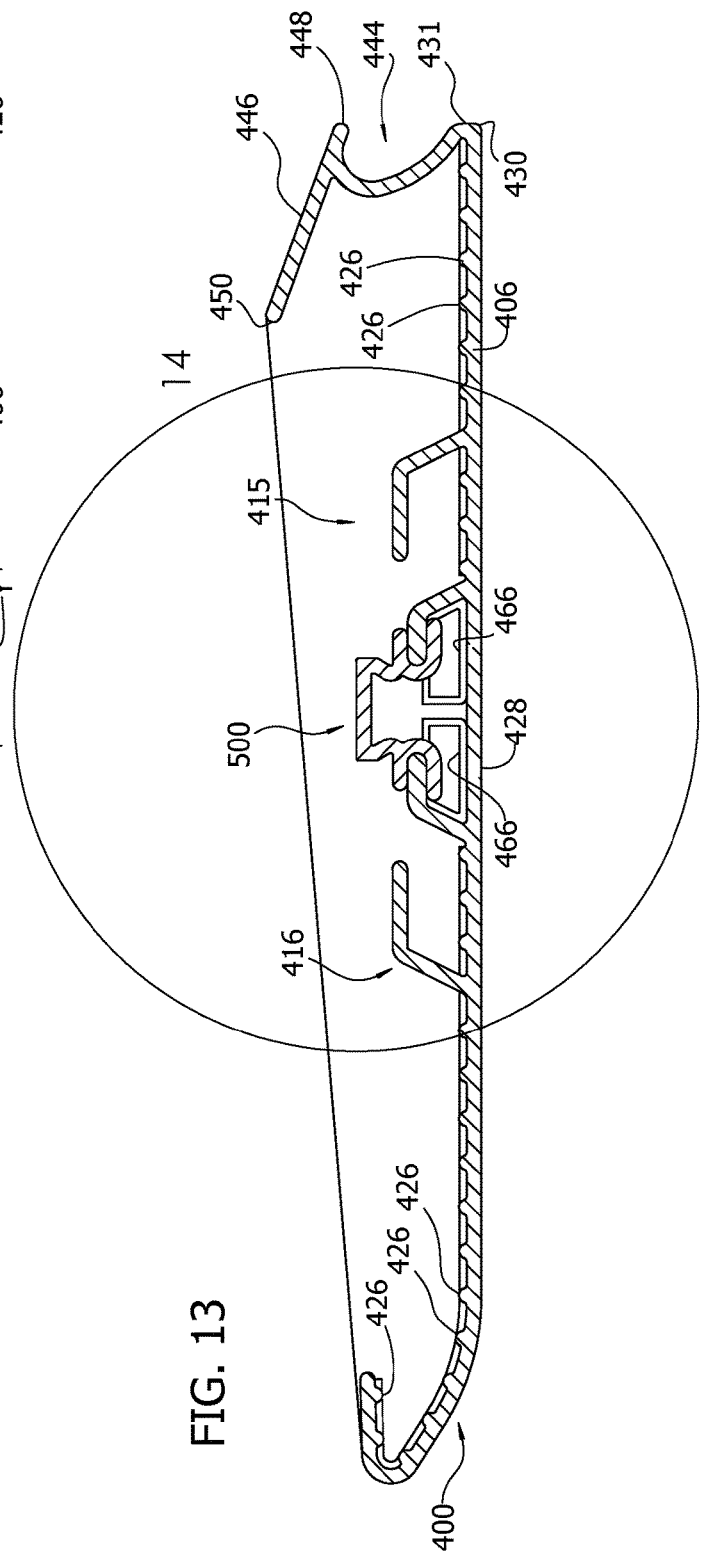
FIG. 13 is a transverse section of a concrete float with an interface and an end cap.
Figure 13F:
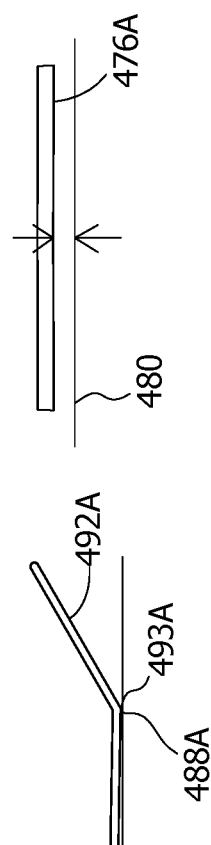
FIG. 13F is a detail of part of the alternative concrete float of FIG. 13E showing spacing of part of a concave surface of a concrete float from a concrete surface, exaggerated.
Figure 13E:
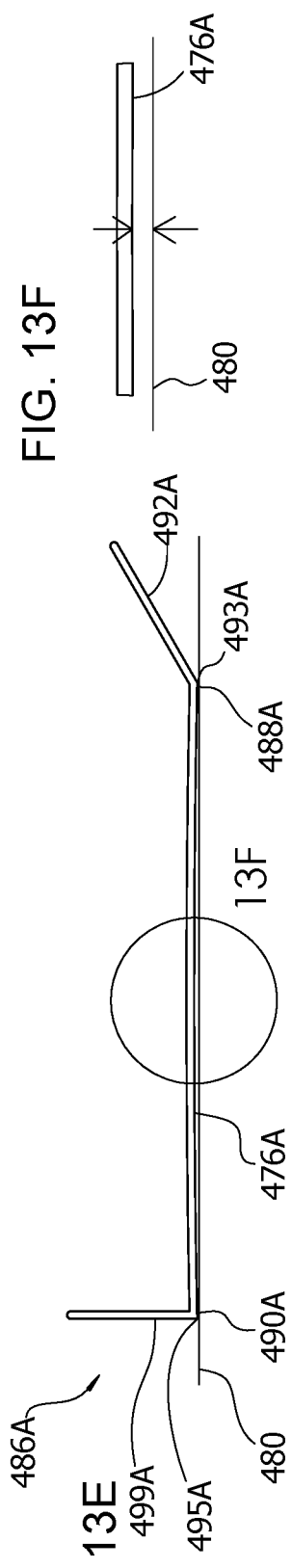
FIG. 13E is a side elevation view of a schematic of an alternative concrete float having a concave bottom surface as viewed from the side.
Figure 13G:
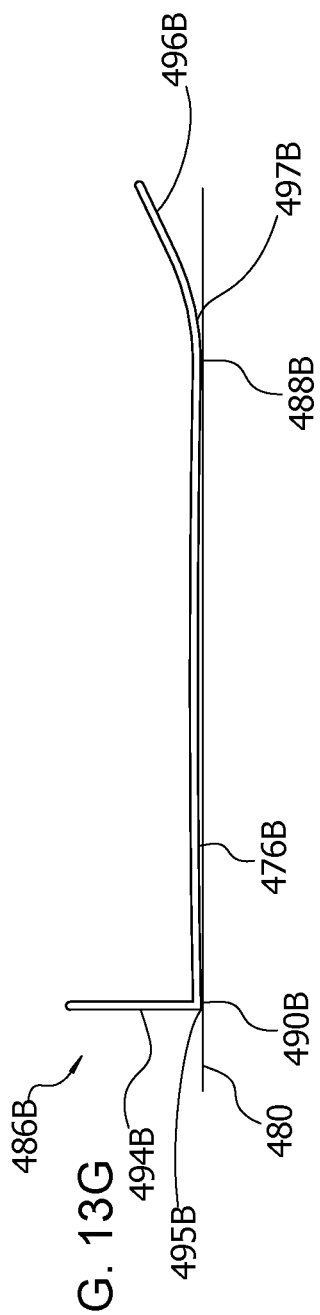
FIG. 13G is a side elevation view of a schematic of a further alternative concrete float having a concave bottom surface as viewed from the side.
Figure 13H:
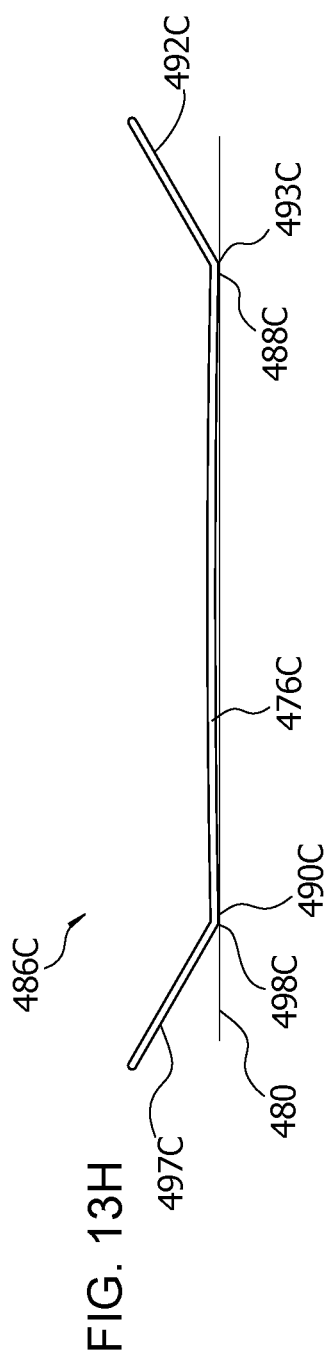
FIG. 13H is a side elevation view of a schematic of an additional alternative concrete float having a concave bottom surface as viewed from the side.
Figure 15:
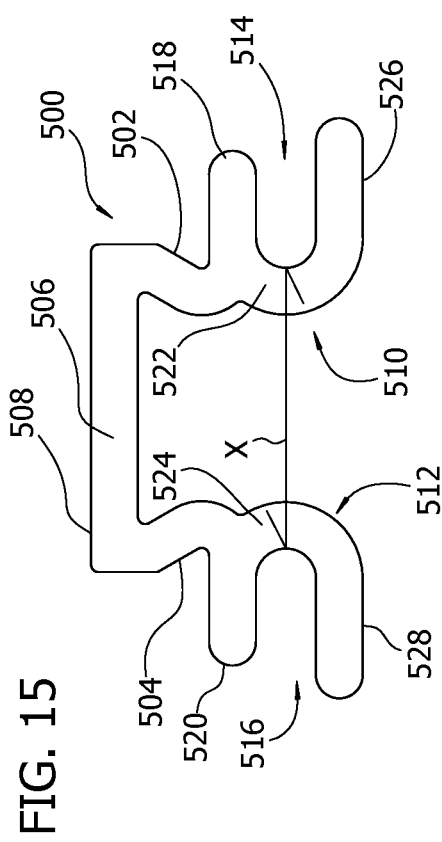
FIG. 15 is an enlarged end elevation view of the adapter of FIG. 9.

The electronics can be operated from an external power supply and/or the battery 310 charged from an external source by way of an external access or charging port 320 (FIGS. 5-6).

In the illustrated configuration, all of the components of the vibration assembly are located below a horizontal plane 322 (FIG. 6) parallel to the lower surface of the concrete float containing the central axis of the bevel gear 262 and bearing assemblies 266 and 268 of the pivot assembly. A similar plane 324 parallel to the lower surface of the concrete float containing the central axis of the vibration generator 302 is also below the horizontal plane 322, also while the pivot assembly 200 remains close to the concrete float 400. These positions make the concrete finishing apparatus easier to use and more efficient for finishing a concrete surface.

The electronics assembly 314, or a separate assembly, may include an accelerometer or other sensor device for providing feedback to the electronics assembly. In the present configuration, an accelerometer 326, shown schematically in FIG. 6, senses motion as a function of time, and provides feedback to a controller in the electronics assembly 314. The accelerometer output can be used by the controller to adjust the vibration generator RPM, for example to increase or decrease the RPM. For example, greater vibration in the float as sensed by the accelerometer may indicate increased curing or hardening of concrete, in which case the vibration generator RPM can be reduced accordingly.

In another configuration, the vibration generator 302 may be supplemented with or replaced by an ultrasonic generator. The ultrasonic generator can be placed within or adjacent the vibration assembly housing 304, for producing ultrasonic energy to be transmitted through the float 400 to the concrete. Alternatively, an ultrasonic generator can be mounted to a concrete float, for example on an upper surface of the float, or at a perimeter portion of the float.

The pivot assembly 200 and vibration assembly 300, and/or the pivot assembly 200A, can be mounted to and configured to support a concrete float, such as that shown in FIGS. 1 and 8-10 and 13-14, in a number of ways. Quick attach configurations are useful for easy and quick attachment and removal of a concrete float from the pivot assembly. In one quick attach configuration, mating components can be assembled while limiting or precluding disassembly in a direction normal to the flat surface of the concrete float. For example, mating components can be assembled in a laterally or longitudinally engaging configuration while limiting movement upward or in a direction of vertical separation. In another quick attach configuration, components can be placed under tension to secure them in place. In one example, a sliding dovetail configuration provides an inter-engagement among assembled parts, and one or more locking components put the interengaging parts under tension. In one configuration, locking components may include one or more threaded fasteners, and in another configuration, locking components may include one or more cam locks or other engagement configurations for placing the interengaging parts under tension, thereby holding the assembly secured together.

In another configuration, a quick attach arrangement places interengaging parts under lateral compression (lateral of the working surface of the concrete float, or parallel thereto). In one example, lateral compression can occur by interference fit between interengaging parts. In another example, lateral compression can occur when interengaging parts are brought closer together laterally and placed under compression, for example by fasteners, cam lock configurations, over center latching configurations, and other similar configurations.

In some quick attach configurations, interengaging components on one side for the pivot assembly 200 and vibration assembly 300, and/or the pivot assembly 200A, and on another side for the concrete float engage each other over a longitudinal extent. In one example, the longitudinal extent of the inter-engagement is approximately the same as or greater than the width of a base of the pivot assembly 200 and vibration assembly 300 and/or the pivot assembly 200A (or length when considering the longitudinal dimension of a concrete float as having a length), and in one example is greater than or equal to approximately 6 inches. In another example the longitudinal extent of the inter-engagement is greater than the largest width or diameter of a fastener or the sum of fasteners than are conventional fasteners used with concrete floats to secure the float to pivot assemblies, for example approximately 1 inch or greater. Longitudinal inter-engagement may be continuous or uninterrupted, or may be segmented or interrupted between a plurality of longitudinally interengaging elements.

In another example of quick attach configurations, the securement of a concrete float with a pivot assembly and/or vibration assembly can occur other than by compression created between the two ends of one or more conventional fasteners, in other words other than by bringing two or more surfaces together in compression between fastener head and threaded or other form of securement at the other end of the fastener. For example, fasteners can be used to put adjacent components in tension to hold them in place relative to each other, or cam surfaces or over center mechanisms can be used to secure components together in compression without having fasteners expand the two components.

In one illustrative example, a pivot assembly and/or a vibration assembly, for example one such as those described herein, can be secured to a concrete float either directly or through an interface, for example interface component 500 or other interface. In one example, the base plate 318 can have an interface element having a structure mounted to or incorporated into the base plate so as to be integral with or monolithic in the base plate 318 or separately attached thereto. In the present example, the interface element in the base plate 318 includes a structure that can inter-engage with the concrete float, and in the present example takes the form of a transversely extending interface element geometry 600, in the present example a non-square groove 600 (FIGS. 1 and 5-6, transverse to the pivot assembly 200), which may also be considered to be longitudinally extending relative to the longitudinal extent of the float 400. In the present example, the groove 600 has the configuration of a dovetail groove or mortise, having at least a partially trapezoidal profile in transverse cross-section. While other profiles can be used for a transversely- or longitudinally-extending groove, a dovetail groove configuration allows reliable and secure inter-engagement between the groove 600 and an interengaging component such as the interface component 500, which would allow for example placing the inter-engagement of the two components under tension. In the present example, inter-engagement occurs over the length or distance for which the interface component 500 is in contact with the groove 600, which in the present example is continuous, but which could be discontinuous or segmented with multiple interface components, for example. In the illustrative example, inter-engagement occurs over approximately the width of the base plate 318, such amount of inter-engagement depending on the extent of any gate, chute or approach structure on one or both ends of the groove 600, described more fully below.

The groove 600, whether incorporated into the base plate or separately mounted thereon, includes in the present example respective chutes or converging entrances 602 (FIG. 5) at each end of the groove 600. In the present example, each chute is configured with a sloped base surface 604 approaching the groove, and first and second converging sidewalls 606 and 608. Other approach configurations can be used also to make easier the sliding of the groove 600 and the interface component 500 along each other. Additionally, other complementary and/or interface configurations can be used to allow inter-engagement or more generally reliable mounting between a pivot assembly and/or vibration assembly and a concrete float. Also, other configurations can be used by which interengaging components can be placed in tension for holding the components secured relative to each other once they are assembled to be interengaging, and other configurations can be used to interface between the pivot assembly and/or vibration assembly and a concrete float.

Inter-engagement of components on the pivot assembly and/or vibration assembly and the concrete float can be put in tension to secure the components together. In the present example of a sliding dovetail configuration or similar inter-engagement, the structures can be put in tension in a number of ways. In the illustrated example, the structures can be put in tension through at least one, and in the illustrated example, two bolts 610 (FIGS. 1-6) threaded into respective portions of the base plate 318 or other portions of the housing 304 and threaded against an opposing or facing surface or surfaces on the interface component 500. Tightening down the bolt or bolts presses against the upwardly-facing surface of the interface component 500 (as viewed in FIGS. 1 and 6) and pressing adjacent surfaces of the interface component 500 against angled sidewalls 612 and 614, respectively, in the groove 602. The interengaging components are thereby placed in tension, with approximately all of the contacting surfaces between them occurring along the sides of the groove and the interface component 500, namely along the angled surfaces therebetween.

To assemble the inter-engaging components, the assembly or assemblies incorporating the groove 600 is placed so that one or the other of the entrances to the groove is aligned with the complementary structure on the interface component 500 or other similar structure. The groove 600 slides over the interface component 500 until the interface is approximately centered in the groove, from side to side, and the bolts 610 threaded until the interengaging components are placed in tension.

Another of the interengaging parts may include the interface component 500. In the present example, the interface component 500 is a longitudinally-extending male component configured to slide within a groove such as groove 600. Other configurations of interengaging components can be used. In the present example, the interface component 500 is a separate component that can be mounted on the concrete float 400, to be integral therewith, or the interface component can be formed monolithic with the concrete float. As illustrated, the interface component 500 includes a dovetail profile similar to a tendon. The interengaging portion includes first and second angled sidewalls 502 and 504 converging inward, and downward as viewed in FIGS. 1 and 14, from a flat, transversely and longitudinally extending joining wall 506. The joining wall has an upper surface 508 against which the bolts 610 will bear to place the interengaging components in tension. The space between the angled sidewalls 502 and 504 and the joining wall 506 is open, but can be solid in some examples. In the illustrated example, the thickness of the structures forming the interface component 500 are substantially the same.

The length of the interface component 500 can be selected as desired, and the present example of the interface component 500 is a single component. The interface component 500 can be multiple components for engaging the groove 600, if desired. In the illustrated example, the length of the interface component 500 is approximately the same as the width of the base plate 318, or longitudinal extent relative to the float if a longitudinal direction is considered relative to the float. The interface component 500 can have a length greater than the engagement distance of the groove 600, and can be as long as the length of the float. In this example, once the interface component 500 is lined up or matched up and joined with the groove 600, movement of the interface is limited in the Y and Z directions, namely proximally and distally, and upward. In this context, the X direction is taken to be in the lateral or widthwise direction relative to the concrete tool, where the Y direction represents the standard direction of movement. This convention will be used herein with respect to floats, groovers and other finishing tools that move linearly over concrete, for example proximally and/or distally by a user with a handle connected to the tool.

The illustrated example of the interface component 500 has the interface as a separately-manufactured component, for example an aluminum extrusion, but it should be understood that the interengaging walls 502, 504 and 506 can be formed integral with the concrete float 400. The illustrated interface component 500 is mounted to complementary engaging walls on the float 400 through a first mounting structure 510 and a second mounting structure 512 formed monolithic with the rest of the interface component 500. In the present example, the first and second mounting structures 510 and 512 are mirror images of each other, and both extend the entire length of the interface component 500. The mounting structures are formed by U-shaped structures forming oppositely-facing grooves 514 and 516, respectively, with first and second upper walls 518 and 520, respectively, attached to the angled sidewalls 502 and 504, respectively. The mounting structures include bottom walls 522 and 524, respectively, extending to first and second lower walls 526 and 528. In the illustrated example, the lower walls extend farther from the bottom walls than do the upper walls. Additionally, in one example, the ends of the first and second lower walls 526 and 528 can contact and if desired bear against the upwardly extending portions of float engagement walls 402 and 404, described more fully below.

The grooves 514 and 516 are configured to fit over and engage respective float engagement walls 402 and 404. The internal width of the grooves between the upper and lower walls (518 and 520, and 526 and 528) can be selected as desired, and may be larger than the width or thickness of the respective float engagement walls 402 and 404, equal to the width or thickness, or less than the width or thickness to provide an interference fit between the groove and the corresponding engagement wall. Additionally, in the illustrated example, the spacing between the bottoms of the oppositely-facing grooves 514 and 516 is a distance X that is selected when the interface component 500 is in a relaxed state to be greater than a distance Y between the ends of the float engagement walls 402 and 404 when they are in a relaxed state, prior to engagement with the interface component 500. In such a configuration, the assembly of the interface component 500 on to the float 400 by engaging the grooves 514 and 516 with the support walls 402 and 404 forms an interference fit between the interface component 500 and the support walls of the float, thereby tending to bias the support walls 402 and 404 away from each other, and the first and second mounting structures 510 and 512 toward each other. Other configurations are also possible to provide a secure and reliable engagement between an interface and support structures on a concrete float. Thereafter, when the grooves 600 and the interface component 500 are placed to interengage with each other, and the bolts tightened down against the upper surface 508 of the interface, loading can be created to counter the interference fit created between the interface and the support walls of the float.

Float 400 can take a number of configurations. In the illustrated example, the float is supported on a pivot assembly and/or vibration assembly through the support walls 402 and 404. The support walls extend longitudinally the entire length of the float, and extend upwardly from a bottom wall 406 of the float. The support walls extend upwardly from an inside surface of the bottom wall 406 with angled or converging support walls 408 and 410, respectively, forming respective acute angles with the bottom wall 406. The support walls extend toward each other with respective upper walls 412 and 414, which upper walls extend into and engage the grooves 514 and 516, respectively, when the interface component 500 is mounted thereon. In the relaxed state, prior to placement of the interface component 500, the upper walls 412 and 414 extend substantially parallel to the lower wall 406. In the present configuration, the thicknesses of the upper walls 412 and 414 are greater than the thicknesses of the converging support walls 408 and 410.

The exemplary float includes first and second stabilizer ribs 415 and 416, respectively, extending upward from the bottom wall 406 and toward each other. The stabilizer ribs extend in the present example the entire length of the float. The stabilizer ribs include respective converging support walls 418 and 420 terminating at co-planer stabilizer bars 422 and 424, respectively, extending toward each other. The upper surfaces of the stabilizer bars 422 and 424 are spaced a distance above the bottom wall 406 approximately the same as the distance the upper surfaces of the upper walls 518 and 520 of the interface component 500 are positioned above the bottom wall 406 when in place on the float, above the surfaces of the walls 412 and 414. In this configuration, the upper surfaces of the stabilizer bars 422 and 424 and the upper surfaces of the walls 518 and 520 will be spaced approximately the same distance from the lower-most facing surface of the base plate 318. If any loading tends to move the float closer to the front portion or back portion of the base plate 318 by tilting, the stabilizer bars will stop further tilting. The support provided by the ribs 415 and 416 can be provided by other structures, in addition to or in place of the ribs 415 and 416. The inside surface of the float also includes a plurality of ribs 426 extending the length of the float. The ribs help to strengthen the float in the longitudinal direction.

The float profile includes a plurality of wall variations. The float includes a bottom concrete-contacting surface 428 that is substantially flat longitudinally and width-wise from back 430 to a front portion 432 in the exemplary configuration. Alternatively, as discussed further below, a float concrete-contacting surface can have multiple discrete contacting surfaces, for example separated by one or more concave or other geometric surfaces. In the present example, the distance between the back 430 and the front portion 432 is a distance Z that is approximately 10 inches. The back 430 has an edge 431 that is substantially vertical (as viewed in FIG. 13) joined to the back 430 by a radiused corner. The edge 431 extends longitudinally the complete length of the float. Other edge configurations can be used.

From the front portion 432, float curves upwardly with a first radius of curvature to a second front portion 434, where the curvature ends at a second straight portion 436. The second straight portion extends to a third front portion 438, after which the float curves to a front tip 440 around a small radius of curvature to a third flat portion 442. The second straight portion 436 helps to provide an improved finish, for example on a return stroke of the float.

In the illustrated example, the back of the float includes a concave portion 444, extending upward and inward from the edge 431 at the backend 430 with a first radius of curvature, and then outward with a smaller radius of curvature to an angled wall 446. The concave portion 444 helps to keep concrete out of the interior of the float. The angled wall extends from a point 448 vertically above the backend 430 to a forward end 450, forming an angle 452 that will be approximately parallel to the pole tube 206 when the pole tube is approximately adjacent the angled wall. The angled wall also helps to keep concrete out of the interior of the float.

The concrete float can include if desired one or more end covers for keeping concrete out and/or stabilizers, for example structures in the form of weights or dampers to affect vibration imposed on the float. End covers help to keep concrete and slurry out of the upper surfaces of the float and accessories. Also, weights or dampers can be selected and positioned as desired, and in the present example, the concrete float 400 includes left and right end caps 458 and 460, respectively. The end caps can be configured to both cover the float ends and also to help optimize imposed vibrations, if any. The weight and/or construction of either or both end caps can be selected to optimize the imposed vibration in the float, for example by changing the resonance in the float, or nodes, for a given configuration of a vibration assembly and length of the float. In the illustrated example, the end caps are mirror images of each other, and only the right end 460 will be described in detail. Each end cap includes a side plate 462 and support structures 464, for helping to keep the end cap in place. Each end cap also includes supporting plugs 466 (FIGS. 8, 10 and 13-14) for helping to secure the end cap in place. Each end cap also includes a bottom surface 468 extending along or between the concrete-contacting surfaces of the float. In the present example, the bottom surface 468 is substantially linear and flat, for example even if the float surface includes a concave surface between concrete-contacting surfaces. The bottom surface 468 is configured to be recessed slightly above or away from the concrete-contacting surface of the float, for example so that the concrete-contacting surface of the float is between the concrete and the bottom surface 468. In one example, the bottom edge of the end cap is recessed approximately 0.02 inch from the concrete-contacting surface of the float. In the present examples, each end cap is a co-molded rubber, for example formed from an engineered plastic, for example polyamide 6 (PA6) with about 60% embedded fiber, and can also be made from rubber, silicone, or other materials.

One or more accessories can be placed on the float, represented generically at 470 (FIG. 8). The accessories may be light sources that can be placed on the float and/or pivoting and/or vibration assemblies for illuminating a concrete surface, or sprayers or misters placed on the float and/or pivoting and/or vibration assemblies for wetting a concrete surface. In one example, the accessories 470 may be one or more light sources can be placed on or along the flat portion 442 or other structures on the front portion of the float, or that portion of the float distal to the user or leading when the assembly is pushed away from the user. For example, light sources can be placed at the ends of the float and one or more locations between the ends of the float along the front or leading portion of the float. Exemplary light sources may include LED arrays, LED elements or other suitable light sources. Light sources can also additionally or alternatively be placed on removable end caps, such as end caps 428 and 430. When located on end caps, or only at the ends of a float, multiple light sources can be used, one of which is directed straight ahead and one of which is directed at an angle inward toward a center of the direction of travel of the float. An angled light source on one side can be matched with an angled light source on the other side so that they intersect at a desired location forward of the float. The number of accessories may be selected so as to produce the desired results. One or more light sources can also be placed on the pivot, pivot adapters, and/or other adjacent structures.

In another example, the accessories 470 may be (additionally or alternatively) one or more nozzles, for example sprayers or misters, placed on or along the flat portion 442 or other structures on the front portion (or distal portion) of the float. Each nozzle may produce a spray pattern, is the same as or different from an adjacent nozzle if any, and may have any desired pattern. The pattern may be arcuate, linear or other desired pattern. The number of nozzles may be selected as desired, so as to produce the desired result, and in one example are positioned to have a frequency of about one every foot. For a 6 foot float in this one example, there can be seven nozzles. Moisture from the nozzles can help to bring the cream of the concrete to the surface.

An alternative float construction (FIGS. 13A-13D) may include at least one concave surface in a bottom surface of the float facing the concrete surface being finished. In one example, a float 400A includes a first concrete-contacting surface 472 (FIGS. 13A and 13B) and a second concrete-contacting surface 474 (FIGS. 13A and 13D) and a concave surface 476 extending between them. In the present example, the first and second concrete-contacting surfaces 472 and 474 extend the width of the float 400A, but can be less than the width of the float. Additionally, in the illustrated example, the first and second concrete-contacting surfaces are the outermost and only concrete-contacting surfaces during normal operation, as described herein, but they can be other than the outermost concrete-contacting surfaces, and the float can include additional concrete-contacting surfaces, with or without concave surfaces extending between adjacent ones of the concrete-contacting surfaces. Additionally, one or more concave surfaces can be configured into a float while omitting intervening concrete-contacting surfaces as desired. One or more concave surfaces can be incorporated into a bottom of a float having any number of configurations, including a shallow channel configuration as represented in FIG. 13A, circular, oval, rectangular and other geometric or polygonal or smooth shapes, which may be discrete or which may be overlapping. Any concave surface can be formed as a smooth continuous surface, for example with a constant radius of curvature, or may be formed as discrete surfaces, for example stairstep or square wave or other configuration, combining to form a concavity in the bottom of a float.

In the illustrated configuration, the first concrete-contacting surface 472 transitions from the concave surface 476 in the interior of the bottom of the float to a front portion 434A outward to the ramp surface defined by the front portions and the straight portion 436A. The second concrete-contacting surface 474 terminates at the back portion 430A and a back edge 431A. The back portion 430A and back edge 431A both extend widthwise the width of the float in the present example. Also in the present example, the back portion 430A and the back edge 431A join at a relatively sharp corner, for example relative to the ramp at the opposite side of the float, and may be as sharp as permitted by an extrusion, and considering expected wear arising from normal use.

In the present configuration of the float shown in FIGS. 13A-13D, the concave surface 476 has a radius of curvature 478 (FIG. 13C) of approximately 500 inches. For a given float configuration, such as that shown in FIG. 13A, multiple concave surfaces would have smaller radii of curvature. The radius of curvature in the illustrated configuration produces a height 482 of the concave surface away from the opposite concrete surface, and in the present example the maximum height for the surface 476 away from the opposite concrete surface of approximately 0.0115 inch, in other words the concave surface curves approximately 0.0115 inch away from a line 480 representing an adjacent concrete surface contacting both of the first and second concrete-contacting surfaces 472 and 474. The maximum spacing in the present example is selected to be at a midpoint between the first and second concrete-contacting surfaces, in the present example approximately 0.79 inches from a flange 484 toward the second concrete-contacting surface 474. The point of maximum spacing in a concave surface can be selected as desired, and may be for example spaced away from a center of the float or a center between the first and second concrete-contacting surfaces, for example, so that the concave surface is asymmetric in a side profile of the float. The configuration of the concave surface may be selected so as to improve drawing the cream to the top of the concrete surface, and possibly above the concrete surface, for example by surface tension on the concave surface.

In the example of the float 400A shown in FIGS. 13A and 13C, the flange 484 provides strength to the float structure, and also provides in the present example a bearing surface for set screws (not shown) threaded into the interface component 500 (FIG. 9) in threaded openings 485, shown in phantom in FIG. 9, in an example where set screws or other fasteners are used to help secure the interface component 500. In the present example in conjunction with the flange 484, set screws when used with the interface component 500 against the flange 484 place the interface component 500 under load to help maintain the position of the interface component on the float.

The concrete-contacting surfaces 472 and 474 help to apply pressure to the underlying concrete surface, for example through the weight of the apparatus, which pressure pushes cream out of the immediately surrounding area of the concrete. The concave surface 476 helps to maintain the cream at or above the top of the concrete surface by surface tension, beginning at the interior areas closest to the concrete-contacting surfaces 472 or 474, whichever is a leading surface when both are contacting the surface of the concrete. Continued motion of the float along the surface of the concrete continues to draw cream along the concave surface by surface tension, which helps to draw additional cream from the concrete surface. As the float continues along the concrete surface, the cream in the concave surface 476 is redeposited on the concrete surface by the other of the concrete-contacting surfaces 472 or 474, for example by gliding over the cream. As described more fully below, the second concrete-contacting surface 474 would be a trailing or distal edge, and the corner between the back portion 430A and the back edge 431A breaks the surface tension is much as possible with the cream, allowing as much of the cream as possible to stay on the surface of the concrete, rather than on the back edge 431A.

FIGS. 13E-13H shows schematics of alternative float configurations having several types of proximal and distal edges adjacent respective concrete-contacting surfaces, for example for use with floats having concave bottom surfaces. Any float configuration, including any of those described herein, can be configured to have one or more concave surfaces between proximal and distal edges adjacent respective concrete-contacting surfaces, and the configurations of the upper portions of a float can be configured as desired. Each of the float configurations represented in FIGS. 13E-

13H will be considered as identical for the present discussion for purposes of simplicity, it being understood that any float can be configured to have any desired structures and functions with the desired concave float bottom surface and proximal and distal edge portions described with respect to FIGS. 13E-13H.

In a float configuration 486A (FIGS. 13E-13F), the float includes a concave bottom surface 476A extending between a proximal concrete-contacting surface 488A and a distal concrete-contacting surface 490A on opposite sides of the concave surface 476A. The concave bottom surface 476A can be any of the concave surfaces described herein or similar. A straight ramp surface 492A extends proximally from the concrete-contacting surface 488A upward and away from the concave surface. A proximal edge 493A is defined by the angle between the proximal concrete-contacting surface 488A and the straight ramp surface 492A, which angle can be any suitable angle which reduces or minimizes the likelihood that the proximal edge 493A bears into or digs into the concrete. The proximal concrete-contacting surface 488A contacts the underlying concrete surface, applying pressure thereto to bring the cream to the surface, while the straight ramp surface 492A allows the float to progress over the concrete surface. Surface tension in the cream promotes listing of the cream above the concrete surface and against the concave surface 476A.

In the present example of the float 486A, a distal wall 494A extends at an angle of approximately 90° to the distal concrete-contacting surface 490A. The distal wall 494A joins the distal concrete-contacting surface 490A at a distal edge 495A that is a relatively sharp edge. The sharp edge reduces the possibility of cream rising on the surface of the distal wall 494A by surface tension, and promotes spreading of the cream on the adjacent concrete surface behind the distal edge.

In another float configuration 486B (FIG. 13G), substantially identical surfaces are labeled with the same reference numerals with a "B", and have substantially the same structures and functions as the same or similar structures and functions described herein. In the present example, the float 486B includes a proximal ramp 496B joining the proximal concrete-contacting surface 488B along a radiused or curved edge 497B. The radiused or curved edge 497B reduces or minimizes the likelihood that the proximal edge 497B bears into or digs into the concrete.

In a further float configuration 486C (FIG. 13H), substantially identical surfaces are labeled with the same reference numerals with a "C", and have substantially the same structures and functions as the same or similar structures and functions described herein. In the present example, the float 486C includes a proximal ramp that is a straight ramp surface 492C defining a proximal edge 493C defined by the angle between surface 492C and the proximal concrete-contacting surface 488C. In a similar manner, the float includes a distal ramp that is a straight ramp surface 497C at the distal portion of the float, joining the distal concrete-contacting surface 490C at a distal edge 498C, which edge is defined by the angle between the straight ramp surface 497C and the distal concrete-contacting surface 490C. In the present example, the proximal and distal straight ramps extend at equal and opposite angles, but they can be different from each other. When at the same angle, the float is symmetric and either edge can be the proximal edge and either concrete-contacting surface can be the proximal concrete-contacting surface. However, it should be understood that the distal ramp surface 497C can extend at any of a number of angles, when it is configured to be the distal portion of the float, with one purpose being to reduce any amount of cream that might cling to the distal surface through surface tension.

Interfaces can be configured to be used with geometries on a vibration unit and/or pivot, and/or to interface with a concrete finishing tool, for example a float, groover, or other finishing tool. An interface can be a component to be secured on a vibration unit and/or pivot for interfacing with a concrete finishing tool, or an interface can be a component to be secured to a concrete finishing tool for interfacing with a vibration unit and/or pivot. An interface can take a number of configurations, and in the example of an interface to be secured to a vibration unit and/or pivot, the interface will have a configuration allowing it to be secured to the vibration unit and/or pivot according to the existing attachment configuration of the vibration unit and/or pivot. For example, on existing vibration units and/or pivots, the interface will be included as part of an adapter and will have a configuration such that it can be secured to the vibration unit and/or pivot. In some examples, the configuration will be as simple as having four fastener openings in a pattern matching or sufficiently close to allow the interface to be secured to the vibration unit and/or pivot using four fasteners conventional with the equipment. Another portion of the adapter will have an interface configured to allow interfacing with the concrete finishing tool.

In the example of an adapter to be secured to a concrete finishing tool, for interfacing with a vibration unit and/or pivot, the adapter will have a configuration allowing it to be secured to the concrete finishing tool according to the existing attachment configuration of the finishing tool. In some examples, the configuration will be as simple as having four fastener openings in a pattern matching or sufficiently close to allow the adapter to be secured to the finishing tool using four fasteners conventional with the equipment. Another portion of the adapter will be configured to allow interfacing with the vibration unit and/or pivot.

The interfaces described herein can be incorporated into the original equipment of the concrete finishing tool and/or the pivot assembly, or they can be incorporated into an adapter or an adapter pair. When incorporated into an adapter pair, one adapter will be secured to the concrete finishing tool, and the other adapter will be secured to the pivot assembly. The interfaces on the adapter pair will be complementary to allow their securement. When an interface is incorporated into a single adapter, for example for either the pivot assembly or for the concrete finishing tool, the other of the concrete finishing tool or the pivot assembly intended to be used already includes the complementary interface with which the single adapter is to be used.

Interfaces, for example for original equipment or for one or a pair of adapters, can have a number of configurations, including quick attach and release configurations, configurations simplifying securement, for example by omitting threaded fasteners, and configurations using a relatively few steps. Interface configurations described herein have engagement surfaces for mating interface configurations where the engagement surfaces are not threaded surfaces. Interfaces in some configurations allow the vibration unit and/or pivot interface to be aligned or matched up and joined with the tool interface and secured in a single joining or mating motion. Interfaces in other configurations allow the vibration unit and/or pivot interface to be aligned or matched up and joined with the tool interface and secured with two or relatively few motions. Interfaces in some configurations allow them to be aligned or matched up and joined so that movement in one or more of the X, Y and/or Z directions is limited or prevented and, if further securement is necessary, further securement, for example by a latch, pin, cam, or the like, secures the interfaces in the remaining direction or directions. For example, some interfaces can be configured such that after alignment or matchup and after they are joined, movement in Y and Z directions is limited, and in other examples some interfaces can be configured such that after alignment or matchup and joinder, movement in the X and Y directions is limited, and in still other interfaces, the interfaces can be configured such that after alignment or matchup and joinder, movement in the X, Y and Z directions is limited, under normal operating conditions.

Figure 16:
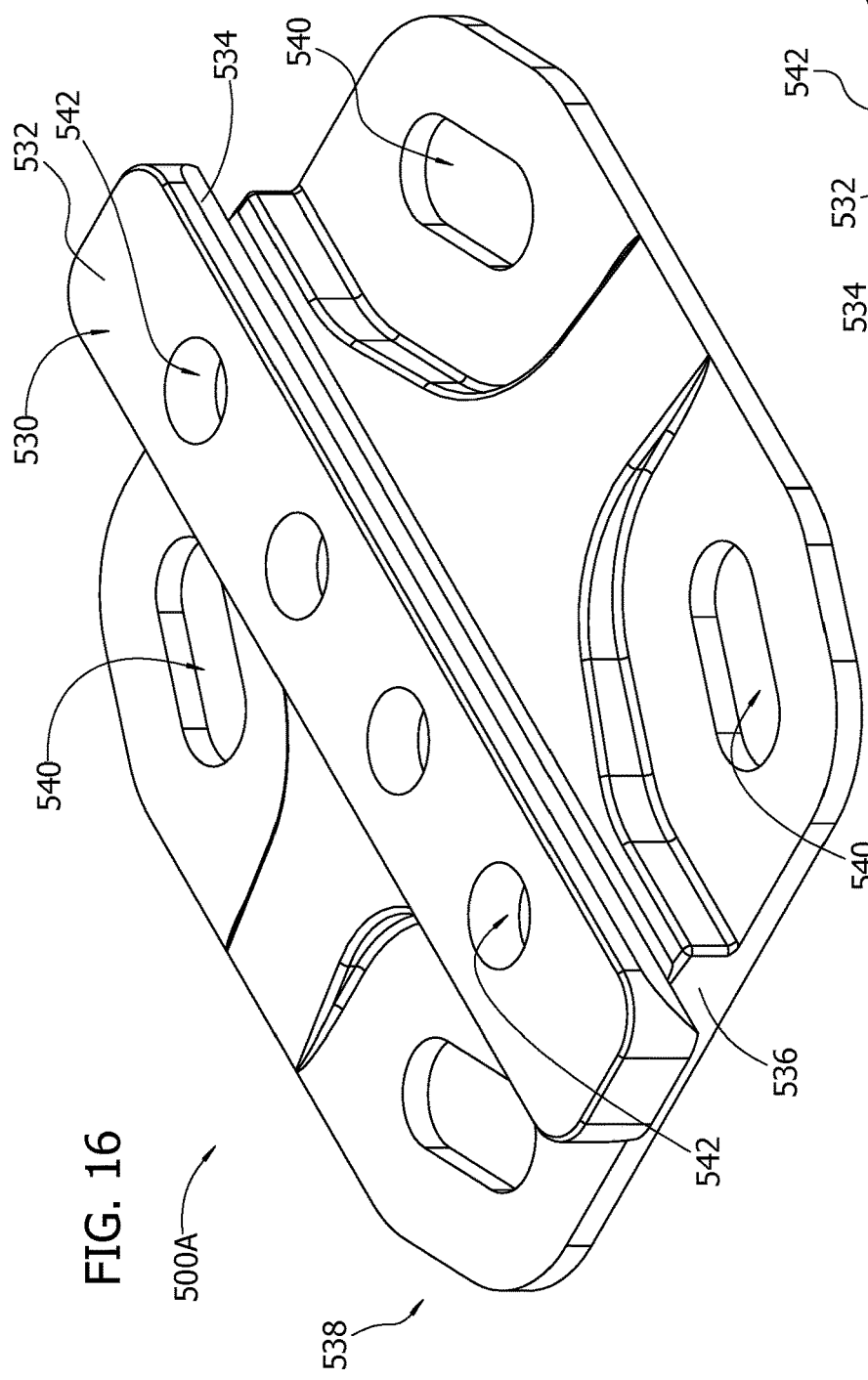
FIG. 16 is an upper isometric view of a further configuration of an adapter for use with vibration and/or pivot assemblies described herein with one or more different float configurations.
Figure 17:
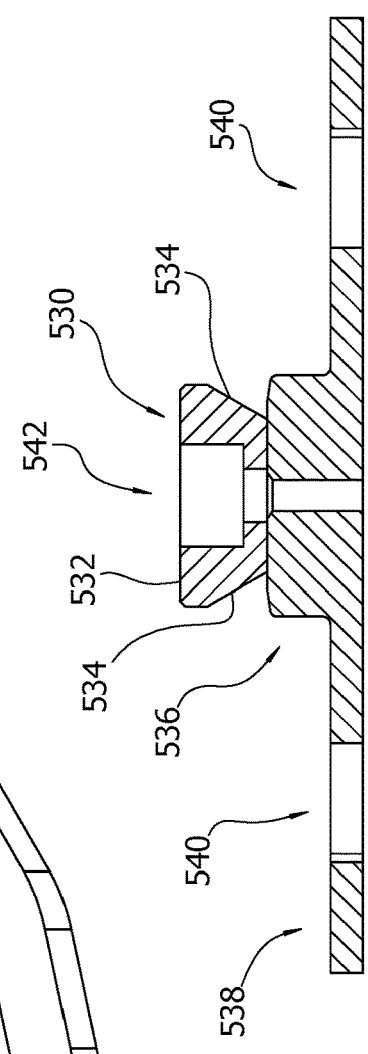
FIG. 17 is a cross section view of the adapter of FIG. 16 taken through a pair of openings and a tendon structure.

Adapters can be configured with interfaces to be used with grooved or channel structures, for example including those having longitudinally-extending grooves described in conjunction with groove 600, and may include an adapter 500A having a dovetail interface 530 configuration similar to a tendon (FIGS. 16 and 17). In this example, once the interface is lined up or matched up and joined with the corresponding complementary component, movement of the interface is limited in the Y and Z directions, namely proximally and distally, and upward. In this context, the X direction is taken to be in the lateral or widthwise direction relative to the concrete tool, where the Y direction represents the standard direction of movement. Alternatively, the interface 530 can be configured to be complementary to other geometries, as desired, so that the interface can be used to interengage with such other geometries complementary to an interface in a trowel pivot or vibration tool structure, to interface between a trowel pivot or vibration tool and a concrete float. The interface 530 can be used to interengage with the groove configurations 600 described herein, as well as any other groove or channel configurations complementary to an interface in a trowel pivot or vibration tool structure, in the present example the interface 530, to interface between a trowel pivot or vibration tool and a concrete float. In the present example, the interface 530 extends longitudinally and includes a relatively wide upper surface 532 and extends downwardly and converges inwardly along angled side surfaces 534 in a trapezoidal configuration to a portion 536 of a float mounting structure 538. The portion 536 can take the form of a boss or ridge extending along an upper portion of the float mounting structure 538, which may be configured for reinforcement or strength. The interfaces 500, 500A, 600 and 600A described herein limit relative movement in the Y and Z directions after the interface is aligned or matched up and joined with its complementary structure by movement in the X direction and before final securement. After final securement, the assembly is also secure in the X direction, and movement in the X direction is limited.

In the present configuration, the float mounting structure 538 is configured as a relatively planar mounting plate with a plurality (in the present example 4) of mounting holes 540 used for mounting the adapter 500A to a float (FIGS. 16 and 17). The mounting holes are arranged in a pattern on the mounting plate to accommodate fasteners for the same pattern in a concrete float, in the present example a rectangular pattern. The configuration of the adapter 500A is suitable for mounting to a float such as the float 400 through suitable fastening arrangements. Additionally or alternatively, the adapter 500A is suitable for mounting to conventional float configurations having one or more, and in the present example, four threaded openings or threaded receptacles in an upper surface of the float, where fasteners are used to bring the float mounting structure 538 against or into compression against the upper surface of the float. Other float configurations can be adapted for receiving the adapter 500A, or the float mounting structure can be modified so that the interface can be used to mount to other float configurations, for example with a different fastener or mounting pattern, a non-planar bottom surface for the float mounting structure, or the like. The interface 530 can be secured to the float mounting structure 538 in a number of ways, for example secured by way of fasteners threaded into openings 542, and/or welding, or the like. Alternatively, the interface 530 can be formed monolithic or otherwise integral with the float mounting surface 538.

The float mounting structure 538 can have a uniform thickness, for example the thickness of the portion 536 supporting the interface 530. Alternatively, the float mounting structure 538 can have a smaller thickness in the area of the mounting holes 540, and a reinforcement structure having a greater thickness, for example supporting the interface 530 and extending between adjacent mounting holes 540.

Figure 18:
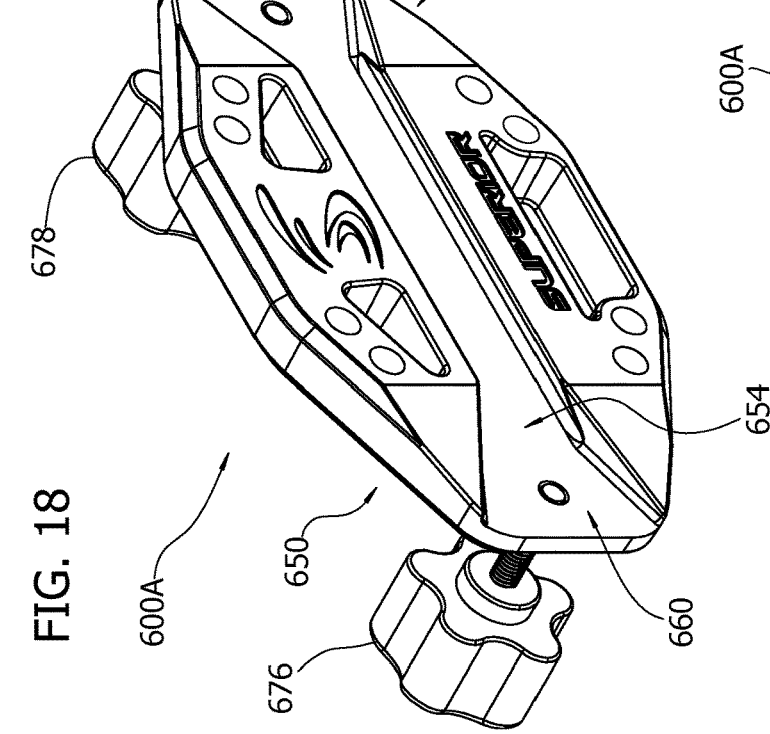
FIG. 18 is a lower isometric view of a further configuration of an adapter for use with vibration and/or pivot assemblies and a concrete float and interface assembly.

Interfaces can also be configured to be used with geometries on a concrete float to interface between the concrete float and a trowel pivot or vibration tool structure. In one example, interfaces can be configured to be used with longitudinally-extending ridges, lands, tendons or other geometries on concrete floats, including for example interface component 500. Alternatively, an interface for use with a geometry on a concrete float can be configured to be complementary to other geometries, as desired, so that the interface can be used to interengage with such other geometries complementary to an interface on the concrete float, to interface between the concrete float and a trowel pivot or vibration assembly. In one example, an adapter 600A (FIGS. 18-20) can include an interface that can be used to interengage with the interface component 500 described herein or similar geometries, for example having top surface 508 and side surfaces 502 and 504. In the present example, the adapter 600A includes an upper surface 650, substantially planar in the illustrated example, and an opposite side 652. The opposite side 652 includes a profile substantially complementary to a geometry on a concrete float with which the adapter 600A is to be used. The interface has a structure sufficient to support the concrete float on a trowel pivot or vibration tool assembly during normal operation, which may be determined in part by the form of the complementary geometry on the concrete float. In the present example, the complementary geometry is determined by the interface component 500, and the adapter 600A extends longitudinally to engage the complementary geometry of the interface component 500.

The adapter 600A has an interface with a noncircular transverse cross-sectional profile, substantially trapezoidal in the illustrated configuration having a shape approximating a mortise. The profile includes a substantially straight transverse and longitudinally extending surface 654 terminating at the sides at downwardly extending and converging sidewalls 656 and 658, which terminate at a bottom surface 670 of the adapter 600A. The straight surface and converging sidewalls extend longitudinally of the adapter 600A and define the interface geometry interengaging with the complementary geometry on a concrete float. In the present configuration, the adapter 600A can be used to assemble together a pivot assembly or vibration assembly with a concrete float having a geometry such as the interface component 500 there on. The adapter 600A can be used to mount a pivot assembly or vibration assembly on concrete floats having other geometries thereon by having the adapter 600A incorporate a profile complementary to the geometry on the concrete float.

In one configuration, the adapter 600A includes guide surfaces for helping to align the adapter 600A during assembly with the corresponding geometry on a concrete float. In one example, the guide surfaces can have a structure and function substantially the same as the chutes or converging entrances 602 described herein in conjunction with the groove 600. In the present example, each longitudinal end of the adapter 600A includes a guide profile 660 and 662, respectively, substantially mirror images as illustrated, only one of which will be described further. In the illustrated example, the guide profile 660 includes spaced apart, substantially straight converging surfaces 664 and 666 extending from a longitudinal end portion 668 of the adapter 600A to the respective sidewalls 658 and 656. Each converging surface extends in a respective plane substantially normal to a plane containing the longitudinally extending surface 654.

The adapter 600A also includes respective ramp surfaces at each longitudinal end portions 668. The ramp surfaces at one longitudinal end are substantially mirror images of ramp surfaces at the opposite longitudinal end, and only one set of ramp surfaces will be described further. In the illustrated example, the adapter 600A includes first and second ramp surfaces 672 and 674. Each ramp surface extends laterally outward from an adjacent converging surface, either 664 or 666, to a respective perimeter portion of the adapter 600A. Each ramp surface extends from the respective longitudinal end portion 668 inward toward the opposite longitudinal end portion to the bottom surface 670. Each ramp surface helps to guide the adapter 600A into engagement with the complementary component on a concrete float assembly.

In the illustrated example, the adapter 600A includes a plurality of fasteners 676 and 678 threaded into respective threaded openings in the top of the adapter 600A. The fasteners can be used in substantially the same way as the fasteners 610 described with respect to FIGS. 1-5 herein. When the adapter 600A is mounted on a complementary component on a concrete float assembly, such as float assembly 400 with an interface component 500, the fasteners 676 and 678 can be threaded into engagement with the interface component 500, placing the complementary surfaces in tension and thereby securing the adapter 600A and any associated pivot assembly or vibration assembly together with the concrete float assembly.

The adapter 600A can include one or more mounting configurations for mounting the adapter 600A to an overlying pivot assembly or vibration assembly for use with a concrete float to which the adapter 600A is mounted. In the present example, the mounting configurations include one or more fastener openings, in the present example 2 sets of four fastener openings in each set, 680 and 682, respectively. Other mounting arrangements may be used in an alternative. In the present example, the first set 680 of fastener openings is arranged in a rectangular array and can be used to secure a first configuration for a pivot assembly or vibration assembly, and the second set 682 of fastener openings can be used to secure a second configuration for a pivot assembly or vibration assembly. For example, the fastener openings can receive bolts through the openings for threading into complementary threaded components, for example nuts or threaded bores. Other arrangements can be used to secure the adapter 600A on to a pivot assembly or vibration assembly, to be used with a concrete float assembly.

Complementary interface components can be configured and assembled together or combined together so that a concrete float among any of a plurality of concrete floats can be mounted on and supported by a pivot assembly among any of a plurality of pivot assemblies. One example of an assembly of complementary interface components includes adapter 500A and adapter 600A, illustrated in one example in FIGS. 21 and 23. The adapter 500A and adapter 600A can be first and second interface components, interengaging with each other through one or more complementary structures, in the present example a dovetail joints arrangement, but which may include any of the complementary structures described herein. The first and second interface components also allow easy connect and disconnect of associated concrete float and pivot assembly components, for example because of the inter-engagement. The first and second interface components can be provided as an assembly together, for example in the form of a kit, which can be sold for use in assembling a suitable concrete float with a suitable pivot assembly. The first and second interface components can be configured so that a first interface component can be attached to a variety of concrete floats, or configured to attach to a specific concrete float, and so that the second interface component can be attached to a variety of pivot assemblies, or configured to attach to a specific pivot assembly. In the present example, the adapter 500A and the adapter 600A are provided as an assembly or a kit, allowing the user to attach the adapter 500A to a conventional float 700 through appropriate fasteners, for example as described herein with respect to the adapter 500A, and to attach the adapter 600A to a pivot assembly, for example as described herein with respect to the adapter 600A. In the example illustrated in FIGS. 21-23, the adapter 500A is secured into respective ones of four internally threaded openings in longitudinally extending ribs 702 of the concrete float through fasteners 704, for example through openings 540 (FIGS. 16-17) into the threaded openings in the concrete float. In the present example, the concrete float 700 has existing threaded openings for receiving complementary fasteners on a pivot assembly, as is conventional. Also in the present example, the adapter 500A is configured so that the fasteners 704 can use the pre-existing threaded bores for securing the adapter 500A to the float 700. Additionally, the adapter 500A might also be configured to have openings sufficient to allow connection to other concrete float configurations, or may have additional attachment configurations to accommodate other float configurations. Conversely, the adapter 500A can be configured to be unique to attach to only a single concrete float configuration.

Figure 19:
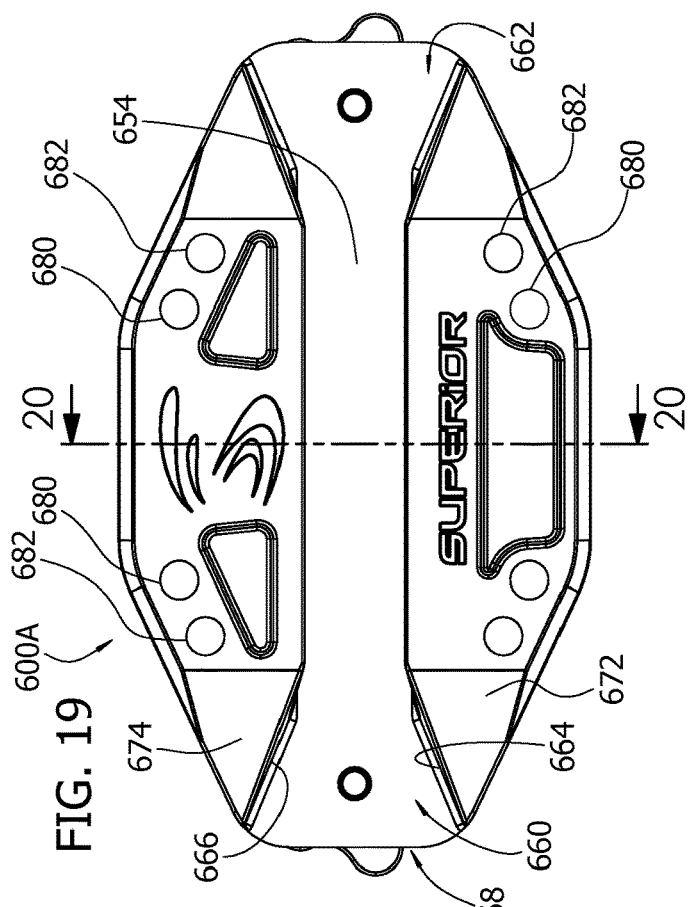
FIG. 19 is a bottom plan view of the adapter of FIG. 18.
Figure 20:
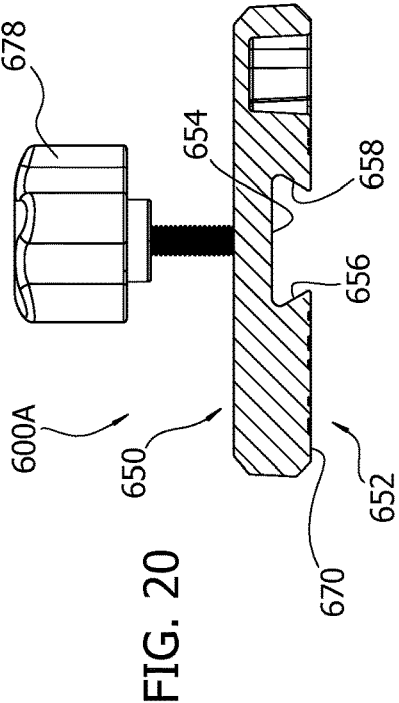
FIG. 20 is a transverse cross-section view of the adapter of FIG. 18.

The second interface component of the assembly in the present example takes the form of the adapter 600A, as described herein. The adapter 600A is secured to a pivot assembly 706, shown schematically in FIGS. 21 and 23. In the present example, the adapter 600A is secured to the pivot assembly 706 through one or more of the sets of openings 680 and/or 682 (FIG. 19). However, other means for attaching the adapter 600A to a pivot assembly such as pivot assembly 706 can be included or incorporated into the adapter 600A, to allow the adapter 600A to be attached to different pivot assemblies, or configured to attach only to a single pivot assembly configuration. The pivot assembly 706 represents any conventional pivot assembly, or vibration assembly, or may be configured to mount to the vibration assembly and/or pivot assembly described herein.

In the example shown in FIGS. 21-23, the interface assembly allows easy or quick attachment and release of a pivot assembly from a float. The adapter 500A can be mounted to the concrete float 700 with removable fasteners, or in another example may be permanently secured to the concrete float, for example by welding or otherwise. Similarly, the adapter 600A can be releasably mounted to a pivot assembly, or may be configured to be permanently incorporated into a pivot assembly in another example. The adapter 500A provides a four point attachment configuration using a relatively planar support structure for attachment, and for supporting the dovetail interface 530, or other male inter-engagement component. Alternatively, the interface component attached to the concrete float can include a female inter-engagement component, and the interface component attached to the pivot assembly can include a male inter-engagement component. Interface or interengaging configurations or geometries in the examples illustrated are dovetail joints configurations, but other configurations may include other mortise and tendon joint configurations, a sandwich of planar components where the planar components are secured to each other by post on one extending through openings through the other and secured by pins such as cotter pins or other securement's, a cam plate and a follower plate assembled either laterally into engagement with each other or frontward as a foot into a shoe, or backward, and secured by a pin, cover plate or other securement, or the planar components can be secured by magnetic attraction, latches, spring-loaded detent holding components, over center latches or other securable interengaging geometries.

Interface components can take a number of configurations, and any of the interface components described herein can be used to combine a concrete finishing tool such as those described herein with a control assembly, for example a pivot assembly, vibration assembly, and the assembly, or other components. Interface components can be formed as part of the assembly with which it is associated, or can be attached such as would occur with an aftermarket device. Interface components can also be formed as part of one or more adapters, and pairs of complementary adapters can be used to improve existing equipment or existing equipment designs. Examples of pairs of complementary adapters will be described below, it being understood that any given interface component included as part of an adapter or pair of adapters can be incorporated into the associated equipment, for example concrete finishing tools and/or control assemblies such as pivot assemblies, and vibration assemblies and the like. It is also understood that any adapter described as part of a pair of adapters can be used independently to join its associated assembly with a suitable mating interface. The pairs of adapters described below include interface components, any one or both of which can be incorporated into adapters where the underlying equipment. Some of the interface components are passive and some are active. Some of the interface components limit movement in one or more of the X, Y, or Z directions once the interface components are aligned or matched up and joined for securement and prior to securement, and after securement they limit movement in all three of the directions. Means for interfacing between a concrete finishing tool and a pivot assembly, with or without vibration apparatus, are any of the interface components discussed herein.

Figure 24:
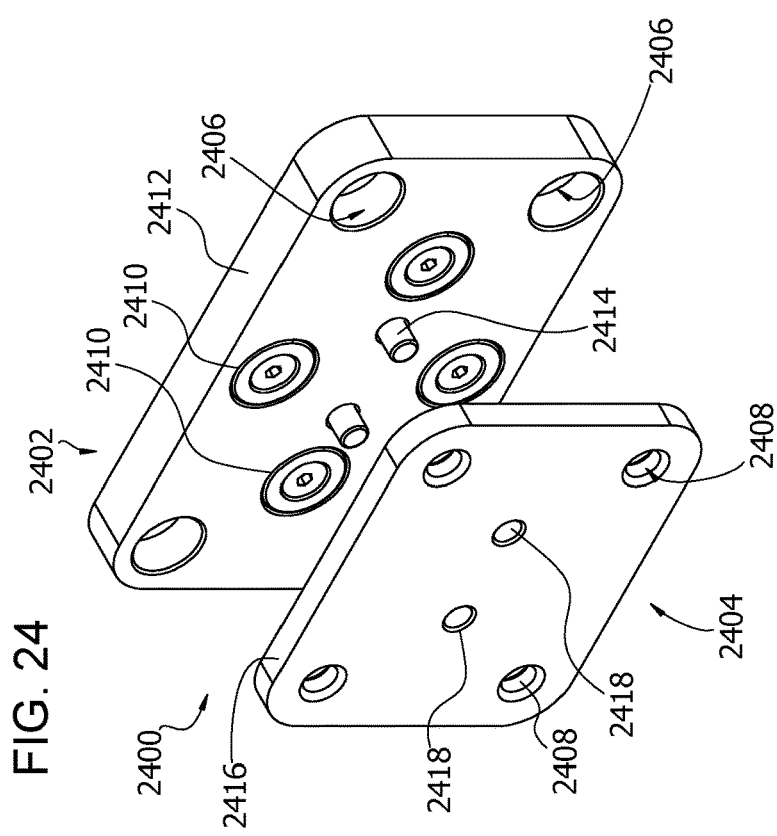
FIG. 24 is an isometric view of an example of an interface for joining concrete finishing tools to pivot assemblies in the form of paired adapters configured for passive securement using magnetic components.

Passive interface components are included in a pair of adapters 2400 (FIG. 24) having a tool adapter 2402 and a second adapter, in the present example a pivot adapter 2404. The tool adapter 2402 includes suitable mounting configurations 2406 for mounting the adapter to a concrete finishing tool, for example a float or groover, and the pattern for the mounting configurations 2406 will approximate the mounting configuration established in the tool. The pivot adapter 2404 also includes mounting configurations 2408 for mounting the adapter to a pivot assembly, and the pattern for the mounting configurations 2408 will approximate the mounting configuration established in the pivot assembly.

The pair of adapters 2400 include interface components using magnetic fields for securing the interfaces together. In the present example, the tool adapter 2402 includes a plurality of magnets 2410 formed in or on the adapter plate 2412. The size and distribution pattern of the magnets are selected as desired, based on the sizes and weights and loading of the components/assembly. The tool adapter 2402 also includes locator 25 components to assist in aligning or matching up the tool adapter with the pivot adapter 2404. In the present example, the locator components are a pair of pins or posts 2414 extending normal to the surface of the adapter plate 2412. The interface component for the pivot adapter 2404 includes a distributed ferrous-containing plate 2416 for being retained by the magnetic field provided by the magnets 2410, or a plate containing other magnets. The pivot adapter also includes locator components, in the present example openings or apertures 2418.

With the pair of adapters 2400 secured to their respective components (concrete finishing tool and pivot assembly), the user can assemble the tool and pivot assembly by aligning or matching up the respective adapters and joining or placing them together. The pins 2414 engage the openings 2418, which limits relative movement in the X and Y directions. The magnetic field developed by the magnets 2410 secure the adapter 2404 and limit movement in the direction. Therefore, once the adapters are aligned and placed together, no further action by the user is necessary for reliable limitation of movement in the X, Y and Z directions. Threading of a fastener, insertion of a pin, moving of a latch or other elements with user actions can be excluded but is optional. Moreover, limitation of movement in the Z direction is accomplished without additional user involvement. Securement of the adapter pairs can also be accomplished with additional mechanisms, for example detent pins for passive interface components, or for example latches, locks, fasteners or other active devices.

In another example of a passive interface component (FIG. 25), a pair of adapters 2500 includes a tool adapter 2502 and a second adapter 2504, in the present example a pivot adapter. The tool adapter includes suitable mounting configurations 2506 for mounting the adapter to a concrete finishing tool, for example a float or groover, and the pattern for the mounting configurations 2506 will approximate the mounting configuration established in the tool. The pivot adapter 2504 also includes mounting configurations 2508 for mounting the adapter to a pivot assembly, and the pattern for the mounting configurations 2508 will approximate the mounting configuration established in the pivot assembly.

Figure 25:
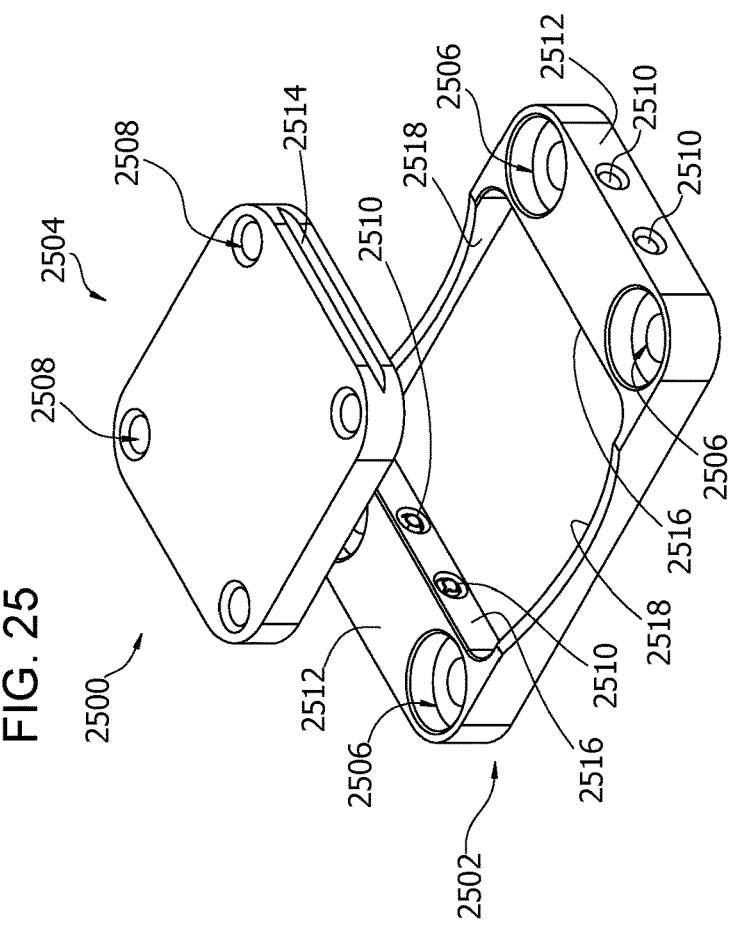
FIG. 25 is an isometric view of another example of an interface for joining concrete finishing tools to pivot assemblies in the form of paired adapters configured for passive securement using detents.

The pair of adapters 2500 include interface components using detents and cavities for securing the interfaces together in the present example, the tool adapter 2502 includes a plurality of detents pins 2510 secured in walls in the adapter plate 2512. The size and position of the detent pins are selected as desired, based on the sizes and weights and loading of the components/assembly. The tool adapter 2502 includes cavities for receiving the detent pins, in the present example laterally extending grooves 2514 on opposite sides of the pivot adapter 2504, only one side of which is shown in FIG. 25. The tool adapter 2502 also includes locator components in the form of sidewalls 2516 and front and back walls 2518 for helping to align or match up the adapters. The walls also help to limit movement of the adapters relative to each other in the X and Y directions. The detents in the cavities limit movement in the Z direction.

With the pair of adapters 2500 secured to their respective components (concrete finishing tool and pivot assembly), the user can assemble the tool and pivot assembly by aligning or matching up and joining the respective adapters and placing them together. The pivot adapter is positioned within the walls 2516 and 2518, and the pivot adapter pressed into the cavity defined by the walls so that the detents engage the grooves 2514. The detents limit movement in the Z direction. Therefore, once the adapters are aligned and placed together, no further action by the user is necessary for reliable limitation of movement in the X, Y and Z directions. Threading of a fastener, insertion of a pin, moving of a latch or other elements with user actions can be excluded but is optional, and limitation of movement in the Z direction is accomplished without additional user involvement. Additionally or alternatively, securement of the adapter pairs can also be accomplished with additional mechanisms, for example magnets for passive interface components, or for example latches, locks, fasteners or other active devices.

In another example of a device (interface components) that limits movement in the Z direction (FIG. 26), a pair of adapters 2600 includes a tool adapter 2602 and a second adapter 2604, in the present example a pivot adapter. The tool adapter includes suitable mounting configurations 2606 for mounting the adapter to a concrete finishing tool, for example a float or groover, and the pattern for the mounting configurations 2606 will approximate the mounting configuration established in the tool. The pivot adapter 2604 also includes mounting configurations 2608 for mounting the adapter to a pivot assembly, and the pattern for the mounting configurations 2608 will approximate the mounting configuration established in the pivot assembly.

The pair of adapters 2600 include interface components using an asymmetric channel or groove configuration and in the present example a dovetail-like geometry. The tool adapter 2602 includes an asymmetric channel or groove 2610, in the present example including a first vertical wall 2612 and a second undercut or angled wall 2614, so that the base of the channel or groove 2610 has a larger surface area than the surface of the opening to the channel in the Z direction. The pivot adapter 2604 is a substantially planar member with three substantially vertical side walls and a converging angled wall complementary to the angled wall 2614 in the tool adapter. The angled wall 2614 limits movement of the pivot adapter 2604 in the X and Z directions, and the vertical wall 2612 limits movement in the X direction.

The pair of adapters 2600 also include an active securement mechanism, in the present example a pivoting latch 2616. The pivoting latch is retained by a suitable fastener 2618 in a latch cavity 2620 in the tool adapter, and can pivot into a continuous latch cavity 2622 in a side surface, and in the present example an upper surface of the pivot adapter. The fastener 2618 can include detents, a cam arrangement or other configuration for holding the latch in the latch cavity 2622 during normal operation.

With the pair of adapters 2600 secured to their respective components (concrete finishing tool and pivot assembly), the user can assemble the tool and pivot assembly by aligning or matching up and joining the respective adapters and sliding the pivot adapter relative to the tool adapter in the Y direction with the pivot adapter angled wall under the tool adapter angled wall 2614. When the pair of adapters are aligned, movement of the pivot adapter in the X and Z directions is limited, and when the user moves the latch 2616 into or over the pivot adapter, movement in the Y direction and all movement in the Z direction is limited. Threading of a fastener, insertion of a pin, or other elements with user action can be excluded but is optional if such structures are desired to be included.

In another example of a device (interface components) that limits movement in the Z direction (FIGS. 27-28), a pair of adapters 2700 includes a tool adapter 2702 and a second adapter 2704, in the present example a pivot adapter. The tool adapter includes suitable mounting configurations 2706 for mounting the adapter to a concrete finishing tool, for example a float or groover, and the pattern for mounting configurations 2706 will approximate the mounting configuration established in the tool. The pivot adapter 2704 also includes mounting configurations 2708 for mounting the adapter to a pivot assembly, and the pattern for the mounting configurations 2708 will approximate the mounting configuration established in the pivot assembly.

The pair of adapters 2700 include an interface components using an asymmetric channel or groove configuration and in the present example a dovetail-like geometry and a stairstep geometry. The tool adapter 2702 includes an asymmetric channel or groove 2710, in the present example including a reverse stairstep wall 2712 forming a ledge 2714 extending over the channel or groove 2710. The channel or groove 2710 also includes a second undercut or angled wall 2716. With a stairstep wall 2712 and the angled wall 2716, the base of the channel or groove 27 and has a larger surface area than the surface of the opening to the channel in the Z direction. The pivot adapter 2704 is a substantially planar member with two substantially vertical sidewalls, a stairstep wall 2718 on a third side and a converging angled wall 2720 on an opposite force wall. The stairstep wall and the angled wall limit movement of the pivot adapter 2704 in the X and Z directions.

The pair of adapters 2700 also include an active securement mechanism, in the present example a slide latch 2722, which slide latch is retained under a retainer bar 2724. The slide latch can also be positioned in side grooves in the sidewalls of the cavity in which the slide latch slides. The slide latch includes a locking portion 2726 that, when activated by pushing on the actuator structure 2728, extends over and/or into a cavity 2730 in a side and/or top of the pivot adapter 2704. The slide latch helps to limit motion of the pivot adapter relative to the tool adapter in the X, Y, and Z directions.

With the pair of adapters 2700 secured in their respective components (concrete finishing tool and pivot assembly), the user can assemble the tool and pivot assembly by aligning or matching up and joining the respective adapters and sliding the pivot adapter relative to the tool adapter in the Y direction with the pivot adapter angled wall under the tool adapter angled wall, and the pivot stairstep wall under the tool adapter stairstep wall. When the pair of adapters are aligned, movement of the pivot adapter in the X and Z directions is limited, and when the user moves the latch 2722 into or over the pivot adapter, movement in the Y direction and all movement in the Z direction is limited. Threading of a fastener, insertion of a pin, or other elements with user action can be excluded, but is optional if such structures are desired to be included.

In another example of a device (interface components) that limits movement in the Z direction (FIGS. 29-32), a pair of adapters 2900 includes a tool adapter 2902 and a second adapter 2904, in the present example a pivot adapter. The tool adapter includes suitable mounting configurations 2906 for mounting the adapter to a concrete finishing tool, for example a float or groover, and the pattern for the mounting configurations 2906 will approximate the mounting configuration established in the tool. The pivot adapter 2904 also includes mounting configurations 2908 for mounting the adapter to a pivot assembly, and the pattern for the mounting configurations 2908 will approximate the mounting configuration established in the pivot assembly.

The pair of adapters 2900 include interface components using an asymmetric channel or groove configuration and in the present example a dovetail-like geometry similar to that described with respect to FIG. 26. The tool adapter 2902 includes an asymmetric channel or groove 2910, in the present example including a first vertical wall 2912 and a second undercut or angled wall 2914, so that the base of the channel or groove 2910 has a larger surface area than the surface of the opening to the channel in the Z direction. The pivot adapter 2904 is substantially planar member with a dovetail interface component 2916 similar to the dovetail 530 attached, secured to or otherwise made part of the planar member. The geometry and the configuration of the dovetail interface is substantially similar to the dovetail 530 described herein. The dovetail interface component and the angled wall 2914 limit movement of the pivot adapter 2904 in the X and Z directions, and the vertical wall 2912 limits movement in the X direction.

The pair of adapters 2900 also include an active securement mechanism, in the present example a bias key or a compression key 2918 (FIGS. 29-30 and 33). The compression key includes a slide plate 2920 and an angled wall 2922. A substantially straight and vertical sidewall 2924 is opposite the angled wall 2922, and a boss 2926 extends away from the vertical sidewall 2924. A threaded bolt or screw 2928 (FIG. 29) is longitudinally fixed at one side of the tool adapter 2902 and allowed to rotate relative to the tool adapter. The threaded bolt is threaded into the boss 2924, and rotation of the bolt extends or retracts the compression key 2918.

With the pair of adapters 2900 secured to their respective components (concrete finishing tool and pivot assembly), the user can assemble the tool and pivot assembly by aligning or matching up and joining the respective adapters and sliding the pivot adapter relative to the tool adapter in the Y direction with the slanted wall 2922 of the compression key recessed or hidden in a cavity in the tool adapter 2902 underneath a cover plate 2930 secured by a plurality of fasteners 2932. When the adapters are aligned, the bolt is pivoted or rotated to draw the angled wall 2922 against the complementary angled wall on the interface component 2916 and pressure applied to the dovetail 2916, sandwiching the dovetail between the angled wall 2922 and the angled wall 2914. The pair of adapters are then secured in each of the X, Y and Z directions. Threading of an additional fastener, insertion of a pin, moving of a latch or other elements with user action can be omitted and is not necessary to secure the adapters relative to each other, but is optional if desired to be included.

In another example of a device (interface components) that limits movement in the Z direction (FIGS. 34-35), a pair of adapters 3400 includes a tool adapter 3402 and a second adapter 3404, in the present example a pivot adapter. The tool adapter includes suitable mounting configurations 3406 for mounting the adapter to a concrete finishing tool, for example a float or groover, and the pattern for the mounting configurations 3406 will approximate the mounting configuration established in the tool. The pivot adapter 3404 also includes mounting configurations 3408 for mounting the adapter to a pivot assembly, and the pattern for the mounting configurations 3408 will approximate the mounting configuration established in the pivot assembly.

The pair of adapters 3400 include interface components using an asymmetric channel or groove configuration and in the present example a groove combined with a stairstep surface. The tool adapter 3402 includes an asymmetric channel or groove 3410, in the present example including a recessed channel 3412 and intersecting or stairstep walls 3414. An upwardly-facing surface of the intersecting walls 3414 include a plurality of locating elements in the form of locating pins 3416 for receiving and positioning a bar or plate 3418. The intersecting walls and the plate 3418 form a recessed channel 3420.

The pair of adapters 3400 also include an active securement mechanism, in the present example a threaded bolt 3422 (FIG. 34). The threaded bolt is threaded into a threaded opening in the upper surface of the intersecting wall 3414, and includes a lower bearing surface for bearing against the plate 3418. When the bolt is threaded into its bore, the bearing surface bears against the plate 3418, applying pressure to the plate and forcing the plate downward toward the underlying tool adapter 3402.

With the pair of adapters 3400 secured to their respective components (concrete finishing tool and pivot assembly), the user can assemble the tool and pivot assembly by aligning or matching up and joining the respective adapters and sliding the pivot adapter relative to the tool adapter in the Y direction with base walls 3424 on the pivot adapter extending in the recessed grooves 3412 and 3420. When the front and back of the pivot adapter is aligned with the front and back sides of the tool adapter, relative movement between the pivot adapter and the tool adapter in the Z direction is limited, as well as movement in X direction. When the user seats the bolt 3422 securely against the plate 3418, the plate applies pressure to the underlying base wall 3424 on the pivot adapter, and holds the pivot adapter in place, limiting movement of the pivot adapter in the Y direction, as well as in the X and Z directions. The pair of adapters are then secured in each of the X, Y and Z directions. Threading of an additional fastener, insertion of a pin, moving of a latch or other elements with user action can be omitted and is not necessary to secure the adapters relative to each other, but is optional if desired to be included.

In another example of a device (interface components) that limits movement in X and Y directions (FIG. 36), a pair of adapters 3600 includes a tool adapter 3602 and a second adapter 3604, in the present example a pivot adapter. The tool adapter includes suitable mounting configurations 3606 for mounting the adapter to a concrete finishing tool, for example a float or groover, and the pattern for mounting configurations 3606 will approximate the mounting configuration established in the tool. The pivot adapter 3604 also includes mounting configurations 3608 for mounting the adapter to a pivot assembly, and the pattern for the mounting configurations 3608 will approximate the mounting configuration established in the pivot assembly.

The pair of adapters 3600 include interface components using pins or posts and openings for allowing easy assembly of the adapters while limiting movement in the X and Y directions. The tool adapter 3602 includes a pair of spaced apart pins or posts 3610, each with a respective apertures or bores 3612 for receiving cotter pins or other securement pins 3614 after the pivot adapter is placed. The pivot adapter includes a pair of positioning openings 3616 for engaging respective ones of the pins 3610 when the two adapters are aligned and brought together.

The pair of adapters 3600 include an active securement configuration, in the present example engagement of the cotter pins 3614 in the respective bores 3612 after the pivot adapter 3604 is placed over the pins or posts 3610 and against the facing surface of the tool adapter 3602.

With the pair of adapters 3600 secured to their respective components (concrete finishing tool and pivot assembly), the user can assemble the tool and pivot assembly by aligning or matching up and joining the respective adapters and placing the pivot adapter openings 3616 over the pins or posts 3610. When the pivot adapter is against the facing surface of the tool adapter 3602, relative movement between the pivot adapter and the tool adapter in the X and Y directions is limited. When the user inserts the cotter pins 3614, the pivot adapter 3604 is held in place on the posts and against the tool adapter, so that the pair of adapters are limited in movement in the X, Y and Z directions. Threading of a fastener, insertion of an additional pin, moving of a latch or other elements with user action can be omitted and is not necessary to secure the adapters relative to each other, but is optional if desired to be included.

In another example of a device (interface components) that limits movement in the Z direction (FIGS. 37-38), a pair of adapters 3700 includes a tool adapter 3702 and a second adapter 3704, in the present example a pivot adapter. The tool adapter includes suitable mounting configurations (not visible) for mounting the adapter to a concrete finishing tool, for example a float or groover, and the pattern the mounting configurations will approximate the mounting configuration established in the tool. In the present example, the mounting configurations are countersunk into the base of the adapter 3702 and covered by the pivot adapter 3704. The pivot adapter 3704 also includes mounting configurations 3708 for mounting the adapter to a pivot assembly, and the pattern for the mounting configurations 3708 will approximate the mounting configuration established in the pivot assembly.

The pair of adapters 3700 include interface components using an asymmetric cavity configuration and in the present example a cavity having three substantially straight sidewalls and a fourth undercut wall. The adapter 3702 includes an asymmetric cavity 3710 defined by three substantially straight vertical sidewalls 3712 and an undercut or dovetail-like angled wall 3714. Together the walls form the asymmetric cavity 3710. The pivot adapter includes three substantially straight walls 3716 and a slanted converging wall 3718.

The pair of adapters 3700 also includes a plurality of active securement mechanisms, in the present example pivoting latch plates 3720 and a threaded or otherwise securable insert pin 3722, configured to extend through the wall 3712 and into the pivot adapter 3704. When the latch plates and the insert pin are in place, the adapters are secured together, and limited in movement in the X, Y and Z directions.

When the pair of adapters 3700 are secured to their respective components (concrete finishing tool and pivot assembly), the user can assemble the tool and pivot assembly by aligning or matching up and joining the respective adapters. The slanted wall 3718 of the pivot adapter is positioned under the slanted wall 3714 in the tool adapter cavity 3710, and the rest of the pivot adapter inserted or dropped into the tool adapter cavity 3710. With the pivot adapter in the tool adapter cavity, movement in the Z direction is limited, and also movement in the X and Y directions is limited. The user can then position the latch plates 3720 over the pivot adapter, and insert the pin 3722 and secure it in the corresponding opening in the pivot adapter 3704. Insertion of any additional fastener, insertion of an additional pin, moving of additional latches or other elements with user action can be omitted and is not necessary to secure the adapters but is optional if desired to be included.

In another example of a device (interface components) that limits movement in the Z direction (FIGS. 39-40), a pair of adapters 3900 includes a tool adapter 3902 and a second adapter 3904, in the present example a pivot adapter. The tool adapter includes suitable mounting configurations 3906 for mounting the adapter to a concrete finishing tool, for example a float or groover, and the pattern for the mounting configurations 3906 will approximate the mounting configuration established in the tool. The pivot adapter 3904 also includes mounting configurations 3908 for mounting the adapter to a pivot assembly, and the pattern for the mounting configurations 3908 will approximate the mounting configuration established in the pivot assembly.

The pair of adapters 3900 include interface components using a twist connection, or may instead use a bayonet mount. The tool adapter 3902 includes a slot or groove 3910 through an upper surface 3912 of the tool adapter. The slot 3910 is configured to accommodate a plate or boss 3914 extending or raised up on a post from an adjacent surface of the pivot adapter 3904. The plate 3914 has a shape and surface configuration to allow reliable insertion of the plate through the slot 3910 and to reliably contact and bear against a bearing surface 3916 in a cavity 3918 in a bottom surface 3920 of the tool adapter.

With the pair of adapters 3900 secured to the respective components (concrete finishing tool and pivot assembly), the user can assemble the tool and pivot assembly by aligning or matching up and joining the respective adapters so that the plate 3914 fits through the opening 3910 followed by turning the components a quarter turn or 90° relative to each other so that the plate 3914 bears against the bearing surfaces 3916. With the pivot adapters thus aligned, relative movement between the pivot adapter and the tool adapter in the Z direction is limited, as well as movement in the X and Y directions. The pair of adapters are then secured in each of the X, Y and Z directions. Threading of fasteners, insertion of pins, moving of latches or other elements with user action can be omitted and is not necessary to secure the adapters relative to each other, but is optional if desired to be included.

In another example of a device (interface component) that limits movement in the—42), a pair of adapters 4100 includes a tool adapter 4102 and a second adapter 4104, in the present example a pivot adapter. The tool adapter includes suitable mounting configurations 4106 for mounting the adapter to a concrete finishing tool, for example a float or groover, and the pattern of the mounting configurations 4106 will approximate the mounting configuration established in the tool. The pivot adapter 4104 also includes mounting configurations 4108 for mounting the adapter to a pivot assembly, and the pattern for the mounting configurations 4108 will approximate the mounting configuration established in the pivot assembly.

The pair of adapters 4100 include interface components using an asymmetric cavity. The tool adapter 4102 includes an asymmetric cavity 4110, in the present example defined by three vertical walls 4112 and an undercut or slanted wall 4114. In this configuration of the asymmetric cavity, the area of the base of the cavity is greater than the area of the opening defined by the four walls. The pivot adapter 4104 includes three substantially straight vertical walls 4116, conforming to the substantially vertical walls 4112, and a converging slanted wall 4118 conforming to the undercut slanted wall 4114.

Figure 41:
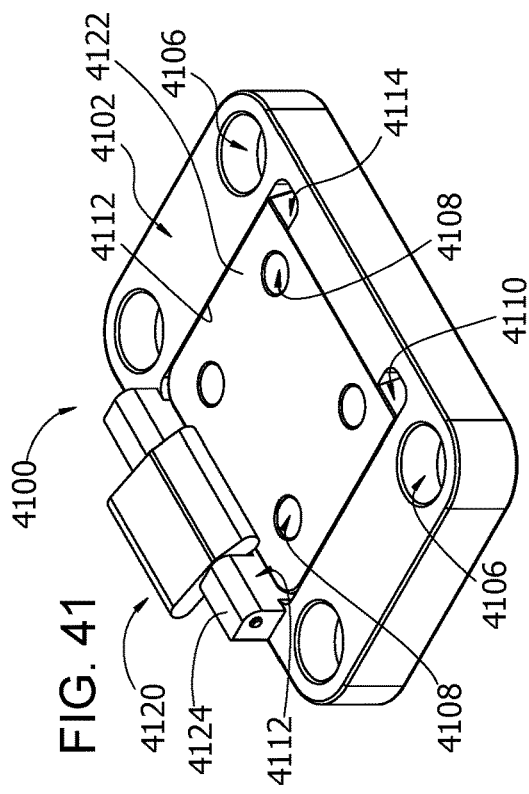
FIG. 41 is an isometric view of another example of an interface for joining concrete finishing tools to pivot assemblies in the form of paired adapters that once aligned limit movement in the X, Y and Z planes, before being manually secured.
Figure 42:
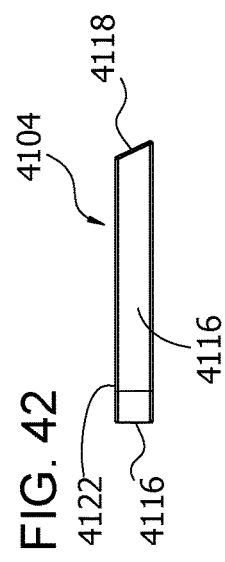
FIG. 42 is an end elevation view of an adapter used in the assembly of FIG. 41.

The pair of adapters 4100 also include an active securement mechanism, in the present example a biased lever 4120, biased into engagement with an upper surface 4122 of the pivot adapter. The lever 4120 is supported on each side by respective posts 4124 by one or more pins extending into the posts and the lever. The lever is biased in a clockwise direction as viewed in FIG. 41 by a coil spring (not shown). The lever is moved out of the path of the pivot adapter 4104 for allowing insertion of the pivot adapter into the cavity or release there from by depressing the outer or exposed edge surface of the lever counterclockwise so that the adjacent portion of the pivot adapter can clear the path into or out of the cavity. In another configuration, the lever can be biased linearly in a direction so that the lever extends over the upper surface 4122, so that inserting the pivot adapter under the slanted wall 4114 and pressing the opposite side of the pivot adapter against the adjacent edge of the lever pushes the lever outward to clear the path for the pivot adapter into the cavity. In such a configuration, manual depression or movement of the lever to insert the pivot adapter into the cavity can be bypassed.

With the pair of adapters 4100 secured to their respective components (concrete finishing tool and pivot assembly), the user can assemble the tool and pivot assembly by aligning or matching up and joining the respective adapters and inserting the slanted wall of the pivot adapter under the slanted wall 4114 in the cavity. The lever 4120 is moved to clear the path for the pivot adapter into the cavity, and the pivot adapter is seated in the cavity between the straight walls and the slanted wall. Consequently, relative movement between the pivot adapter and the tool adapter in the direction is limited, as well as movement in the X and Y directions. Additionally, when the lever 4120 is released, the lever applies a pressure to the upper surface of the pivot adapter 4104 and holds the pivot adapter in place, further limiting movement of the pivot adapter in the Z direction. The pair of adapters are then secured in each of the X, Y and Z directions. Threading of a fastener, insertion of a pin, movement of the latch or other elements with user action can be omitted and is not necessary to secure the adapters relative to each other, but is optional if desired to be included.

Figure 43:
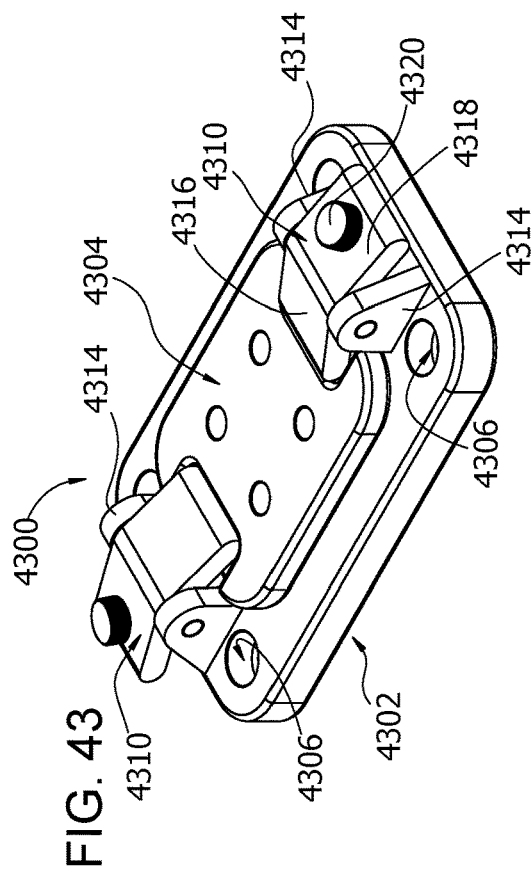
FIG. 43 is an upper isometric view of another example of an interface for joining concrete finishing tools to pivot assemblies in the form of paired adapters that once aligned limit movement in the X and Y planes before being manually secured.
Figure 44:
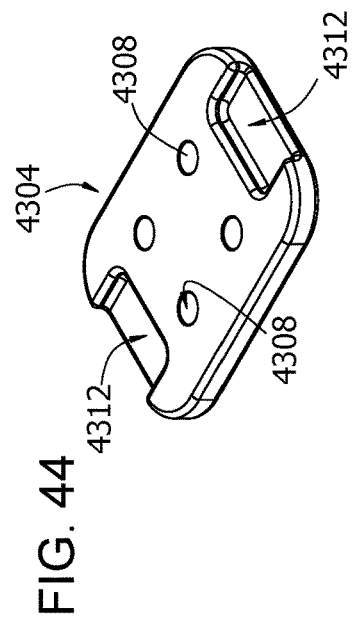
FIG. 44 is an upper isometric view of an adapter used in the assembly of FIG. 43.

In another example of a device (interface components) that limits movement in the Z direction (FIGS. 43-44), a pair of adapters 4300 includes a tool adapter 4302 and a second adapter 4304, in the present example a pivot adapter. The tool adapter includes suitable mounting configurations 4306 for mounting the adapter to a concrete finishing tool, for example a float or groover, and the pattern for the mounting configurations 4306 will approximate the mounting configuration established in the tool. The pivot adapter 4304 also includes mounting configurations 4308 for mounting the adapter to a pivot assembly, and the pattern for the mounting configurations 4308 will approximate the mounting configuration established in the pivot assembly.

The pair of adapters 4300 include interface components using holding components on the tool adapter and complementary cavities or complementary receptacles for receiving the holding components. In an alternative configuration (not shown) the tool adapter can include a cavity conforming to the perimeter geometry of the pivot adapter for receiving a comparably shaped pivot adapter 4304.

The pair of adapters 4300 also include an active securement mechanism, in the present example securement levers 4310 on the tool adapter and complementary cavities, recesses or engagement surfaces 4312 on the pivot adapter. The tool adapter includes oppositely positioned securement levers 4310, each mounted on a respective pivot bracket 4314 by one or more pins extending into the respective bracket and pivot. Each lever includes an interior active lever arm 4316 and a control lever arm 4318 on opposite sides of the pivot axis. The active lever arm 4316 engages and bears against the corresponding cavity 4312 in the pivot adapter, and the control lever arm includes a bolt or other fastener 4320 rotatable within an opening in the control lever arm such that rotation of the bolt raises or lowers the control lever arm, thereby lowering or raising the active lever arm.

With the pair of adapters 4300 secured to their respective components (concrete finishing tool and pivot assembly), the user can assemble the tool and pivot assembly by aligning or matching up and joining the respective adapters with the levers raised sufficiently to permit the tool adapter to move in the Y direction under the levers, for example by sliding across the facing surface of the tool adapter. When the cavities 4312 on the pivot adapter are aligned with the respective active lever arms 4316, the pivot adapter is limited in movement in the Z direction. When the user threads the bolts 4320 to place the active lever arms 4316 securely in the cavities 4312 of the pivot adapter, movement of the pivot adapter is limited in the X, Y and Z directions. The pair of adapters are then secured in each of the X, Y and Z directions. Threading of additional fasteners, insertion of a pin, moving a latch or other elements with user action can be omitted and is not necessary to secure the adapters relative to each other, but is optional if desired to be included.

Figure 46:
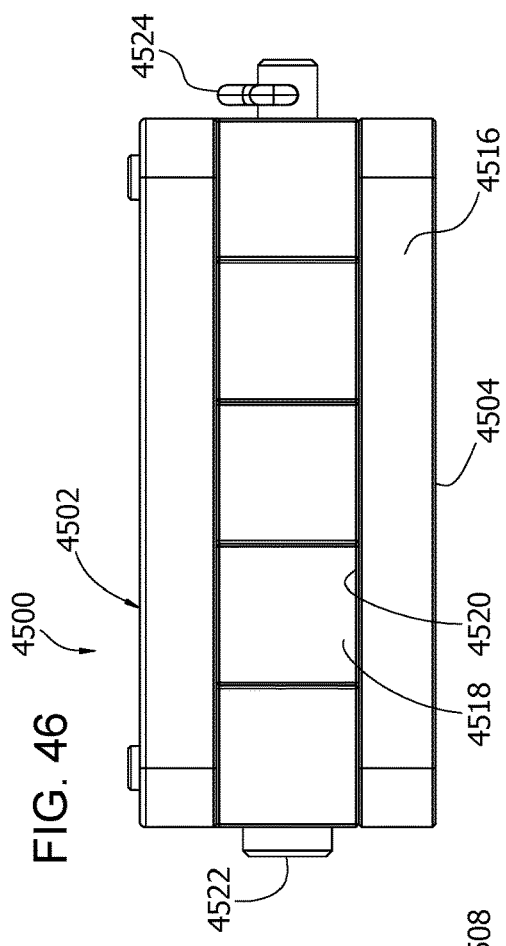
FIG. 46 is a front elevation view of the assembly of FIG. 45.
Figure 47:
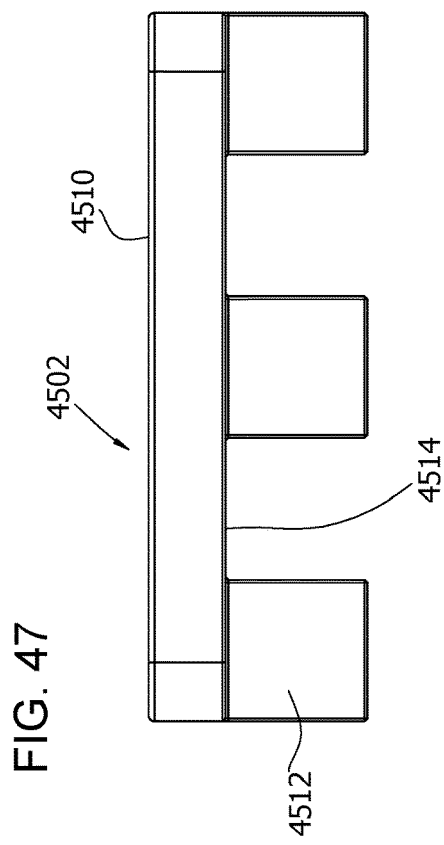
FIG. 47 is a front elevation view of an adapter used in the assembly of FIG. 45.
Figure 45:
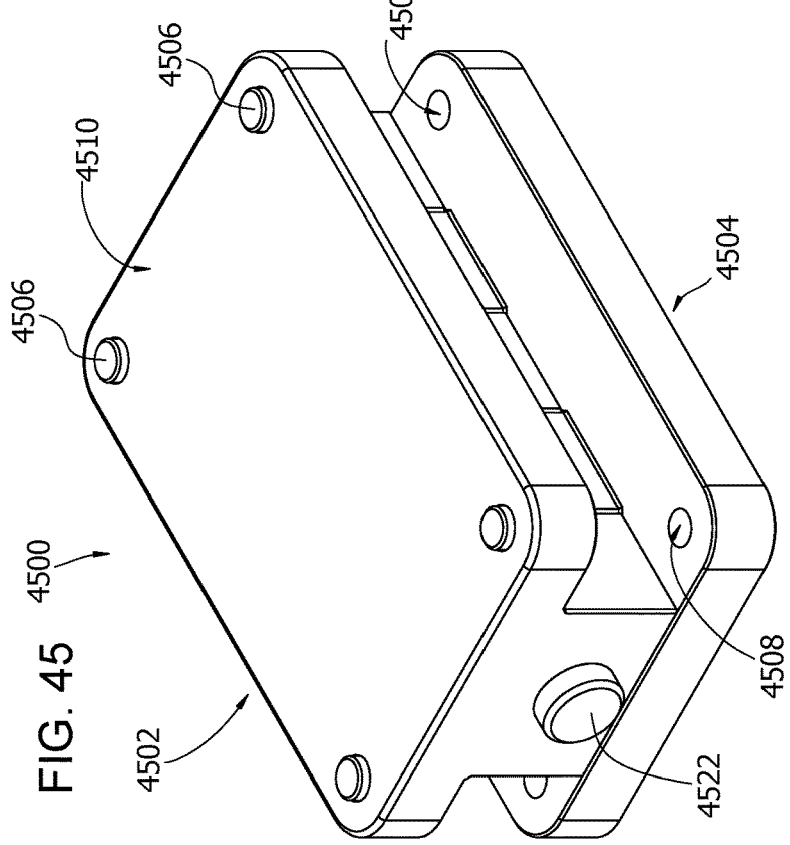
FIG. 45 is a lower isometric view of another example of an interface for joining concrete finishing tools to pivot assemblies in the form of paired adapters that once aligned limit movement in the X plane before being manually secured.

In another example of a device (interface component) that limits movement in the X direction (FIGS. 45-47), a pair of adapters 4500 includes a tool adapter 4502 and a second adapter 4504, in the present example a pivot adapter. The tool adapter includes suitable mounting configurations 4506 for mounting the adapter to a concrete finishing tool, for example a float or groover, and the pattern for the mounting configurations 4506 will approximate the mounting configuration established in the tool. The pivot adapter 4504 also includes mounting configurations 4508 for mounting the adapter to a pivot assembly, and the pattern for the mounting configurations 4508 will approximate the mounting configuration established in the pivot assembly.

The pair of adapters 4500 include interface components using interengaging blocks. In the present example, the tool adapter 4502 includes a mounting plate 4510 and a plurality of inter-engagement blocks 4512 on a first side 4514 of the mounting plate. The illustrated tool adapter includes three inter-engagement blocks 4512. The pivot block 4504 also includes a mounting plate 4516 with respective interengaging blocks 4518 mounted on a first surface 4520 of the mounting plate. The respective interengaging blocks 4512 and 4518 have substantially identical geometries, though it is understood that they can be different while still providing inter-engagement of the adapters. The inter-engagement blocks inter-fit with corresponding inter-engagement blocks on the opposite adapter.

The pair of adapters 4500 also include an active securement mechanism in the form of a headed pin 4522 inserted into and passing through respective aligned bores in each of the inter-engagement blocks when the inter-engagement blocks are positioned so that their outer surfaces are flush with each other. The pin is held in place and secured by a cotter pin or other securement 4524.

When the pair of adapters 4500 are secured to their respective components (concrete finishing tool and pivot assembly), the user can assemble the tool and pivot assembly by aligning or matching up and joining the respective adapters through their inter-engagement blocks so that the bores through the blocks are aligned and the pin 4522 can be inserted into the bores. When the adapters are aligned, relative movement of the adapters is limited in the X direction. When the user inserts the pin 4522, movement of the pivot adapter and tool adapter are limited in the X, Y and Z directions, and when the securement 4524 is in place, the pair of adapters are then secured in each of the X, Y and Z directions. Threading of a fastener, insertion of an additional pin, moving a latch or other elements with user action can be omitted and is not necessary to secure the adapters relative to each other, but is optional if desired to be included.

Another example of a concrete finishing tool includes a groover 4800 (FIGS. 48-50), used for providing a groove in curing concrete. A control assembly such as any of the pivot assemblies or vibration assemblies can be used to manipulate the groover, as would be understood by one skilled in the art considering the disclosure herein. In the illustrated configuration, the groover 4800 includes a dished plate 4802 having a bottom surface 4804 and curved sidewalls, front and rear walls 4806. The groover includes a grooving blade 4808 extending the length of the plate 4802, and a guidepost 4810 extending upward from a distal wall of the groover.

The plate 4802 includes a plurality of spars or other reinforcing structures 4812 on the upper surface of the plate. An interface component 4814 is positioned in the approximate center of the plate extending transversely or in the X direction for receiving a complementary interface component on a control assembly, for example a pivot assembly. The interface component 4814 may take any of the configurations described herein, and is illustrated to be similar to the interface component 530 on the adapter 500A. The interface component 4814 in the illustrated configuration includes all of the structures and functions described with respect to the interface component 530, and can be joined with suitable interface components associated with a control assembly, for example pivot assembly, vibration assembly or the like.

Any of the threaded fasteners described herein for securing the interface components together can be supplemented with or replaced by other securement mechanisms, including but not limited to cam devices, over center devices, detent mechanisms, latch mechanisms and the like.

In use, the concrete finishing apparatus such as that illustrated in FIG. 1 is assembled by moving the pivot assembly, with or without a vibration apparatus, laterally to align the interface component 600 with a dovetail interface portion 500 and sliding the groove over the dovetail portion until the pivot assembly is centered on the dovetail 500. The fasteners are threaded against the dovetail placing the groove and the dovetail under tension. A handle is inserted into the pivot assembly and secured with the detents through the holes 208, and the display and/or vibration assembly if used can be turned on. In the present configuration, the front portion 432 is the distal portion of the float and the back portion 430 is the proximal portion, relative to the user. The user then advances the float assembly on outbound stroke in the conventional manner, for example either flat or with the front slightly elevated. On the return stroke, the back edge 431 can be raised slightly, and if desired the back edge can be used to cut raised or excess concrete, which then curls into the cavity 444. The outbound and return strokes are repeated as necessary with the desired settings until the desired finish configuration is obtained. If desired, the pivot assembly can be removed from the float assembly and the float pivoted 180° and the pivot assembly reattached. In this configuration, the front portion 432 becomes the proximal edge and the back edge 431 becomes the distal edge, and the concrete finished further as desired. In this configuration, the distal edge is the raised slightly on the outbound stroke and then lowered again so that the float is flat during the return stroke. Vibration can be used at all times or at selected times, and if not used continuously, for example, it can be used before the float is pivoted 180°, or after, or as desired by the operator.

With a float having a concave surface on the bottom or working surface, such as those shown in FIGS. 13A-13H, the first contact surface 472, or 488A, 488B, 488C or 498C, is the distal surface, and the finishing apparatus applied as described above. The float is then pivoted 180° and the first contact surface becomes the proximal edge. When the float is flat and first and second surfaces contact the concrete, each surface applies a pressure to the concrete and raises and disperses cream. Surface tension brings cream along the concave surface as a function of the curvature or height variation produced by the concavity. Additionally, a sharp distal edge discourages cream rising up the distal edge.

With the float having a concave surface on the bottom or working surface, such as those shown in FIGS. 13B-13H, finishing begins with the surfaces 488 being the distal surfaces, and the surfaces 490 being the proximal surfaces. When the concrete is sufficiently flat, the float can be pivoted 180° and the surfaces 488 become the proximal surfaces and the edges 495 reduce the surface tension of the cream discouraging the cream from migrating up the back wall. The float 486C can continue to be used without pivoting 180°.

Any of the float configurations described herein can be used with end caps and/or weights. In using a float with end caps, it is easier to maintain the upper surface of the float clean from concrete. Additionally, when used with weights or end caps, and vibration, the vibration modes can be more easily tailored to the configuration of the float and other apparatus being used.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A vibration apparatus for a concrete working tool, wherein the vibration apparatus comprises a vibration device within a housing wherein the housing has a housing surface that has an interface component configured so that engagement of a mating interface component on a concrete working tool limits movement of the vibration apparatus away from the concrete working tool, and wherein the engagement of the interface component on the housing and the mating interface component is placed under tension by a securement element.

2. The vibration apparatus of claim 1 wherein the engagement between the interface component and the mating interface component on the concrete working tool is other than a threaded engagement.

3. The vibration apparatus of claim 1 wherein the interface component of the housing surface includes at least one of a threaded fastener, pin, detent, slide lock, pressure plate, cotter pin, twist lock or lever for securing the interface component on the housing surface to the mating interface component.

4. The vibration apparatus of claim 1 wherein the interface component on the housing surface includes a longitudinally extending channel configured for engaging a complementary surface on a mating interface component on a concrete working tool.

5. The vibration assembly of claim 4 wherein the longitudinally extending channel includes at least one surface limiting movement of the vibration apparatus away from a mating interface component on a concrete working tool and limiting movement of the vibration apparatus in a direction parallel to the housing surface.

6. The vibration assembly of claim 4 wherein the longitudinally extending channel includes an at least partly upwardly and angularly extending surface.

7. The vibration assembly of claim 4 wherein the longitudinally extending channel includes a dovetail portion.

8. The vibration assembly of claim 7 wherein the longitudinally extending channel includes an at least partly upwardly and angularly extending surface and a second surface extending substantially parallel to the housing surface.

9. The vibration assembly of claim 1 wherein the securement element is supported by the housing.

10. A vibration apparatus for a concrete working tool, wherein the vibration apparatus comprises a vibration device within a housing wherein the housing has a base surface and a longitudinally extending channel in the base surface for receiving a mating interface component on a concrete working tool such that engagement of a mating interface component on a concrete working tool with the channel limits movement of the vibration apparatus away from the concrete working tool, and wherein the engagement of the channel on the housing with the mating interface component is placed under tension by a securement element.

11. The vibration apparatus of claim 10 wherein the longitudinally extending channel is formed integral with the housing base surface.

12. The vibration apparatus of claim 10 wherein the longitudinally extending channel is formed in a mounting element attached to the base surface of the housing.

13. The vibration apparatus of claim 10 wherein the longitudinally extending channel includes a dovetail portion.

14. The vibration apparatus of claim 10 wherein the securement element is supported by the housing.

15. A vibration apparatus for a concrete working tool, wherein the vibration apparatus comprises a vibration device within a housing wherein the housing has a base surface and a longitudinally extending channel in the base surface for receiving a mating interface component on a concrete working tool such that engagement of a mating interface component on a concrete working tool with the channel limits movement of the vibration apparatus away from the concrete working tool; and
a securement element wherein the securement element and the channel are configured to place the engagement of the mating interface component in the channel under tension, wherein the securement element includes a pin threaded into the housing and into and out of the channel.

16. A vibration apparatus for a concrete finishing tool, wherein the vibration apparatus comprises a housing, a vibration device supported in the housing, a dovetail groove extending longitudinally in a wall supported by the housing, and a securement device including a portion extending adjacent the dovetail groove wherein the securement device is configured to place in tension an engagement between the dovetail groove and an interface component mating with the dovetail groove.

17. The vibration apparatus of claim 16 wherein the securement device includes a portion extending into an opening into the dovetail groove.

18. The vibration apparatus of claim 16 wherein the securement device includes a pin threaded into a portion of the housing and capable of threading into the dovetail groove.

19. The vibration apparatus of claim 18 wherein the dovetail groove includes a straight wall extending parallel to a surface in the housing and wherein the pin is threaded substantially perpendicular to the straight wall.

20. A vibration apparatus for a concrete finishing tool, wherein the vibration apparatus comprises a housing, a vibration device supported in the housing, a dovetail groove extending longitudinally in a wall supported by the housing, and a securement device including a portion extending adjacent the dovetail groove, wherein the vibration device includes a rotating element on an axis extending in a direction parallel to the dovetail groove, and wherein the dovetail groove is formed in a surface of the housing.

* * * * *